United States Patent
Yip et al.

(10) Patent No.: US 8,462,407 B2
(45) Date of Patent: Jun. 11, 2013

(54) MEASURING SEPARATION OF PATTERNS, AND USE THEREOF FOR DETERMINING PRINTER CHARACTERISTICS

(75) Inventors: Ben Yip, Homebush West (AU); Paul Joseph Ellis, Gladesville (AU); Son Thai, Beverly Hills (AU)

(73) Assignee: Canon Kabushiki Kaisha, Tokyo (JP)

( * ) Notice: Subject to any disclaimer, the term of this patent is extended or adjusted under 35 U.S.C. 154(b) by 794 days.

(21) Appl. No.: 12/634,487

(22) Filed: Dec. 9, 2009

(65) Prior Publication Data
US 2011/0007371 A1  Jan. 13, 2011

(30) Foreign Application Priority Data

Dec. 17, 2008  (AU) ................................ 2008258180
Dec. 17, 2008  (AU) ................................ 2008258181

(51) Int. Cl.
*H04N 1/46* (2006.01)

(52) U.S. Cl.
USPC ............ 358/526; 358/1.9; 358/474; 358/504; 347/19; 347/107; 382/112; 382/151; 382/293; 382/294

(58) Field of Classification Search
None
See application file for complete search history.

(56) References Cited

U.S. PATENT DOCUMENTS

| | | | |
|---|---|---|---|
| 6,226,419 | B1 | 5/2001 | Lodwick et al. |
| 6,285,799 | B1 * | 9/2001 | Dance et al. ................. 382/261 |
| 6,628,845 | B1 * | 9/2003 | Stone et al. ................... 382/294 |
| 7,271,816 | B2 | 9/2007 | Tezuka et al. |
| 7,271,905 | B2 | 9/2007 | Smith et al. |
| 2002/0181986 | A1 * | 12/2002 | Castano et al. ................. 400/74 |
| 2005/0206934 | A1 * | 9/2005 | Nishikawa et al. ............ 358/1.9 |
| 2005/0270325 | A1 | 12/2005 | Cavill et al. |
| 2007/0230770 | A1 * | 10/2007 | Kulkarni et al. ............... 382/149 |
| 2008/0049268 | A1 | 2/2008 | Hardy et al. |
| 2008/0079964 | A1 * | 4/2008 | Woolfe et al. .................. 358/1.9 |
| 2009/0021551 | A1 * | 1/2009 | Fletcher et al. ................. 347/19 |
| 2009/0148051 | A1 * | 6/2009 | Pham et al. .................... 382/219 |
| 2009/0284802 | A1 * | 11/2009 | Yeap et al. .................... 358/3.28 |

FOREIGN PATENT DOCUMENTS

| | | |
|---|---|---|
| JP | 63-232746 | 9/1988 |
| JP | 2001-8010 | 1/2001 |
| WO | 0051017 A3 | 8/2000 |

OTHER PUBLICATIONS

Japanese Office Action dated Feb. 27, 2012 issued during prosecution of related Japanese application No. 2009-285725.

* cited by examiner

*Primary Examiner* — Miya J Cato
(74) *Attorney, Agent, or Firm* — Fitzpatrick, Cella, Harper & Scinto

(57) ABSTRACT

Disclosed are methods (900) and apparatuses (600) for determining a location of a graphical object (2220) printed onto a print medium (230), said graphical object comprising a plurality of object marks, the method comprising the steps of superposing a two-dimensional reference pattern (710) having a pre-defined degree of accuracy over the printed graphical object, the two-dimensional reference pattern comprising a plurality of pattern marks (770); scanning the superposed printed graphical object and reference pattern to produce a scanned image (2400); determining a location coordinate (2923) of the graphical object in the scanned image (2400); and refining the location coordinate dependent upon the scanned reference pattern to determine a reference pattern coordinate (2904') associated with the location coordinate (2923). Also disclosed are methods (1800), apparatuses, and computer program products for determining a head size (420) of a print head (3110) of a printer (3100) using the aforementioned method.

20 Claims, 65 Drawing Sheets 2810      2820      2830

2860      2850      2840/2845/2855

2870      2880      2890

MEASURING SEPARATION OF PATTERNS, AND USE THEREOF FOR DETERMINING PRINTER CHARACTERISTICS

CROSS-REFERENCE TO RELATED PATENT APPLICATION

This application claims the right of priority under 35 U.S.C. §119 based on Australian Patent Application No 2008258181, filed 17 Dec. 2008, and on Australian Patent Application No 2008258180, filed 17 Dec. 2008, which are incorporated by reference herein in their entirety as if fully set forth herein.

TECHNICAL FIELD OF THE INVENTION

The current invention relates to image processing of two-dimensional patterns and use of such separated patterns for calibration and quality assurance of printers.

BACKGROUND

In recent years high quality color printers have become widely available. Two significant and related factors are improvements in color accuracy and improvements in resolution. For inkjet printers, typical resolutions are 1200 pixels per inch or higher, which translates into a printer ink dot size (and separation) of 20 microns or less. In many systems the inkjet printer may overprint regions multiple times to reduce the effect of printer defects, such as blocked printer head nozzles. The optical density of a printed color can be very sensitive to the precise value of the displacement between overprinted regions. This means that (for high quality printers at least) it is necessary to control or calibrate the exact shift of the printer head relative to the printed medium between overprints. Typically, the desired accuracy of this calibration is on the order of one micron.

Many approaches have been proposed for calibrating the movements of the medium being printed relative to the head size on the medium (where, as depicted in FIG. 4, the physical distance 420 on a print medium 230 between two ink dots 410 is referred to as the "head size" 420), but few prior art methods measure the effective head size as printed on the medium.

One possible method to measure the effective head size on the medium is by printing dots using predefined nozzles and then measuring the separation of the dots on the medium using a microscope. However, because printed dots on the medium could have a dimension of around 40 micrometers (because the printed dots may have irregular shapes), and because microscopes with the desired accuracy are typically very expensive, such measurements are not always practical.

Noting that high quality colour printers have become a norm, it is further noted that two significant and related factors in such printers are improvements in colour accuracy and improvements in resolution. For inkjet printers, typical resolutions are 1200 dpi or higher, which translates into a printer ink dot size (and separation) of 20 microns or less. In many systems, the inkjet printer may overprint regions multiple times to reduce the effect of printer defects, such as blocked printer head nozzles. The optical density of a printed colour can be very sensitive to the precise value of the displacement between overprinted regions. This means that (for high quality printers at least) the exact shift of the printer head relative to the printed medium between overprints must be controlled or calibrated. Typically, the desired accuracy of this calibration is on the order of one micron.

A number of techniques have been proposed for calibrating the movements of the medium being printed relative to the head size on the medium, but few techniques measure the effective head size as printed on the medium.

One method of measuring the effective head size on the medium is to print dots using predefined nozzles and then measuring the separation of the dots on the medium using a microscope. However, because printed dots on the medium could have a dimension of around 40 micrometers and may have irregular shapes, and because microscopes with the desired accuracy are typically very expensive, such measurements are not always practical.

SUMMARY

Disclosed are arrangements, referred to as two-dimensional Ruler with Printed Patch with Hole (or "RPPH") arrangements, which seek to address the above problems by printing patches onto a print medium, superposing a two-dimensional reference ruler over the printed document, scanning the superposed patches and reference ruler, and determining the head size from the locations of the patches using the ruler to enhance accuracy, where the patches are designed to enhance the signal separation to facilitate image signal analysis of the superposed images. It is noted that the term "hole" is also referred to, more generally, as a "separation area" as will be described, for example, in relation to FIG. 28.

In accordance with one aspect of the invention, there is provided a method of determining a location of a graphical object printed onto a print medium, said graphical object comprising a plurality of object marks, the method comprising superposing a two-dimensional reference pattern having a pre-defined degree of accuracy over the printed graphical object, the two-dimensional reference pattern comprising a plurality of pattern marks, scanning the superposed printed graphical object and reference pattern to produce a scanned image, determining a location coordinate of the graphical object in the scanned image, and refining the location coordinate dependent upon the scanned reference pattern to determine a reference pattern coordinate associated with the location coordinate, said reference pattern coordinate defining the location of the graphical object; wherein said graphical object is adapted to have a separation area in the vicinity of the location coordinate to thereby minimise occlusion of the pattern marks by the object marks in the vicinity of the reference pattern coordinate.

According to another aspect of the present disclosure, there is provided an apparatus for implementing any one of the aforementioned methods.

According to another aspect of the present disclosure, there is provided a computer readable storage medium having recorded thereon a computer program for implementing any one of the methods described above.

Other aspects of the disclosure are also disclosed.

BRIEF DESCRIPTION OF THE DRAWINGS

The description below relates to the following drawings, in which.

DETAILED DESCRIPTION INCLUDING BEST MODE

Figure 1A:
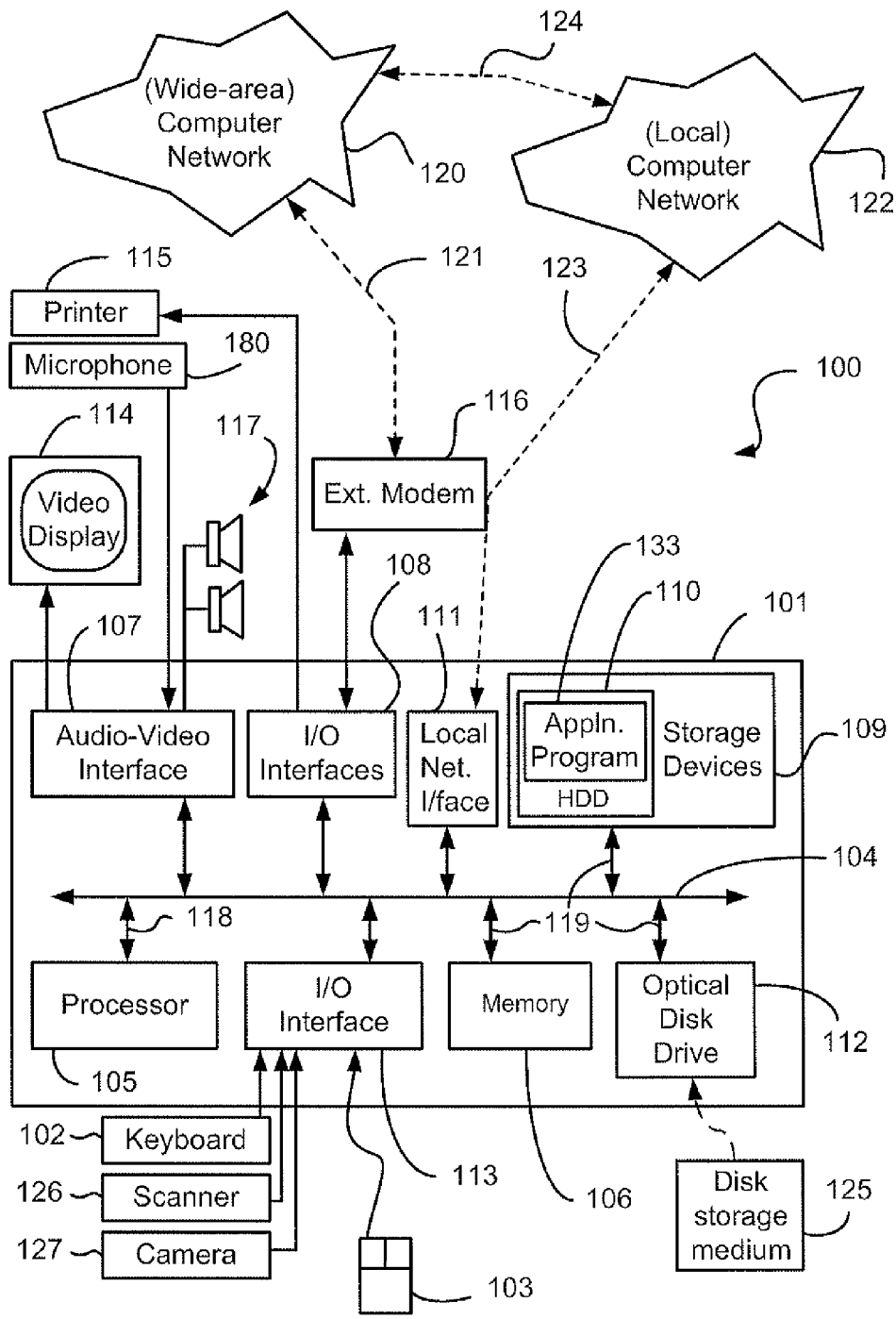
FIGS. 1A and 1B form a schematic block diagram of a general purpose computer system upon which the RPPH arrangements described can be practiced.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and that above relating to prior art arrangements relate to discussions of devices which form public knowledge through their use. Such discussions should not be interpreted as a representation by the present inventor(s) or the patent applicant that such documents or devices in any way form part of the common general knowledge in the art.

RPPH methods are herein described for measuring the head size of an inkjet print head using a two-dimensional measurement system and a relative position estimation of printed patches (or regions). Also described is the design of these RPPH patches so as to enable accurate estimates based on cross-correlation, and separating of image signals from superposed two-dimensional reference pattern and printed patches. Broadly speaking, a printed patch can be regarded as two-dimensional (printed) pattern, or as one type of two-dimensional pattern.

Processing Environment

The RPPH methods of measuring head size to be described may be implemented using a computer system 100, such as that shown in FIG. 1A wherein the processes of this RPPH approach may be implemented as software, such as one or more application programs executable within the computer system 100. In particular, the steps of the methods of measuring head size are effected by instructions in the software that are carried out within the computer system 100. The use of the computer program product in the computer system 100 preferably affects an advantageous apparatus for image processing, particularly for signal separation of superposed two-dimensional patterns.

The networks 120 and 122 may convey image data from other sources (not shown), and image data may also be sourced from the scanner 126. The scanner 126 may be a flatbed scanner or other digital image capturing devices such as a digital camera.

Intermediate storage of such RPPH programs and any data, such as image data, fetched over the networks 120 and 122 or from the scanner 126 may be accomplished using the semiconductor memory 106, possibly in concert with the hard disk drive 110.

Figure 1B:
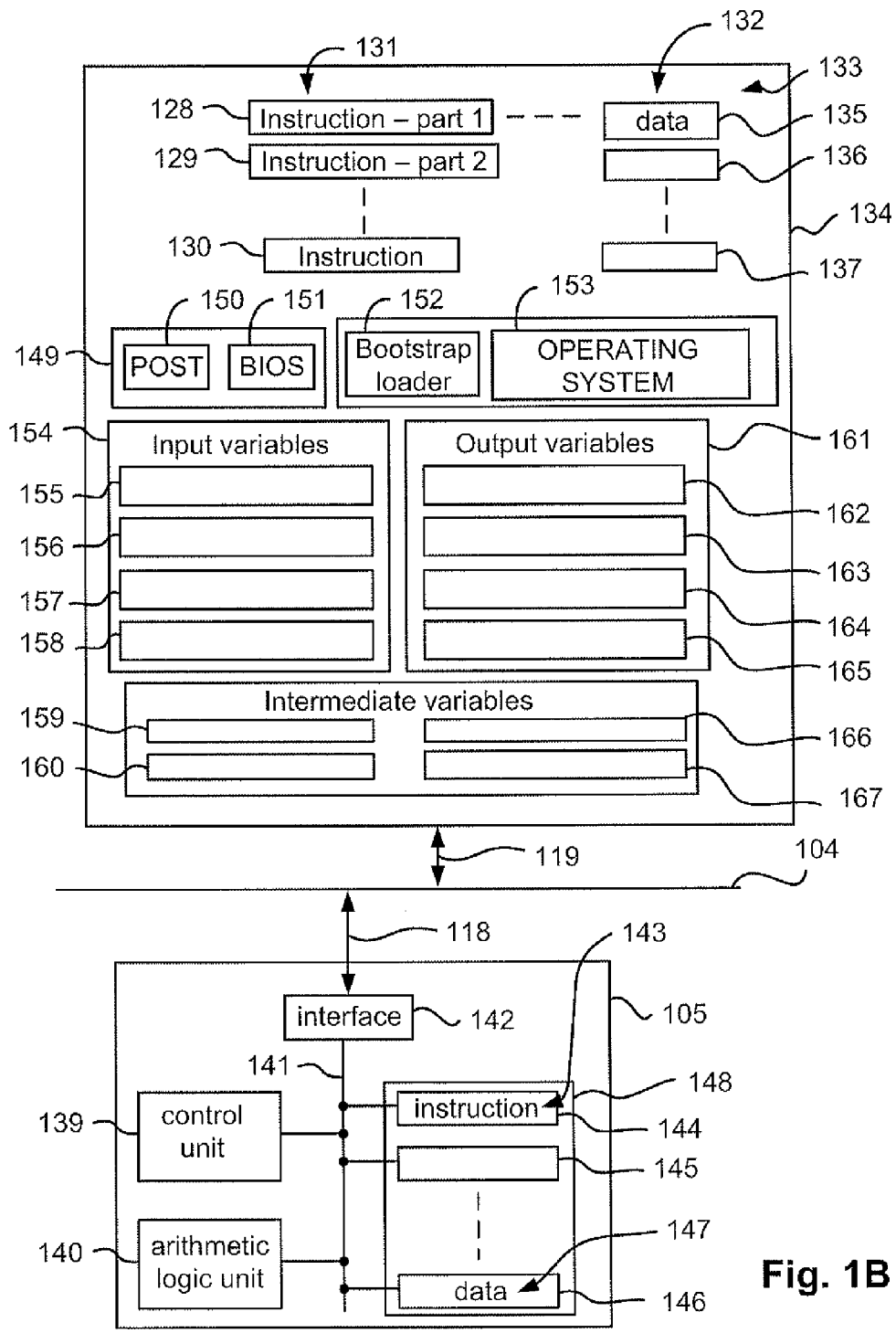

FIGS. 1A and 1B collectively form a schematic block diagram of a general purpose computer system 100, upon which the various arrangements described can be practiced.

As seen in FIG. 1A, the computer system 100 is formed by a computer module 101, input devices such as a keyboard 102, a mouse pointer device 103, a scanner 126, a camera 127, and a microphone 180, and output devices including a printer 115, a display device 114 and loudspeakers 117. An external Modulator-Demodulator (Modem) transceiver device 116 may be used by the computer module 101 for communicating to and from a communications network 120 via a connection 121. The network 120 may be a wide-area network (WAN), such as the Internet or a private WAN. Where the connection 121 is a telephone line, the modem 116 may be a traditional "dial-up" modem. Alternatively, where the connection 121 is a high capacity (eg: cable) connection, the modem 116 may be a broadband modem. A wireless modem may also be used for wireless connection to the network 120.

The computer module 101 typically includes at least one processor unit 105, and a memory unit 106 for example formed from semiconductor random access memory (RAM) and semiconductor read only memory (ROM). The module 101 also includes an number of input/output (I/O) interfaces including an audio-video interface 107 that couples to the video display 114, loudspeakers 117 and microphone 180, an I/O interface 113 for the keyboard 102, mouse 103, scanner 126, camera 127 and optionally a joystick (not illustrated), and an interface 108 for the external modem 116 and printer 115. In some implementations, the modem 116 may be incorporated within the computer module 101, for example within the interface 108. The computer module 101 also has a local network interface 111 which, via a connection 123, permits coupling of the computer system 100 to a local computer network 122, known as a Local Area Network (LAN). As also illustrated, the local network 122 may also couple to the wide network 120 via a connection 124, which would typically include a so-called "firewall" device or device of similar functionality. The interface 111 may be formed by an Ethernet™ circuit card, a Bluetooth™ wireless arrangement or an IEEE 802.11 wireless arrangement.

The interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (eg: CD-ROM, DVD), USB-RAM, and floppy disks for example may then be used as appropriate sources of data to the system 100.

The components 105 to 113 of the computer module 101 typically communicate via an interconnected bus 104 and in a manner which results in a conventional mode of operation of the computer system 100 known to those in the relevant art. Examples of computers on which the described arrangements can be practised include IBM-PC' s and compatibles, Sun Sparcstations, Apple Mac™ or alike computer systems evolved therefrom.

The RPPH method may be implemented using the computer system 100 wherein the processes of FIGS. 9, 13-16, 18, 21, 25 and 27 to be described, may be implemented as one or more software application programs 133 executable within the computer system 100. In particular, the steps of the RPPH method is effected by instructions 131 in the software 133 that are carried out within the computer system 100. The software instructions 131 may be formed as one or more code modules, each for performing one or more particular tasks. The software may also be divided into two separate parts, in which a first part and the corresponding code modules performs the RPPH methods and a second part and the corresponding code modules manage a user interface between the first part and the user.

The software 133 is generally loaded into the computer system 100 from a computer readable medium, and is then typically stored in the HDD 110, as illustrated in FIG. 1A, or the memory 106, after which the software 133 can be executed by the computer system 100. In some instances, the RPPH application programs 133 may be supplied to the user encoded on one or more CD-ROM 125 and read via the corresponding drive 112 prior to storage in the memory 110 or 106. Alternatively the software 133 may be read by the computer system 100 from the networks 120 or 122 or loaded into the computer system 100 from other computer readable media. Computer readable storage media refers to any storage medium that participates in providing instructions and/or data to the computer system 100 for execution and/or processing. Examples of such storage media include floppy disks, magnetic tape, CD-ROM, a hard disk drive, a ROM or integrated circuit, USB memory, a magneto-optical disk, or a computer readable card such as a PCMCIA card and the like, whether or not such devices are internal or external of the computer module 101. Examples of computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

The second part of the RPPH application programs 133 and the corresponding code modules mentioned above may be executed to implement one or more graphical user interfaces (GUIs) to be rendered or otherwise represented upon the display 114. Through manipulation of typically the keyboard 102 and the mouse 103, a user of the computer system 100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117 and user voice commands input via the microphone 180.

FIG. 1B is a detailed schematic block diagram of the processor 105 and a "memory" 134. The memory 134 represents a logical aggregation of all the memory devices (including the HDD 110 and semiconductor memory 106) that can be accessed by the computer module 101 in FIG. 1A.

When the computer module 101 is initially powered up, a power-on self-test (POST) program 150 executes. The POST program 150 is typically stored in a ROM 149 of the semiconductor memory 106. A program permanently stored in a hardware device such as the ROM 149 is sometimes referred to as firmware. The POST program 150 examines hardware within the computer module 101 to ensure proper functioning, and typically checks the processor 105, the memory (109, 106), and a basic input-output systems software (BIOS) module 151, also typically stored in the ROM 149, for correct operation. Once the POST program 150 has run successfully, the BIOS 151 activates the hard disk drive 110. Activation of the hard disk drive 110 causes a bootstrap loader program 152 that is resident on the hard disk drive 110 to execute via the processor 105. This loads an operating system 153 into the RAM memory 106 upon which the operating system 153 commences operation. The operating system 153 is a system level application, executable by the processor 105, to fulfil various high level functions, including processor management, memory management, device management, storage management, software application interface, and generic user interface.

The operating system 153 manages the memory (109, 106) in order to ensure that each process or application running on the computer module 101 has sufficient memory in which to execute without colliding with memory allocated to another process. Furthermore, the different types of memory available in the system 100 must be used properly so that each process can run effectively. Accordingly, the aggregated memory 134 is not intended to illustrate how particular segments of memory are allocated (unless otherwise stated), but rather to provide a general view of the memory accessible by the computer system 100 and how such is used.

The processor 105 includes a number of functional modules including a control unit 139, an arithmetic logic unit (ALU) 140, and a local or internal memory 148, sometimes called a cache memory. The cache memory 148 typically includes a number of storage registers 144-146 in a register section. One or more internal buses 141 functionally interconnect these functional modules. The processor 105 typically also has one or more interfaces 142 for communicating with external devices via the system bus 104, using a connection 118.

The RPPH application program 133 includes a sequence of instructions 131 that may include conditional branch and loop instructions. The program 133 may also include data 132 which is used in execution of the program 133. The instructions 131 and the data 132 are stored in memory locations 128-130 and 135-137 respectively. Depending upon the relative size of the instructions 131 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128-129.

In general, the processor 105 is given a set of instructions which are executed therein. The processor 105 then waits for a subsequent input, to which it reacts to by executing another set of instructions. Each input may be provided from one or more of a number of sources, including data generated by one or more of the input devices 102, 103, data received from an external source across one of the networks 120, 122, data retrieved from one of the storage devices 106, 109 or data retrieved from a storage medium 125 inserted into the corresponding reader 112. The execution of a set of the instructions may in some cases result in output of data. Execution may also involve storing data or variables to the memory 134.

The disclosed RPPH arrangements use input variables 154 that are stored in the memory 134 in corresponding memory locations 155-158. The RPPH arrangements produce output variables 161 that are stored in the memory 134 in corresponding memory locations 162-165. Intermediate variables may be stored in memory locations 159, 160, 166 and 167.

The register section 144-146, the arithmetic logic unit (ALU) 140, and the control unit 139 of the processor 105 work together to perform sequences of micro-operations needed to perform "fetch, decode, and execute" cycles for every instruction in the instruction set making up the RPPH program 133. Each fetch, decode, and execute cycle comprises:

(a) a fetch operation, which fetches or reads an instruction 131 from a memory location 128;

(b) a decode operation in which the control unit 139 determines which instruction has been fetched; and (c) an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

Each step or sub-process in the processes of FIGS. 9, 13-16, 18, 21, 25 and 27 is associated with one or more segments of the RPPH program 133, and is performed by the register section 144-147, the ALU 140, and the control unit 139 in the processor 105 working together to perform the fetch, decode, and execute cycles for every instruction in the instruction set for the noted segments of the program 133.

The RPPH method may alternatively be implemented in dedicated hardware such as one or more integrated circuits performing the RPPH functions or sub functions. Such dedicated hardware may include graphic processors, digital signal processors, or one or more microprocessors and associated memories.

Inkjet Printer and Print Head

Figure 2A:
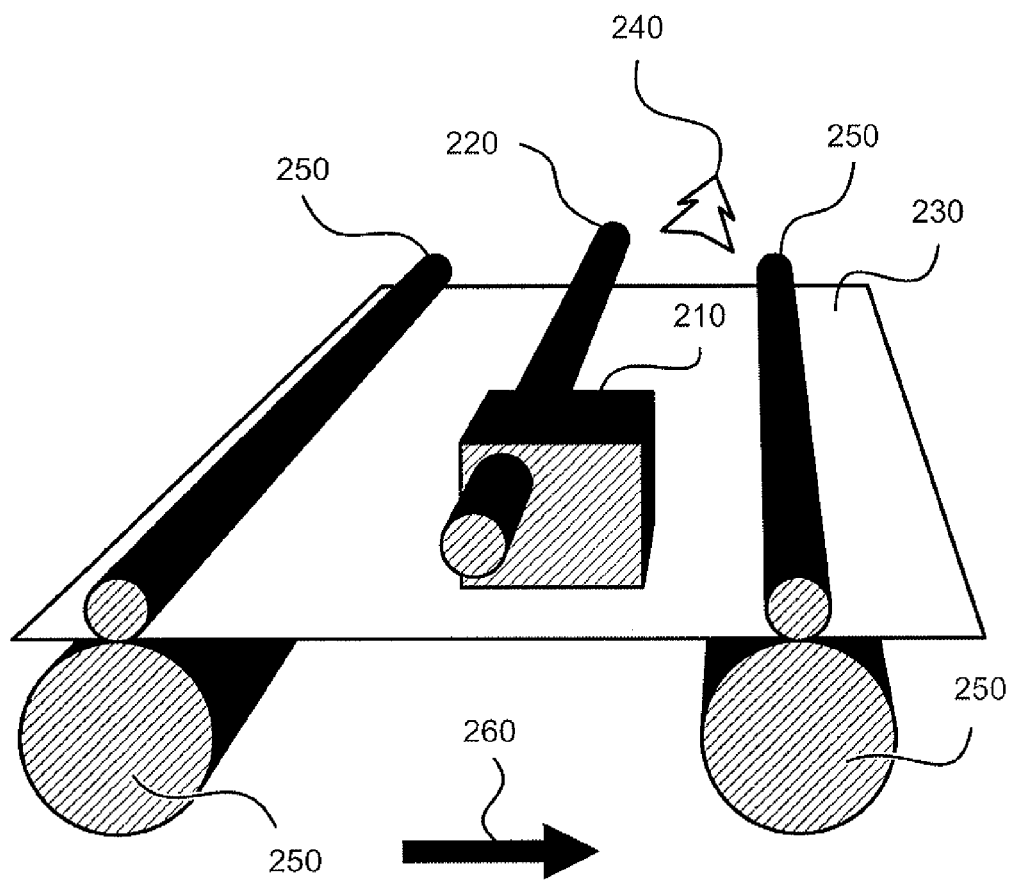
FIG. 2a illustrates a simplified representation of the mechanical layout of an inkjet printer.

FIG. 2a illustrates a simplified representation of the internal arrangement of an inkjet printer. The arrangement comprises a print head 210 having ink ejection nozzles (not illustrated) organised into groups based on color and/or ink volume. The print head 210 is mounted on a carriage 220 and the print head 210 transverses a print medium 230 and forms image swaths during a forward passage in a scan direction 240 and a back passage opposite to the scan direction 240, by controlling the ejection of ink from the ink ejection nozzles within the nozzle banks. The inkjet printer further comprises a print medium advance mechanism 250, which transports the print medium 230 in a direction 260 perpendicular to the print head scan direction 240. The distance of the print medium advance is called the line feed distance.

Figure 2B:
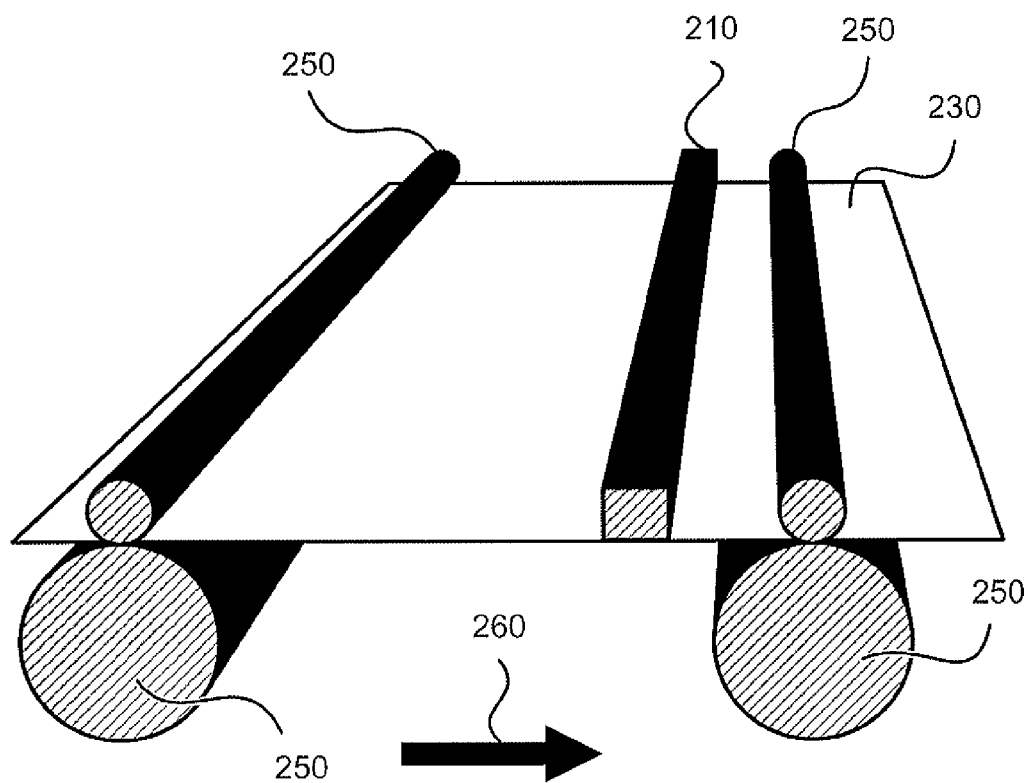
FIG. 2b illustrates a simplified representation of an alternate mechanical layout of an inkjet printer.

FIG. 2b illustrates a simplified representation of the internal arrangement of a full-width fixed head printer. The arrangement comprises a print head 210 having ink ejection nozzles (not illustrated) organised into groups based on color and/or ink volume. The print head 210 is stationary and forms image by controlling the ejection of ink from the ink ejection nozzles within the nozzle banks while the print medium advance mechanism 250 transports the print medium 230 in the direction 260.

Figure 3:
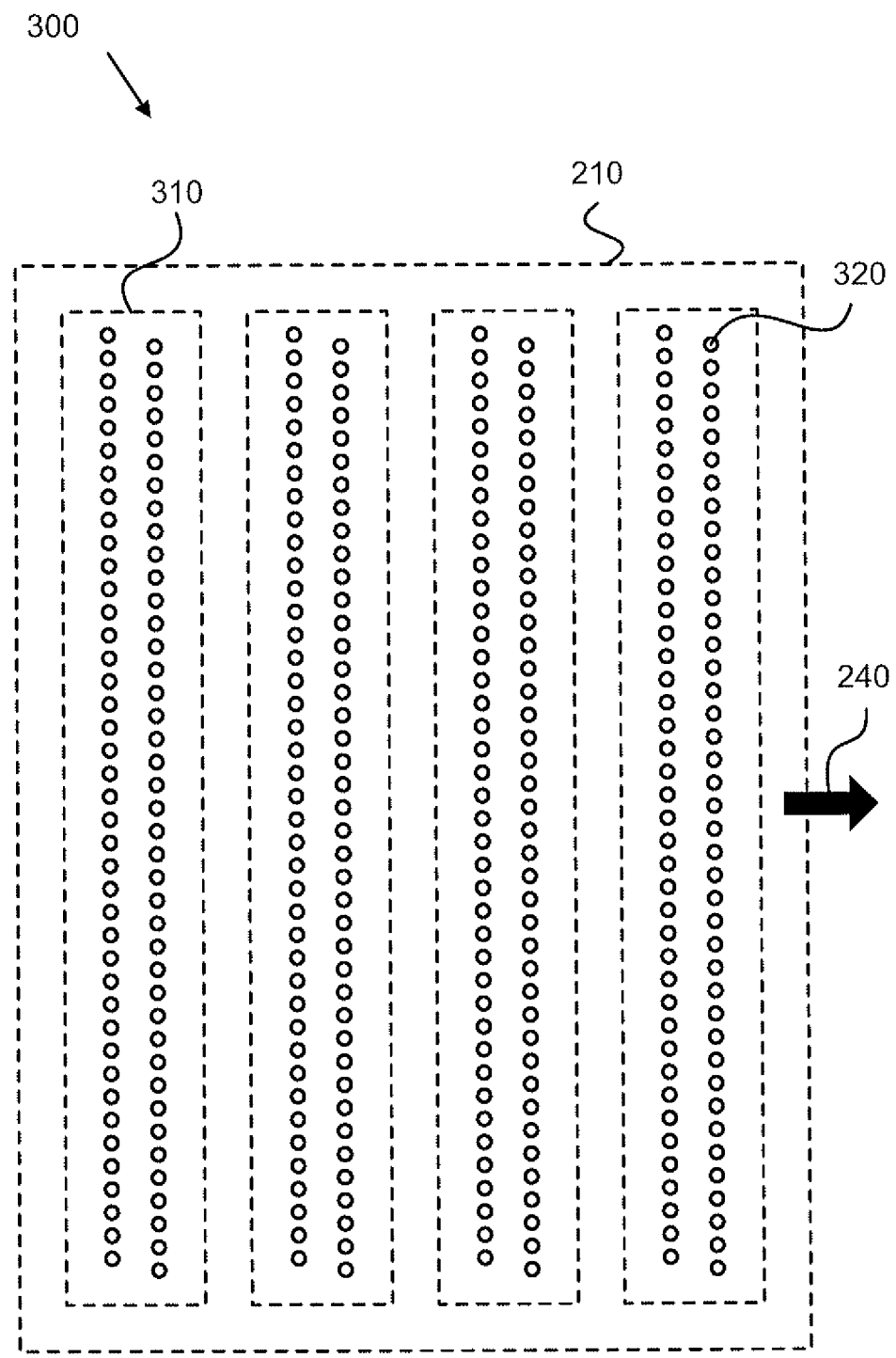
FIG. 3 illustrates a typical layout of ink ejection nozzles of an inkjet print head (also referred to simply as a "head")

FIG. 3 illustrates a typical layout of ink eject nozzle banks 310 of the print head 210. Each nozzle bank 310 consists of multiple ink ejection nozzles 320 extending perpendicularly to the print head scan direction 240.

In order for an inkjet printer to produce images which do not contain noticeable visual artefacts, alignment is required between the nozzle banks 310 used within the same passage, and between the nozzle banks 310 used during the forward and back passages respectively. The print medium advance mechanism 250 must also be calibrated to advance the print medium 230 in order to correctly align swaths.

To produce optimal image quality it is necessary to characterise each individual printing system, and calibrate components of that printing system accordingly. One important parameter to measure in the process of calibration is the "head size".

Figure 4:
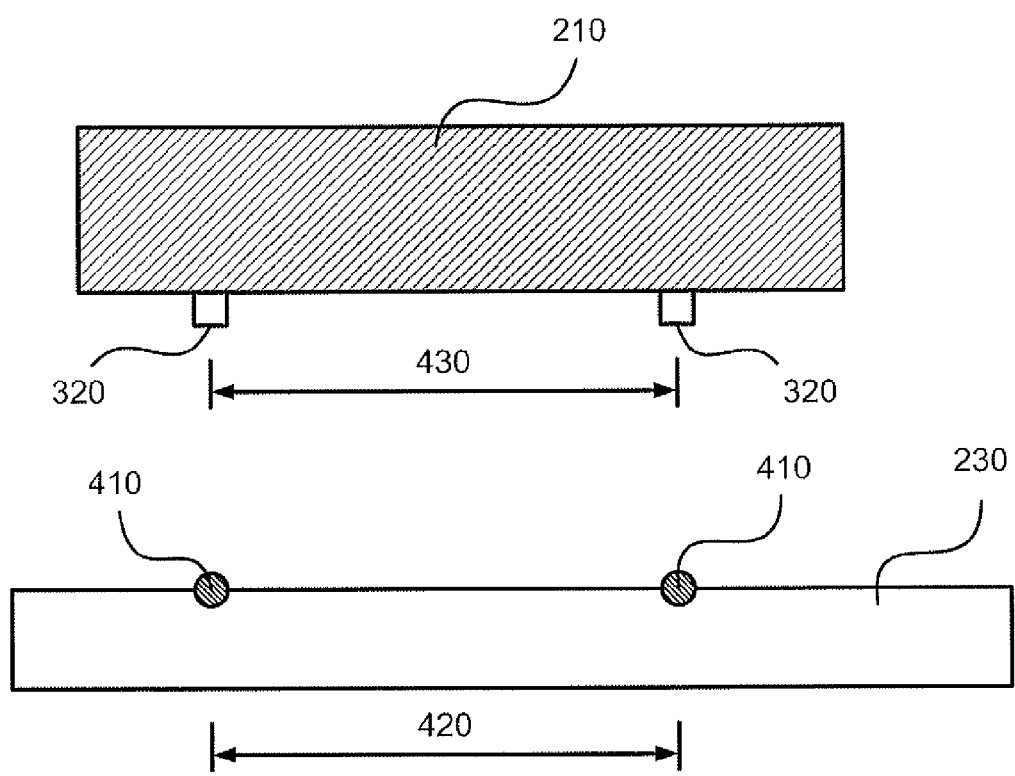
FIG. 4 is a block diagram illustrating the action of two inks ejected from the print head.

FIG. 4 depicts two ink dots 410 that have been ejected from the print head 210. The arrangement comprises a print head 210 having ink ejection nozzles 320 (only two are drawn), ejecting inks onto a print medium 230 and forming the two ink dots 410. The physical distance 420 on the print medium 230 between two ink dots 410 is referred to as the "head size". Note that because the print head may not be exactly parallel to the print medium, and because the inks may not be ejected exactly perpendicularly to the print medium, in general the head size 420 is not the same as the physical distance 430 between the two nozzles 320.

Figure 5:
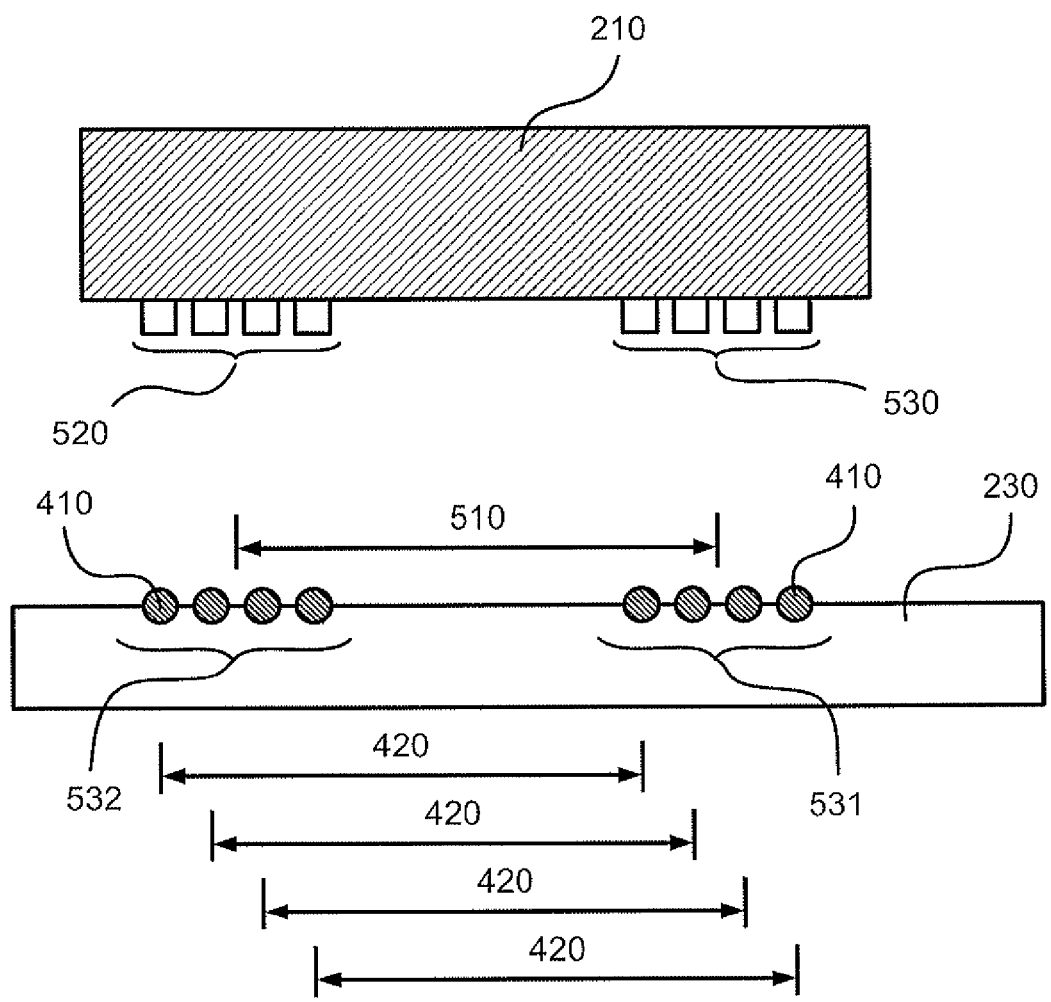
FIG. 5 is a block diagram illustrating the action of two groups of inks ejected from the print head.

FIG. 5 depicts two groups 531, 532 of ink dots 410 ejected from the print head 210. An alternative definition of the head size 420 is the average distance 510 on the print medium 230 between corresponding ink dots in each group, the one group 532 being printed by the nozzle group 520, and the other group 531 being printed by the nozzle group 530. When the nozzle spacing is consistent, the distance 420 on the print medium 230 between two corresponding ink dots should be the same as the average distance 510 on the print medium 230 between the two ink groups 531, 532. The average distance 510 can be determined, in one RPPH example, by determining the respective "location" of each of the two ink groups 531, 532 and then determining the distance between the respective locations. The location of an ink group 531 can be determined, in one RPPH example in which the shape of the ink group 531 is known, by establishing a coordinate system, and determining the location of the ink group 531 using correlation with reference to the known shape of the ink group 531. An alternative method to locate the second ink group 532, where the location of the first ink group 531 is already known and the two ink groups have the same shape, is using correlation of the second ink group 532 with reference to the first ink group 531 instead of using correlation with reference to the known shape of the ink group 532. Other methods for determining the location of an ink group (or more generally of a graphical object) can also be used.

For the purposes of the following discussion, the head size is defined as the average distance 510 between two ink groups the first ink group 531 and the second ink group 532.

Imaging System

Figure 6:
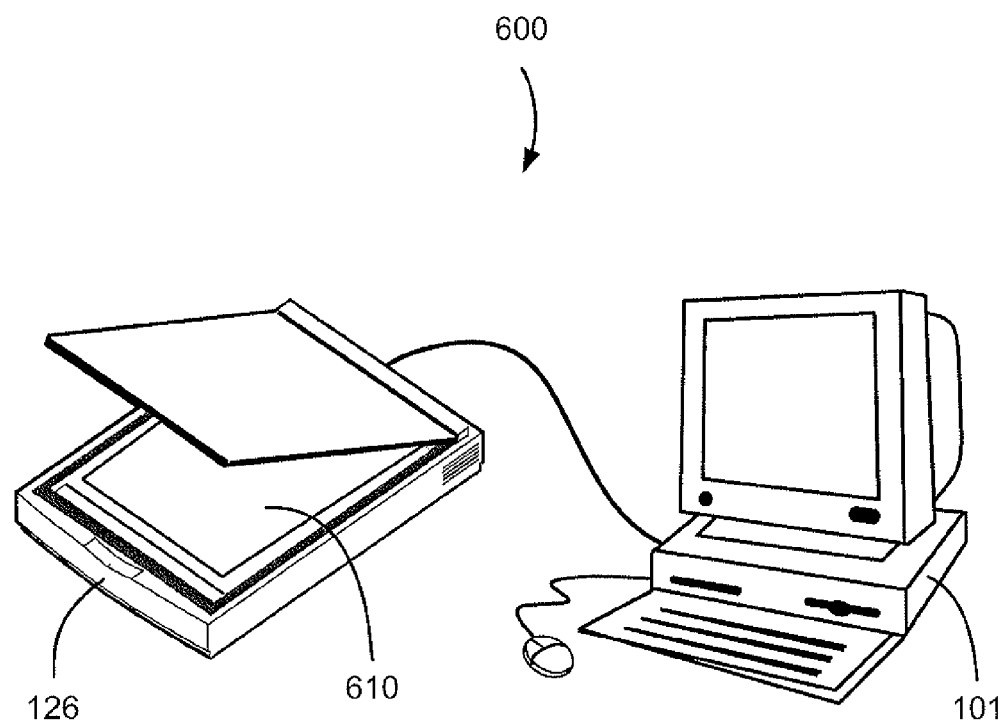
FIG. 6 illustrates an RPPH measurement system comprising a flat bed scanner attached to a computer.

FIG. 6 shows a measurement system 600 for determining a two-dimensional position of a location on a surface 610 imaged by the system 600. The measurement system 600 comprises the flat bed scanner 126, attached to a computer 101.

The computer 101 in FIG. 1 used for printing a measurement chart can be a different system from the computer 101 in FIG. 6 used for scanning a measurement chart. In the preferred RPPH arrangement, the same computer 101 is used to do both printing and scanning of the measurement chart.

Two-Dimensional Pattern Glass

Due to spatial distortions introduced by the scanner 126, positions on the surface 610 imaged by the system 600 do not directly correspond with pixel positions of a digital image resulting from scanning the surface.

In order to accurately determine the physical two-dimensional position of a feature of interest on the surface 610, the scanner surface 610 may be provided with a reference pattern having a pre-defined degree of accuracy. A feature of interest may then be located relative to the reference pattern rather than merely relying on the pixel position of the feature.

In the preferred arrangement of the RPPH approach, such a reference pattern may also be manufactured on a separate transparent sheet which can be placed between the scanner surface 610 and the object being imaged.

Figure 29:
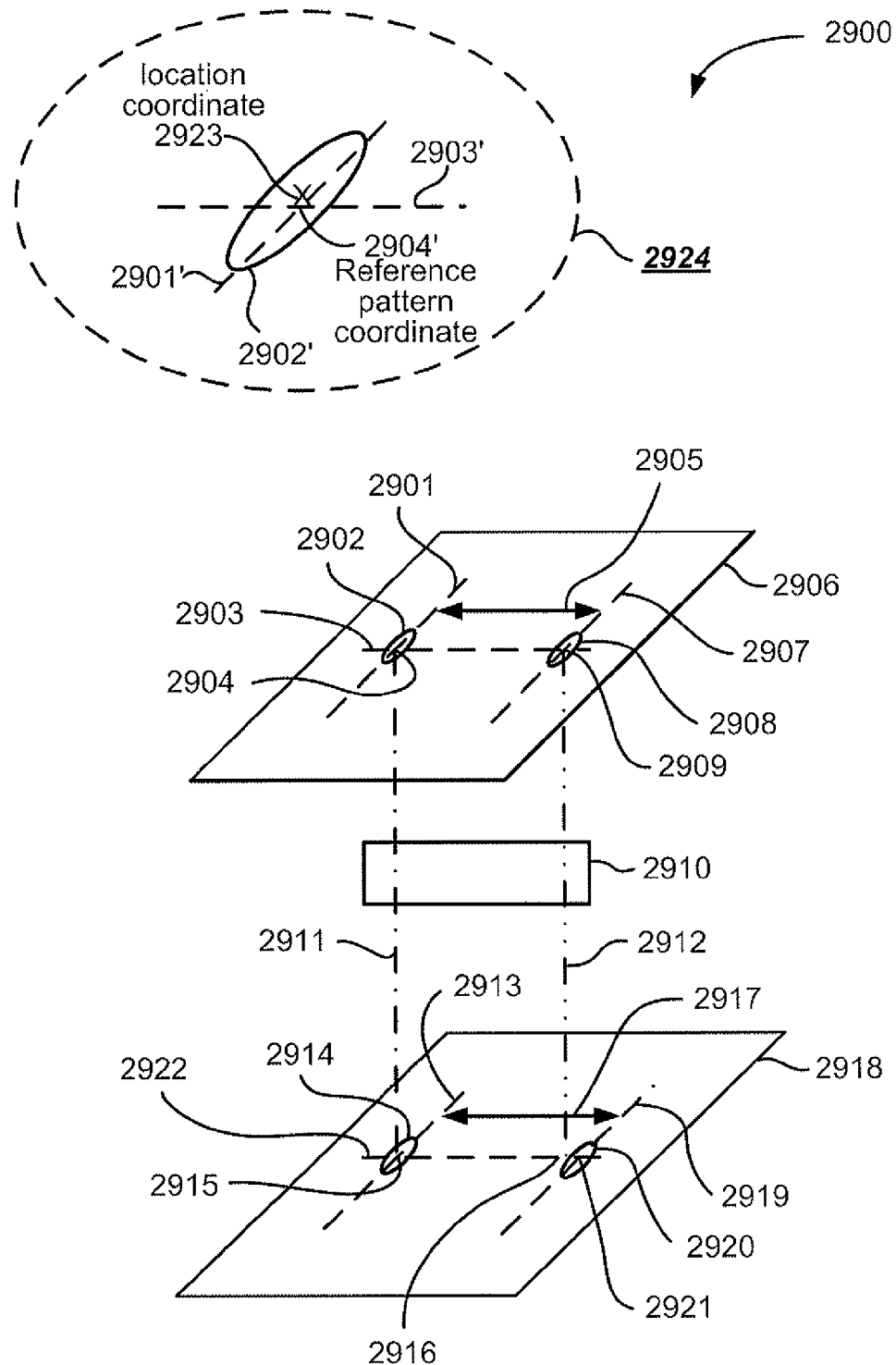
FIG. 29 illustrates the effect of the spatial distortion introduced by a scanner.

FIG. 29 illustrates the effect of the spatial distortion introduced by the scanner 126. In the described example 2900 two graphical shapes 2902 and 2908 have been printed onto a sheet of paper 2906. An illustrative two-dimensional reference pattern comprising a horizontal dashed line 2903 and two orthogonal dashed lines 2901 and 2907, spaced at a distance of 2905, is shown superposed onto the sheet 2906. This simple reference pattern is used in regard to FIG. 29 for ease of explanation, however in the described RPPH arrangements, a two-dimensional pseudo-random noise pattern is used as the reference pattern. Other suitable reference patterns can be used.

An inset 2924 illustrates the relationship between the location of the graphical shape 2902 and the respective reference pattern coordinate 2904 of the reference pattern with which the shape 2902 is associated. The shape 2902 (referred to as 2902' in the inset) has a location depicted by a location coordinate 2923. This location coordinate 2923 can be determined using correlation techniques or other suitable methods. The reference pattern coordinate of the reference pattern 2901', 2903' with which the location coordinate 2923 of the shape 2902' is associated is depicted by 2904'. Although the location coordinate 2923 is not coincident with the reference pattern coordinate 2904', depending upon the resolution of the reference pattern and the other system elements, the location coordinate 2923 and the reference pattern coordinate 2904' can approach each other to any required degree of accuracy.

The image comprising the graphical shapes 2902 and 2908, and the reference pattern 2901, 2903 and 2907 are scanned by the scanner 126 which has a transfer function depicted by a box 2910. The scanner 126 produces a scanned image 2918 of the image on the sheet of paper 2906 which is distorted by the transfer function 2910.

The distortion can be seen as follows. A vertical dashed line 2911 intersects coordinates 2904 and 2915 of the respective reference patterns on the sheet of paper 2906 and the scanned image 2918. However while a vertical line 2912 intersects the coordinate 2909 of the reference pattern on the sheet 2906, the scanned image 2918 has, in this illustrative example, been stretched laterally by the scanning process. Accordingly the vertical line 2912 intersects a horizontal dashed line 2922 on the scanned image at a point 2916 rather than at a point 2921 which corresponds to the point 2909 in the image on the paper 2906. Accordingly, the pixel-based distance 2917 between the scanned objects 2914 and 2920 is larger in the scanned image 2918 than the corresponding physical distance 2905 between the objects 2902 and 2908 printed on the sheet of paper 2906.

However, since the reference pattern 2922, 2913, 2919 has also been stretched laterally, the physical distance 2905 on the sheet of paper 2906 can be determined from the distance 2917 in the scanned image by determining the coordinates 2915 and 2921 on the scanned reference pattern.

Figure 7:
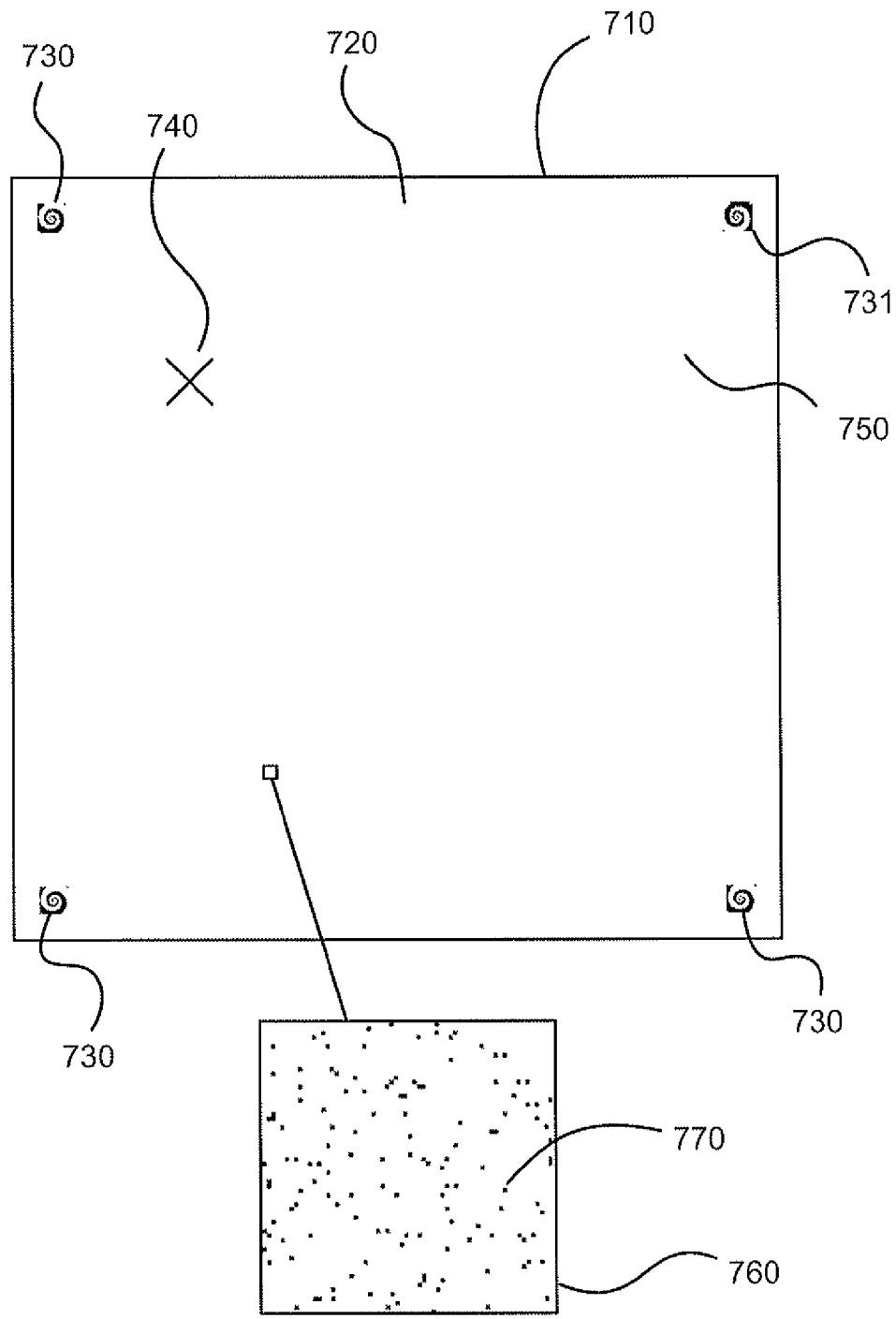
FIG. 7 illustrates an example of a two-dimensional pattern glass (also referred to as a two-dimensional ruler)

FIG. 7 illustrates an example of a two-dimensional pattern glass 710 (also referred to as a two-dimensional ruler or a two-dimensional reference pattern), comprising a transparent sheet prepared with a reference pattern 720, described in detail below, on one surface. Broadly speaking, the two-dimensional ruler can be regarded as a two-dimensional (reference) pattern, or as one type of two-dimensional pattern.

In the preferred arrangement of the RPPH approach, the two-dimensional pattern glass substrate is a material with a low coefficient of thermal expansion such as fused silica and the reference pattern 720, also referred to as a first type of two-dimensional pattern, is formed by depositing chrome particles on the substrate. Other suitable arrangements for forming the reference pattern may also be used. Since the two-dimensional pattern glass 710 is used as a reference, the accuracy of a measurement is determined in part by the accuracy of the two-dimensional pattern glass 710 manufacturing process. For a target measurement accuracy having a 1 micron (ie 1 micrometer) standard deviation using the measurement system 600 with a scanner optical resolution of around 1600 pixels per inch (being equivalent to 15.875 microns/pixel), the reference pattern 720 can be deposited on the two-dimensional pattern glass substrate using a standard ultraviolet (UV) lithographic process with a minimum feature (pattern mark) size of around 400 nm.

In the preferred RPPH arrangement, the reference pattern comprises registration marks 730 and 731 which are used to determine a location (e.g. 740) approximately, and a special pattern 750, used to determine a location accurately.

In the preferred RPPH arrangement, a spiral pattern is used as the registration mark, as described in detail below. Three of these spiral registration marks 730 are identical while a fourth spiral registration mark 731 is a negative image of the spiral registration marks 730. As described below, these registration marks 730, 731 permit the geometrical relationship between a digital image scanned by the measurement system 600 and the reference pattern 720 to be estimated, when the two-dimensional pattern glass 710, the measurement system surface 610 and the surface to be measured 1010 are arranged as described in relation to FIG. 10. Other suitable registration marks can be used instead of the registration marks 730, 731.

As illustrated in an enlargement 760, in the preferred RPPH arrangement the special pattern 750 comprises a two-dimensional pseudo-random noise pattern having a marking density of approximately 4%, with each pattern mark (e.g. 770) taking the form of a square which is 8 microns on each edge.

Logarithmic Radial Harmonic Function Registration Marks

As described previously, in the preferred arrangement of the RPPH approach the reference pattern includes four spiral registration marks 730 and 731. Each spiral is a bitmapped version of a logarithmic radial harmonic function (LRHF). Mathematically, an LRHF is a complex-valued function defined on a plane.

Figure 8:
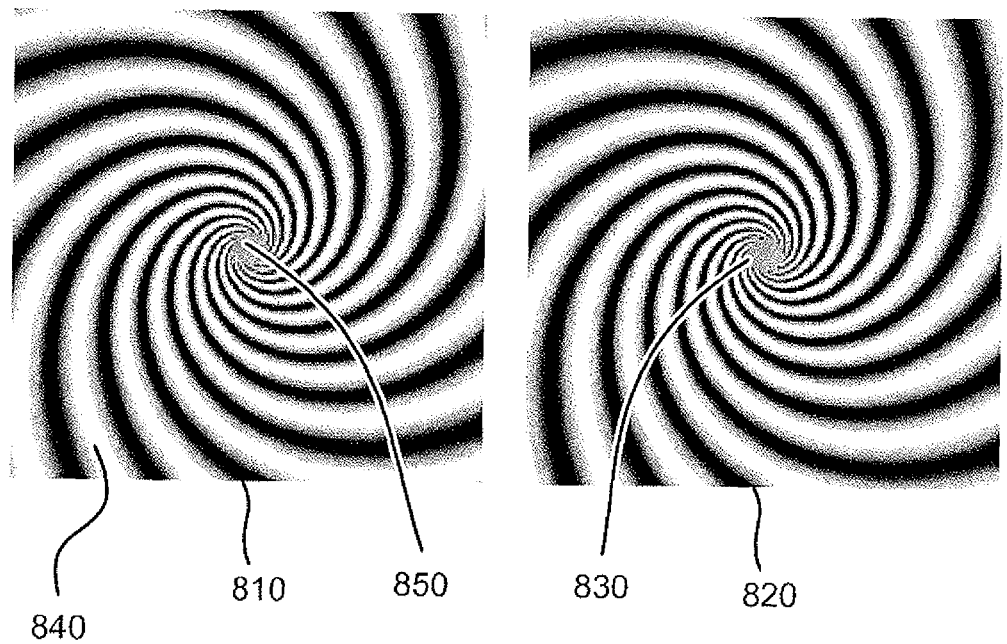
FIG. 8 is a plot of an example of a spiral showing the real part and the imaginary part of a logarithmic radial harmonic function.

FIG. 8 shows an illustration of an example of the real 810 and imaginary 820 parts of an LRHF. An LRHF has the properties of scale and rotation invariance, which means that if an LRHF is transformed by scaling or rotation the transformed LRHF is still an LRHF.

An LRHF has three parameters that may be adjusted. The first parameter is referred to as the Nyquist radius R, which is the radius at which the frequency of the LRHF becomes greater than p radians per pixel (e.g., 830). The second parameter is referred to as the spiral angle s, which is the angle that the spiral arms (e.g., 840) make with circles centred at the origin (e.g., 850). The third parameter is referred to as the phase offset f. An LRHF may be expressed in polar coordinates $(r, \theta)$, in accordance with Formula (1) as follows:

$$l(r, \theta) = e^{j(m\theta + n \ln r + f)} \quad (1)$$

where the values of m and n may be determined in accordance with the following Formulae (2):

$$n = Rp \cos s$$

$$m = \lfloor Rp \sin s \rfloor \quad (2)$$

Each spiral registration mark image 730, 731 is created as a bitmap, which samples the LRHF with the Nyquist radius R, the spiral angle s and the phase offset f. In the preferred RPPH arrangement, each spiral bitmap is a square approximately 5 millimeters on each edge with square pixels 8 microns on each edge.

In accordance with the above definition of radius r and angle $\theta$, the value of a pixel in the spiral bitmap with coordinates $(r, \theta)$ may be determined in accordance with Formula (3) as follows:

$$\begin{cases} 1 & \text{if } r > R \text{ and } \mathrm{Re}(l(r, \theta)) > 0 \\ 0 & \text{otherwise} \end{cases} \quad (3)$$

In the preferred RPPH arrangement, the adjustable parameters for the reference pattern spiral registration marks 730 and 731 are as follows:

(1) Nyquist radius, R=6.33;

(2) Spiral angle, s=−9.08°; and (3) Phase offset, f=0° for registration marks 730 and f=180° for registration mark 731.

Determining the Accurate Location of a Feature on a Surface

Figure 9:
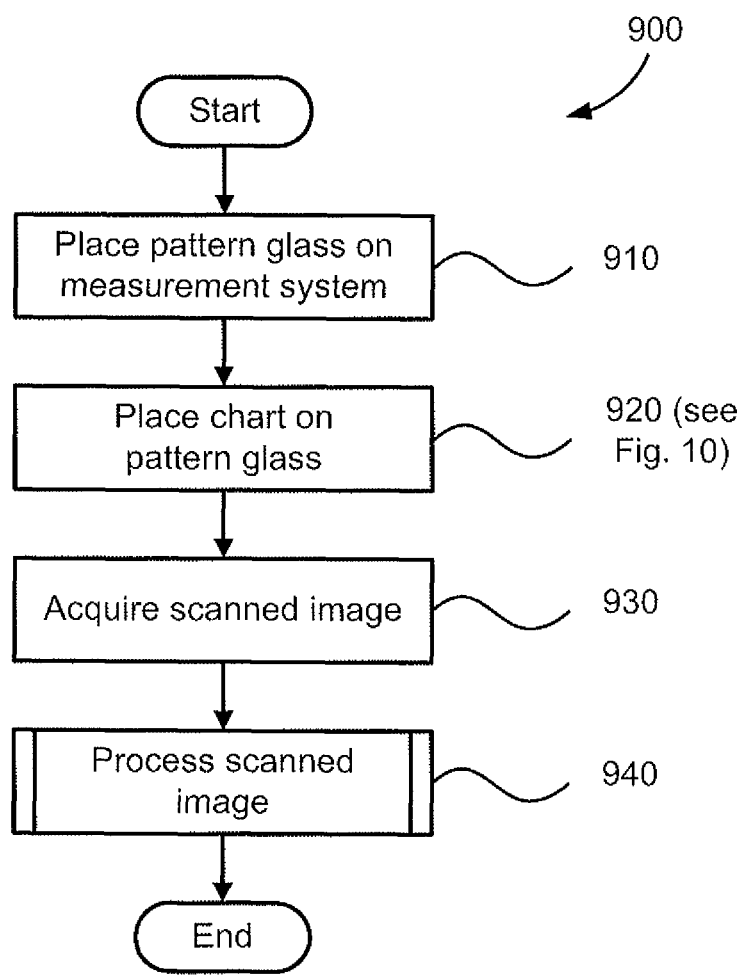
FIG. 9 is a schematic flow diagram illustrating a method to determine an accurate position, on the two-dimensional pattern glass, of a feature of interest (also referred to as a feature)

FIG. 9 shows a method 900 for determining an accurate position on the two-dimensional pattern glass 710 of a feature of interest on a surface.

Figure 10:
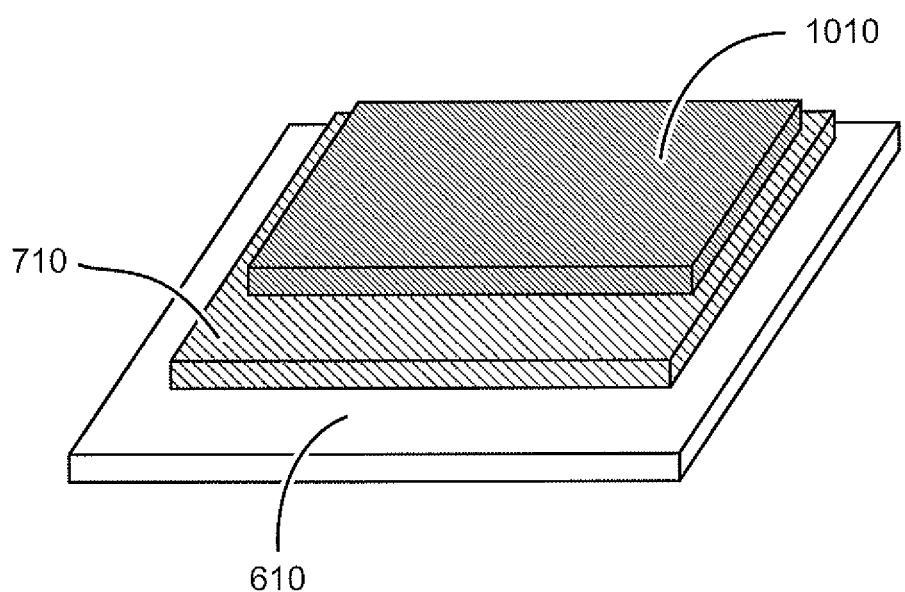
FIG. 10 is a perspective view illustrating the relationship between the two-dimensional pattern glass, the measurement system surface, and the surface to be measured.

The method 900 begins at a step 910 where the two-dimensional pattern glass 710 is placed on the measurement system surface 610 (see FIG. 10). In the preferred RPPH arrangement the pattern glass 710 is usually placed in the middle of the measurement system surface 610, where the optical resolution of the scanner 126 as tested is typically the highest. It has also been found to be advantageous to ensure that the pattern glass 710 and the measurement system surface 610 are clean and free from dust, fingerprints, etc.

In a following step 920, the surface to be measured 1010 is placed on the pattern glass 710 (see FIG. 10).

FIG. 10 illustrates the relationship between the two-dimensional pattern glass 710, the measurement system surface 610 and the surface to be measured 1010. The two-dimensional pattern glass 710 is oriented to place the reference pattern 720 on the surface immediately adjacent to the surface to be measured 1010. For example, in the arrangement illustrated in FIG. 10, the pattern glass is oriented with the reference pattern 720 on the upper surface. Other suitable arrangements between the surface to be measured 1010 and the reference pattern 720 may also be used, depending on the characteristics of the scanner.

Note that the optical resolution and other performance characteristics of the measurement system 600 will not usually be the same in all orientations on the measurement system surface 610. As the orientation of the surface to be measured 1010 on the measurement system surface 610 is changed, the accuracy of a measurement will typically also change. The optimal orientation will depend on the particular characteristics of the measurement system 600 and the measurement being made and should be determined empirically for a particular system.

It has also been found to be advantageous to ensure that the surface to be measured 1010 is flat and that the gap between the surface to be measured 1010 and the two-dimensional pattern glass 710 is as small as practicable.

Figure 11:
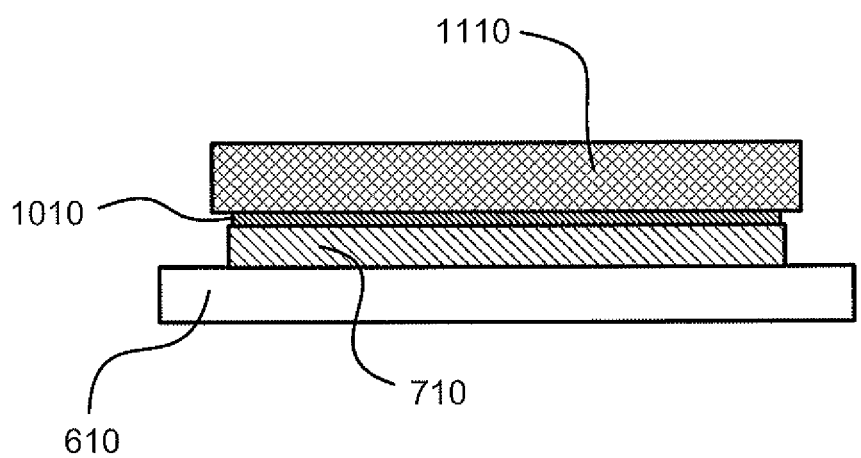
FIG. 11 is a side view of the placement of the head size measurement chart printed on the print medium and the placement of the two-dimensional pattern glass on the scanner.

FIG. 11 illustrates one of the many possible ways to achieve this. As illustrated in FIG. 11, in the preferred arrangement of the RPPH approach, a flat weight 1110 is placed on top of the surface to be measured 1010. Note that too light a weight may not serve the purpose, while too heavy a weight may bend the measurement system surface 610, possibly impairing system accuracy. In the preferred RPPH arrangement the suitable weight should be determined empirically.

The above RPPH examples describe use of the two dimensional ruler 710 having formed thereon the reference pattern 720 as one way of accurately measuring the two dimensional position of one or more features of interest at the surface 610 of the scanner 126. In another RPPH arrangement, the reference pattern may be printed directly onto the surface to be measured 1010, noting that the features of interest are also printed directly onto the surface to be measured 1010. The features of interest may be printed on the surface 1010 after the reference pattern is printed thereon, or this order may be reversed, or the features of interest and the reference pattern may be printed onto the surface 1010 at the same time. The printing of the reference pattern must be performed in a manner which does not introduce an unacceptable amount of distortion in the surface 1010.

Returning to FIG. 9, in a next step 930 of the method 900, a position measurement is performed in the measurement system 600 of FIG. 6 by scanning, and thus imaging, the surface 1010 to be measured through the reference pattern 720 that has been formed on the surface of the two-dimensional pattern glass 710. In the preferred RPPH arrangement, and with the relationship between the surface 1010 to be measured, the pattern glass 710, and the measurement system surface 610 being shown in FIG. 10, any position on the surface 1010 to be measured has a corresponding position relative to the reference pattern 720 and hence the two-dimensional pattern glass 710.

The digital image resulting from the scan, henceforth referred to as the "scanned image" or "scan", is transferred to the computer 101 where the scanned image is stored.

In a final step 940 of the method 900, the scanned image is analysed to determine the measurement result. This analysis will typically entail the determination of locations in the pattern glass 710 of features in the scanned image. The pixels of the scanned image include information resulting from the reference pattern 720. To determine the spatial position relative to the two-dimensional pattern glass 710 of a feature in the scanned image the RPPH application program 133 is executed within the computer 101 which detects and analyses the properties of the pattern 720 around the pixel position of that feature of interest and uses the detected properties to determine the corresponding spatial position on the pattern glass 710. Having regard to FIG. 29, the RPPH approach thus identifies the pixel position 2923 of the feature of interest 2902' and uses the detected reference pattern information 2901', 2903' to determine the corresponding spatial position 2904' which is the reference pattern coordinate associated with the aforementioned position 2923. This process is described in detail below.

The Warp-Map

As a result of distortions in the measurement system 600, locating a pattern mark (e.g. 770) in the scanned digital image can be problematic. In the preferred arrangement of the RPPH approach, this locating task is accomplished using a two-stage process combination of "coarse alignment", and the "fine alignment" to refine the coarse alignment process.

Coarse alignment represents an approximate mapping between the location of a pattern mark 770 in the reference pattern 720 and the corresponding location of the pattern mark in the scanned image. In the preferred RPPH arrangement, coarse alignment uses an affine transformation.

The coarse-alignment affine transform is specified by a matrix A and a vector b and transforms coordinates (x, y) in the reference pattern 720 to coordinates $(x_S, y_S)$ in the scanned image according to Formula (4), below:

$$\begin{pmatrix} x_S \\ y_S \end{pmatrix} = A \begin{pmatrix} x \\ y \end{pmatrix} + b \qquad (4)$$

Since the mapping between locations in the two-dimensional pattern glass and locations in the scanned image is usually more complicated than an affine transform, coarse alignment may not adequately represent the actual transformation. In order to represent this transformation more accurately, a fine alignment transform may be used to apply corrections to locations determined using the coarse alignment transform. Fine alignment transform is a step in the fine alignment stage for locating pattern marks. The fine alignment stage for locating pattern marks includes 3 techniques: the displacement map (described in this section), simulation of the scanned image (described in section "Simulate scanned image pixel") and correlation (described in section "Converting scan coordinates to pattern glass coordinates").

Figure 12:
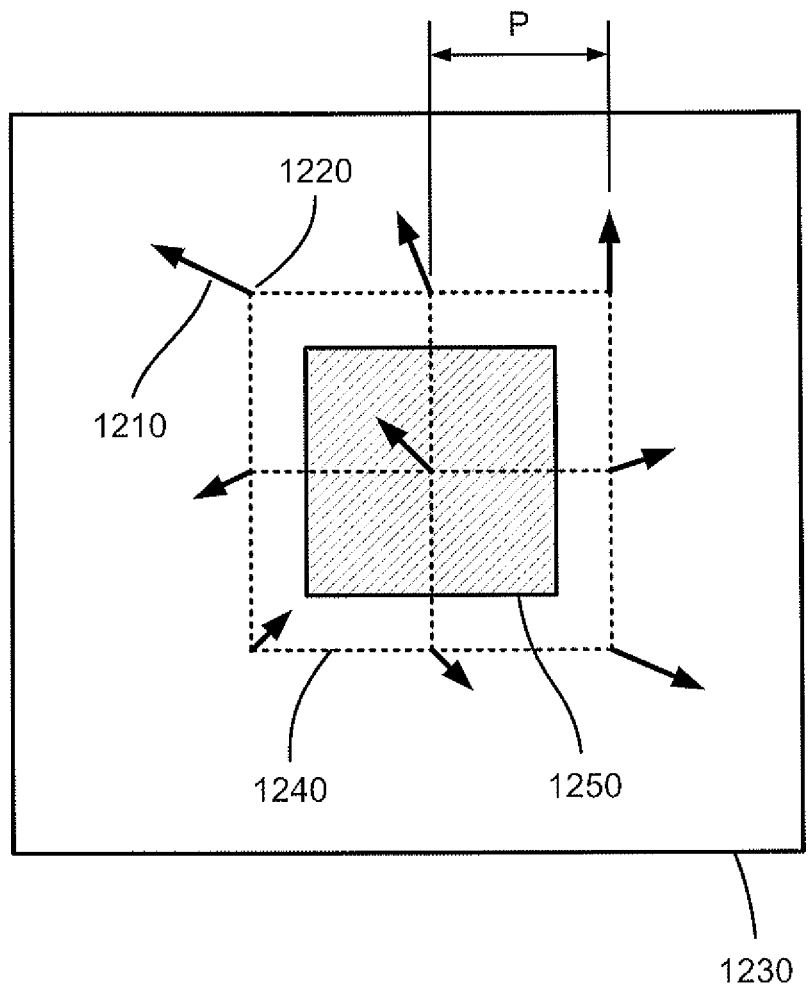
FIG. 12 is a top plan view illustrating a set of displacement vectors which represent the fine alignment transform.

FIG. 12 shows how the fine alignment transform may be represented as a set of displacement vectors (e.g. 1210). Each displacement vector is associated with a location (e.g. 1220) in the scanned image 1230, and measures the amount of shift between the coarsely-aligned reference pattern image and the scanned image at that location. Such a set of displacement vectors may be referred to as a "displacement map", d.

In the preferred RPPH arrangement, the displacement vectors are arranged on a regular grid (e.g. 1240) in the scanned image. The grid step size is the distance between two adjacent displacement vectors in the vertical direction or the horizontal direction. The step size can be the same or different in the two directions. In the preferred arrangement, the grid step size is the same in both directions and is denoted by P. As shown in FIG. 12, the exterior border of the grid 1240 should contain at least the region of interest (e.g. 1250 in FIG. 12 or 2914 in FIG. 29) in the scanned image. The grid step size, P, may be varied. A smaller value of P gives more spatial detail but may reduce the accuracy to which a displacement vector can be determined. As an example, if the region of interest 1250 in the scanned image is a square, 400 pixels on each edge, P might be set to 256 and displacement map grid of three points in each direction, as illustrated in FIG. 12, could be used.

The coarse and fine alignment transforms may be combined into a single "warp map", w. If (x, y) are the coordinates of a pattern mark 770 in the reference pattern 720, then the warp map w maps (x, y) to a corresponding location in the scanned image in accordance with Formula (5) as follows:

$$w(x, y) = \left(A\binom{x}{y} + b\right)^T + d\left(\left(A\binom{x}{y} + b\right)^T\right) \quad (5)$$

where A and b defines the course-alignment affine transform described by Formula (4), and d(x, y) is a function defining the displacement map at arbitrary coordinate (x, y).

However, the displacement map d(x, y) is only defined at a few places, namely the grid point locations (e.g., 1220). In order to determine a value for Formula (5) at other locations, the displacement map d is interpolated. Many methods of interpolation are known in the art. Depending on the number of points in each direction, appropriate methods of interpolation along a particular grid axis might be linear, quadratic or cubic interpolation. In general, cubic interpolation is preferred if there are at least four points available. If there are three points, quadratic interpolation is preferred and otherwise linear interpolation is used.

Determine Locations on the Pattern Glass

Figure 13:
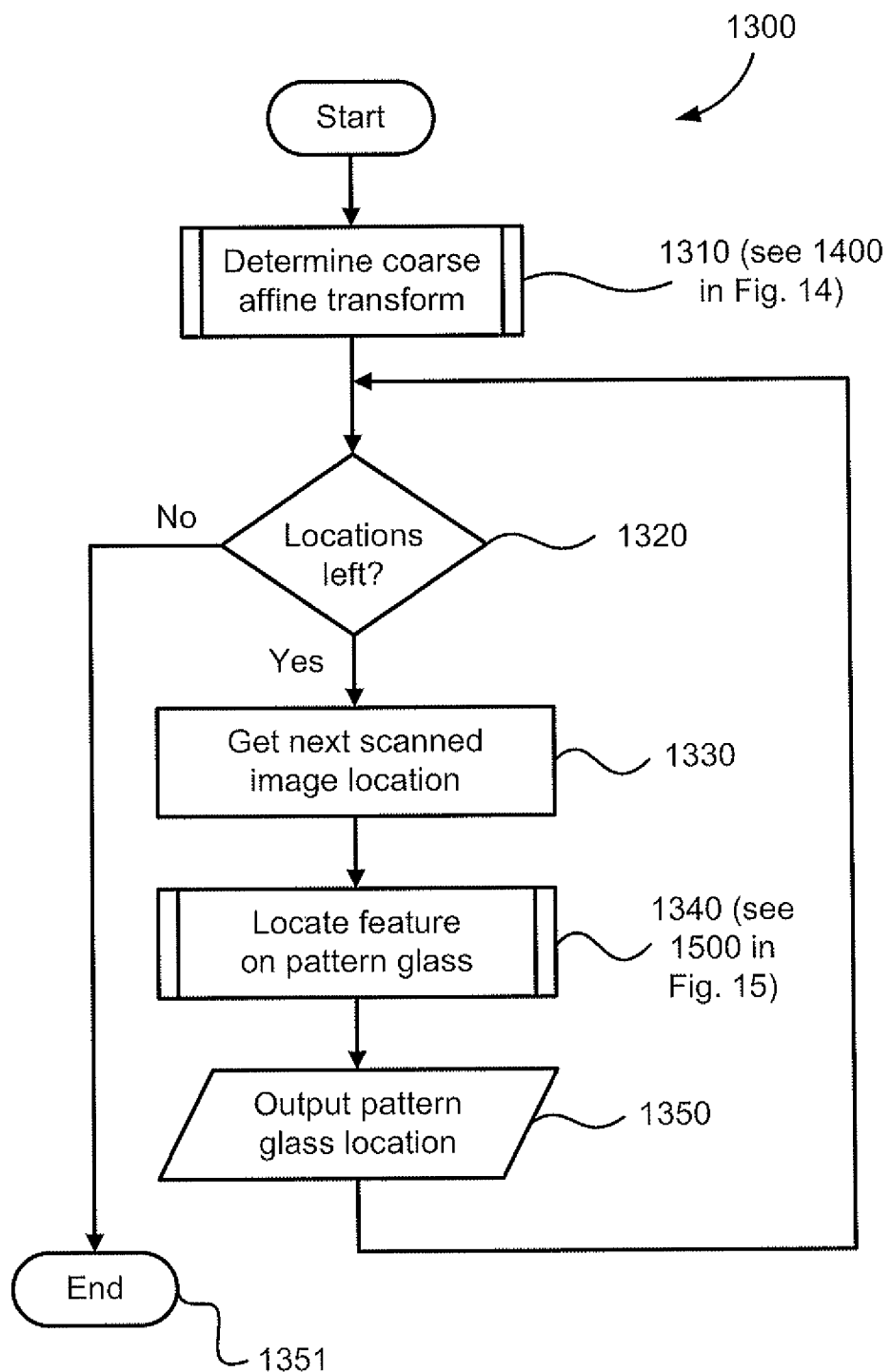
FIG. 13 is a schematic flow diagram illustrating a method of determining the location, relative to the two-dimensional pattern glass, of features in the scanned image.

FIG. 13 is a schematic flow diagram illustrating a method 1300 of determining the location, relative to the two-dimensional pattern glass 710, of features in the scanned image.

In a first step 1310 of the method 1300 the coarse-alignment affine transform described above is determined from the locations of the spiral registration marks 730 and 731.

Figure 14:
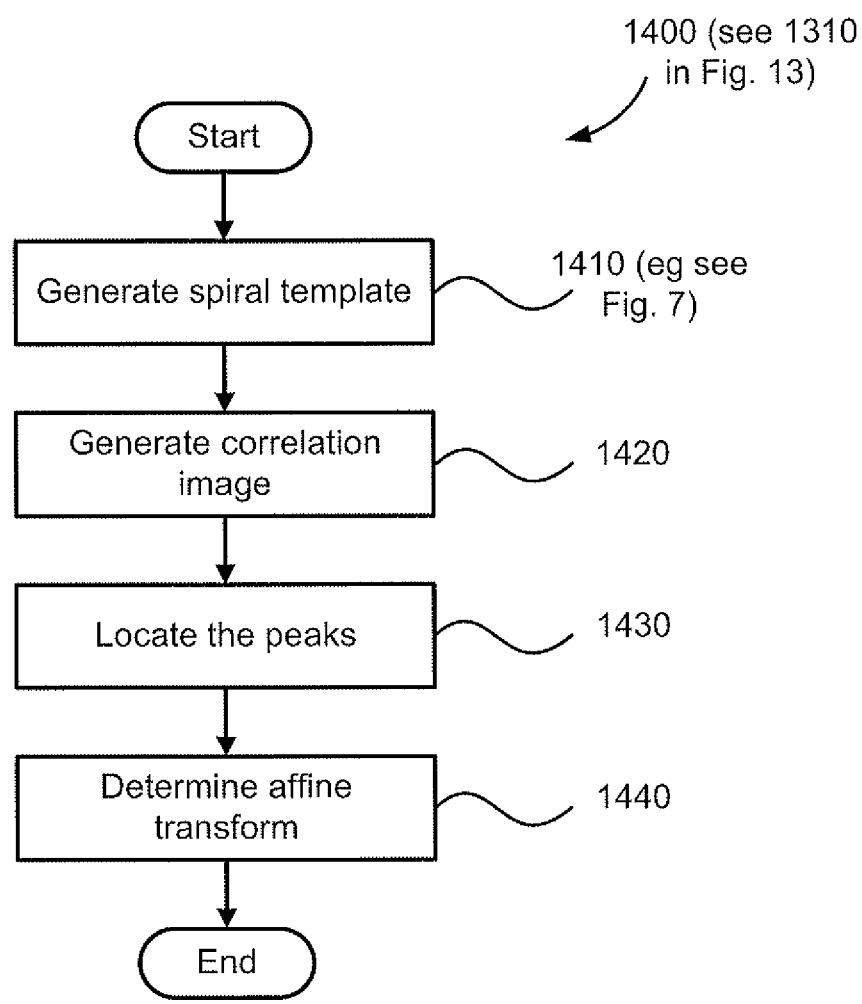
FIG. 14 is a flow diagram of a method to determine the affine transform using spirals.

FIG. 14 depicts a method 1400, that can be used to carry out the step 1310 of the method 1300, of determining the affine transform using the spiral registration marks 730 and 731.

The method 1400 begins at an initial step 1410, where the processor 105 generates a spiral template image of a spiral 730, within the digital memory 106, for example. Each pixel in the spiral template image is complex-valued. Each value is stored as a pair of double-precision floating point numbers representing the real and imaginary parts of the pixel. The spiral template image has height and width equal to $T_s$, the template size. The template size $T_s$ may vary. In the preferred RPPH arrangement, $T_s$ is chosen to make the spiral template image approximately the same size as the spirals in the scanned image. In one example $T_s$=256.

Polar coordinates (r, θ) in the spiral template are defined, with the origin in the centre of the template. The pixel value at polar coordinates (r, θ) in the spiral template image may be determined in accordance with Formula (6) as follows:

$$\begin{cases} e^{j(m\theta + n\ln r)} & \text{if } r > R \\ 0 & \text{otherwise} \end{cases} \quad (6)$$

where m and n are defined by Formulae (2) above and the Nyquist radius R and the spiral angle s have the values used in the generation of the reference pattern 720.

At a next step 1420 of the method 1400 the processor 105 performs a correlation between the scanned image 2918 (see FIG. 29) and the complex-valued spiral template image to generate a correlation image.

The correlation of two images $I_1$ and $I_2$ is a correlation image $I_x$. The correlation image $I_x$ may be determined in accordance with Formula (7) below:

$$I_x(x, y) = \sum_{x', y'} I_1(x', y') I_2(x' + x, y' + y) \quad (7)$$

The sum of Formula (7) ranges over all x' and y' where $I_1$ is defined, and, in the image $I_2$, the values of pixels outside the image are considered to be zero. If either of the images $I_1$ or $I_2$ is complex-valued, the correlation image $I_x$ may be complex-valued too.

The resulting correlation image $I_x$ contains peaks (i.e., pixels with large modulus relative to neighbouring pixels), at the locations of spirals 730 and 731 in the scanned image. The phase of the pixel value of a peak is related to the phase f of a corresponding spiral (e.g. 731) that was included in the reference pattern 720. The three spirals 730 that were generated with f=0 have peaks with similar phase, while the one spiral 731 that was generated with f=p typically has a peak with opposite phase to the peaks of the other three spirals. Since the underlying LRHF of the spirals is scale-invariant and rotation-invariant, detection is robust to rotation and to differences between the resolution of the scanned image and the resolution employed in the fabrication of the pattern glass 710.

At a next step 1430 of the method 1400, the processor 105 examines the correlation image resulting from the step 1420, and locates the peaks corresponding to each of the four spirals 730 and 731 in accordance with the known arrangement of the spirals in reference pattern 720.

At a final step 1440 of the method 1400, the processor 105 determines the affine transform parameters A and b that minimise the error between the known coordinates of the spirals 730 and 731 in the reference pattern, transformed to scanned image coordinates according to Formula (4), above and the corresponding scanned image locations determined in the previous step 1430.

Returning to the method 1300 of FIG. 13, in steps 1320 and the following steps the method 1300 iterates over a set of scanned image locations in the scanned image 2918 for which the corresponding pattern glass 710 location is desired. In other words, these steps iterate over a set of scanned image locations in the scanned image 2918 whose locations are desired.

In the step 1320 the processor 105 determines if there is any such scanned image location for which the corresponding pattern glass 710 location has not yet been determined. If there is such a location then the method 1300 proceeds to step 1330. If there is no such location, the method 1300 concludes at a step 1351.

In a next step 1330 the processor 105 obtains the next scanned image location.

In a following step 1340 the processor 105 locates the scanned image location in the pattern glass 710 according to a method 1500 described in detail below.

Following the step 1340 the desired pattern glass location is saved for subsequent processing in a step 1350. The method 1300 then returns to the step 1320 described previously.

Simulate Scanned Image Pixel

Figure 15:
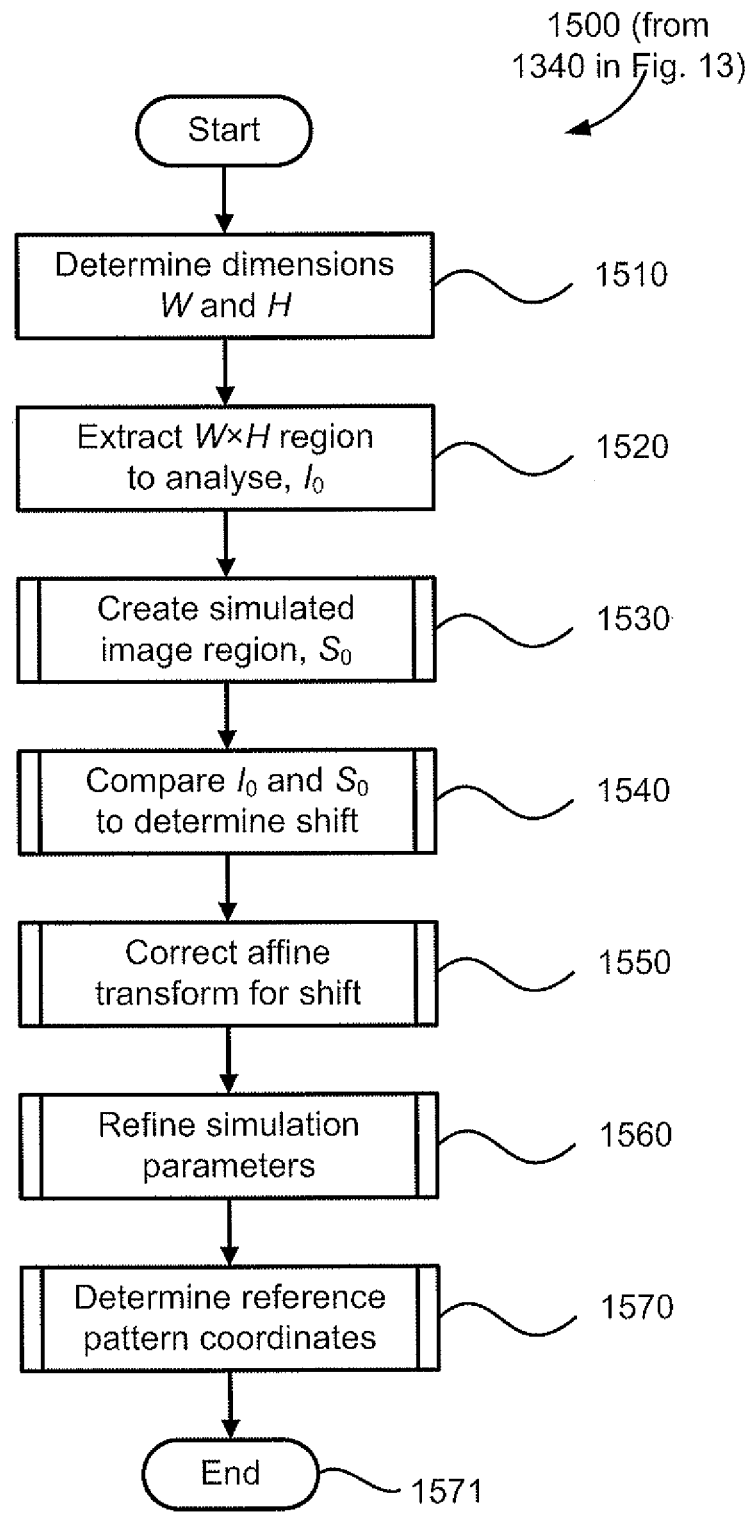
FIG. 15 is a schematic flow diagram illustrating a method of determining accurate coordinates relative to the reference pattern of a given location.

FIG. 15 is a schematic flow diagram illustrating a method 1500 of determining accurate coordinates relative to the reference pattern 720 of a given location in a digital image produced by imaging a chart 1010 through the two-dimensional pattern glass 710 using the measurement system 600 as depicted in FIG. 10.

As described in detail below, in a step 1530 of the method 1500, the processor 105 determines a simulated version of part of the scanned image from the known reference pattern 720 and a set of parameters used to model the process of image acquisition using the measurement system 600. Before describing the method 1500, the simulation process will first be detailed.

In the preferred RPPH arrangement, the appearance in the simulated image of each pattern marking (e.g. 770) in the special pattern 750 is modelled using a two-dimensional Gaussian function. As described previously, the location in the simulated image of a pattern marking (e.g. 770) may be calculated using a warp map. Specifically, the simulation parameters comprise:

(1) The "background" level, B is the value of a scanned image pixel where a hypothetical reference pattern is entirely clear of marks. This value can be approximated by the value of a scanned image pixel distant from any mark on the reference pattern (eg. 5 mm from the nearest mark);

(2) The "foreground" level, F is the value of a scanned image pixel where a hypothetical reference pattern is entirely filled with marks. This value can be approximated by the value of a scanned image pixel distant from any unmarked region of the reference pattern (eg 5 mm from the nearest unmarked region);

(3) the standard deviation of the Gaussian function in the horizontal and vertical directions, $s_x$ and $s_y$, respectively;

(4) the coarse alignment parameters, namely the affine matrix, A, and vector, b; and (5) the fine alignment parameters, namely the displacement map, d.

Let R denote an image of the reference pattern, where R(x, y)=1 indicates the presence of a pattern mark at location (x, y) and R(x, y)=0 indicates the absence of a pattern mark. Then, given the simulation parameters mentioned above, the value, S, of the pixel at location $(x_s, y_s)$ in the simulated image may be calculated according to Formula (8) below:

$$S(x_S, y_S) = B + (F - B) \tag{8}$$

$$\int_{x=-8}^{8} \int_{y=-8}^{8} R(x, y) \frac{e^{-\|(w(x,y)-(x_S,y_S))\text{diag}(s_x,s_y)^{-1}\|^2/2}}{2ps_x s_y} |J_w(x, y)| \, dy \, dx$$

where:

w(x, y) is the warp map calculated according to Formula (5), above;

diag($s_x$, $s_y$) represents a 2×2 matrix with main diagonal coefficients $s_x$ and $s_y$;

∥ ∥ represents the Euclidean norm; and

|$J_w$(x, y)| is the determinant of the Jacobian matrix of w at (x, y).

In the preferred RPPH arrangement, the reference image, R, ie a digital representation of the reference pattern 720 with unspecified pixel size, where the pixels tile (fully cover) the reference image, is represented as a raster array, $R_A$, stored in the digital memory 106 of the computer 100, with each pixel the same size and shape as a special pattern marking (e.g. 770), ie a square 8 microns on each edge. If the number of pixels in the x and y directions are $N_x$ and $N_y$, respectively, then in the preferred RPPH arrangement, R and $R_A$ are related according to Formula (9) below:

$$R(x, y) = \begin{cases} R_A(x_A, y_A) & \text{if } 0 \le x_A < N_x \text{ and } 0 \le y_A < N_y \\ 0 & \text{otherwise} \end{cases} \tag{9}$$

where $x_A$ and $y_A$ are defined as follows:

$$x_A = \left\lfloor \frac{x}{8 \, \mu m} + \frac{1}{2} \right\rfloor \tag{10}$$

$$y_A = \left\lfloor \frac{y}{8 \, \mu m} + \frac{1}{2} \right\rfloor$$

In this case, S may be calculated according to Formula (11) below:

$$S(x_S, y_S) = \tag{11}$$

$$B + (F - B) \sum_{x_A=0}^{N_x-1} \sum_{y_A=0}^{N_y-1} R(x, y) \frac{e^{-\|(w(x,y)-(x_S,y_S))\text{diag}(s_x,s_y)^{-1}\|^2/2}}{2ps_x s_y}$$

$$|J_w(x, y)| \times 64 \, \mu m^2$$

where x and y are defined as follows:

$x = x_A \times 8 \, \mu m$ $y = y_A \times 8 \, \mu m$ \hfill (12)

Converting Scan Coordinates to Pattern Glass Coordinates

The method 1500 of determining accurate coordinates relative to the reference pattern 720 of a given location in the digital image 2918 produced by imaging the chart 2906 through the two-dimensional pattern glass 710 using the measurement system 600 will now be described with reference to FIG. 15.

As described above, a warp map, w, provides a mapping from coordinates in the reference pattern 720 to coordinates in the scanned image 2918. In order to determine accurate coordinates relative to the reference pattern of a given location in the scanned image, the method 1500 first generates a warp map relating a region in the reference pattern to a region including the location of interest in the scanned image and then determines the location in the reference pattern mapping to the location of interest.

In the subsequent discussion, it is assumed that approximate values of the simulation parameters B, F, s, A and b, described previously, are known. For the purposes of the following discussion it is assumed that (1) these approximate values are denoted $B_0$, $F_0$, $s_0$, $A_0$ and $b_0$, respectively, and (2) a uniformly zero displacement map, $d_0$ is defined, according to Formula (13), below:

$$d_0(x, y)=(0, 0) \tag{13}$$

The method 1500 begins at a step 1510, where the processor 105 determines a window width, W, and height, H, in scanned image pixels for subsequent processing. In the preferred RPPH arrangement, W and H typically correspond to distances in the range of 700 microns to 1500 microns.

At a next step 1520 a region, $I_0$, of the digital image 2918, W pixels wide and H pixels high, centred on the input digital image coordinates is extracted from the scanned image. If the coordinates of the first pixel, in scanline order, of the region $I_0$ are denoted $(x_0, y_0)$, then the pixels of $I_0$ are related to the pixels of I according to Formula (14), below:

$$I_0(x, y)=I(x+x_0, y+y_0) \tag{14}$$

In a following step 1530 a new image, $S_0$, also W pixels wide and H pixels high is created in the digital memory 106 of computer 100. The value of each pixel, $S_0(x, y)$, of this image is determined using the simulation parameters $B_0$, $F_0$, $s_0$, $A_0$, $b_0$, and $d_0$ as described above, according to Formula (15), as follows:

$$S_0(x, y)=S(x+x_0, y+y_0) \tag{15}$$

In a next step 1540 $I_0$ and $S_0$ are compared to determine a two-dimensional integer-coordinate translational offset $\Delta_0$, from $I_0$ to $S_0$. Other suitable methods to achieve this are known in the art. In the preferred arrangement of the RPPH approach, phase-only correlation is used.

In a following step 1550 the affine transform vector is adjusted to account for the offset between the scan and simulated scan images according to Formula (16):

$$b_1=b_0-\Delta_0 \tag{16}$$

where $b_1$ is the affine transform vector after adjustment and $b_0$ is the affine transform vector before adjustment.

The method 1500 continues at a next step 1560 where the processor 105 minimises the difference between $I_0$ and the simulated image by varying the simulation parameters B, M, s, and d.

More specifically, the error function, E, to be minimised may be the squared residual error calculated according to Formula (17) as follows:

$$E = \sum_{x=0}^{W-1}\sum_{y=0}^{H-1} (I_0(x, y) - S(x + x_0, y + y_0))^2 \tag{17}$$

Non-linear minimisation requires initial conditions for the variables which are being varied. These initial conditions are defined as follows:
B: Approximate value, $B_0$;
F: Approximate value, $F_0$;
s: Approximate value, $s_0$; and
d: Zero displacement map, $d_0$.

The affine transform parameters are not varied by the minimisation process, but have fixed values as follows:
A: Approximate value, $A_0$; and
b: Adjusted value, $b_1$.

In the preferred RPPH arrangement a non-linear least-squares minimisation scheme, known as the Levenberg-Marquardt method, is used, and it is noted that other suitable methods are known in the art.

The minimisation is performed in a step 1560. In a following step 1570 the processor 105 determines the desired reference image coordinates corresponding to the input digital image coordinates using the refined simulation parameters.

Let the value of the displacement map d corresponding to the minimum value of E be denoted $d_1$. Then the refined warp map, $w_1$, may be calculated according to Formula (18) as follows:

$$w_1(x, y)=A_0(x, y)^T+b_1+d_1(A_0(x, y)^T+a_1) \tag{18}$$

where $a_1$ is the affine transform vector produced by the minimisation step 1560

In order to determine the desired reference image coordinates $(x_R, y_R)$ from $w_1$ and the input digital image coordinates $(x_1, y_1)$, a second minimisation process is used. The error function, e, to be minimised in this step may be calculated according to Formula (19), below:

$$e=\|w_1(x_R, y_R)-(x_1, y_1)\|^2 \tag{19}$$

The initial value of $(x_R, y_R)$ may be calculated from the affine component of $w_1$ according to Formula (20) as follows:

$$(x_R, y_R)_0=A_0^{-1}((x_1, y_1)-b_1) \tag{20}$$

where $(x_R, y_R)_0$ is the the initial value of $(x_R, y_R)$

In the preferred RPPH arrangement, e is minimised by varying $(x_R, y_R)$ using the Simplex algorithm of Nelder and Mead. Other suitable methods are known in the art.

The desired reference image coordinates $(x_R, y_R)$, correspond to the minimum value of e (expected to be 0).

Following step 1570, the method 1500 concludes at a step 1571.

Pixel Masking and Dust, Hair etc. Rejection

The method 1500 is based on the assumption that the digital image region, $I_0$, being analysed may be modelled as dark-colored pattern marks on a uniform light-colored background. It often happens, however, that other marks (referred to as "chart marks") on the chart obscure the pattern marks in some subregion of $I_0$. In addition, it also often happens that dust, hair, etc. between the chart and the two-dimensional pattern glass 710 or between the pattern glass and the measurement system surface 610 is imaged along with the pattern glass and the chart.

In such cases, the accuracy of the reference pattern coordinates determined by method 1500 may be improved by neglecting pixels affected by chart marks, dust or hair, etc.

In the preferred arrangement of the RPPH approach, this is accomplished using a mask image, M, with the same dimensions as $I_0$, stored in the digital memory 106 of the computer system 100. The pixels of the mask image M are set according to Formula (21), below:

$$M(x, y) = \begin{cases} 0 & \text{if pixel } (x, y) \text{ is to be neglected} \\ 1 & \text{otherwise} \end{cases} \tag{21}$$

For the purposes of the subsequent discussion, if the mask image indicates that a given pixel is to be neglected, then the pixel is termed a "masked" pixel, and has a mask image value of zero. All other pixels are termed "unmasked", and have a mask image value of one.

Figure 16:
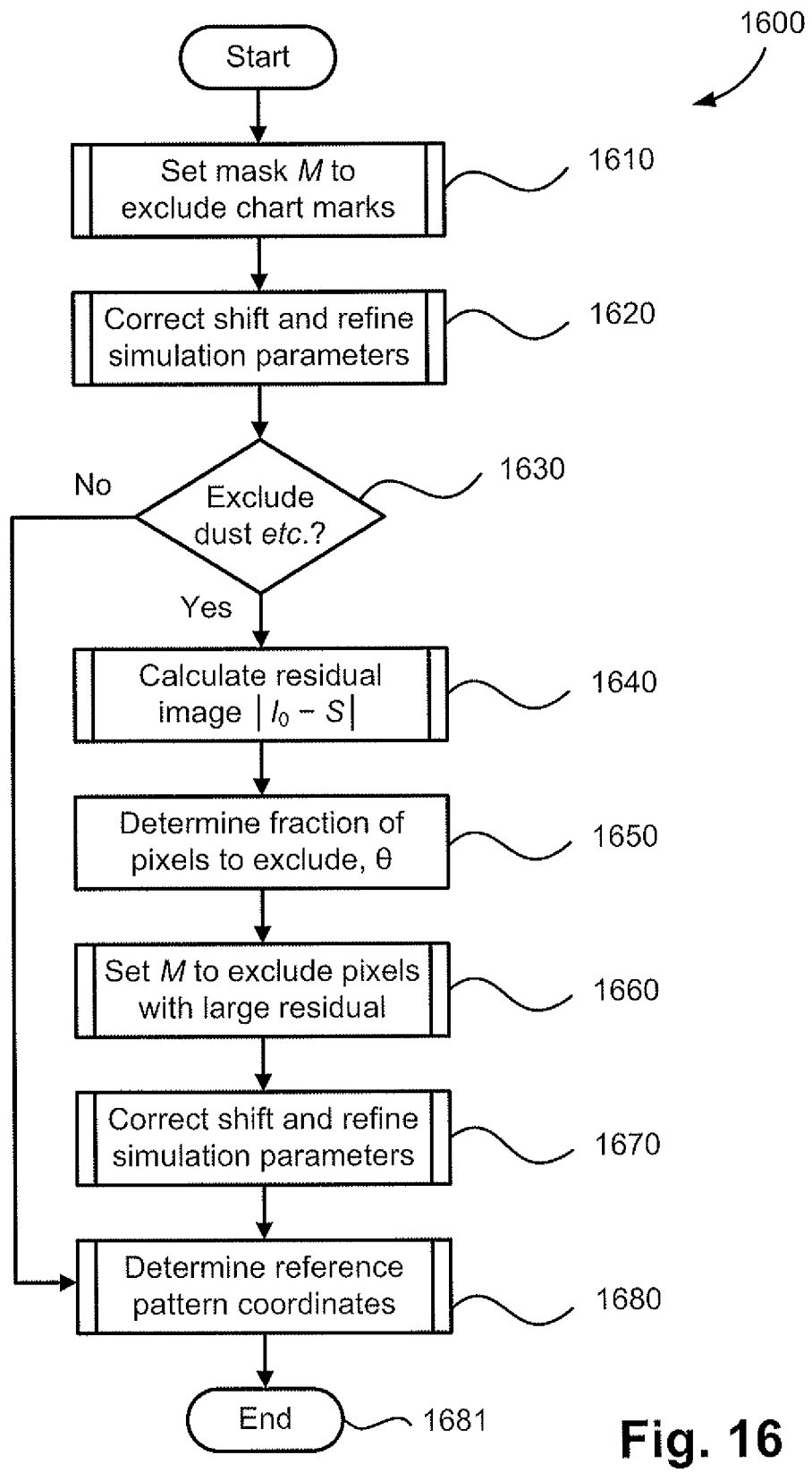
FIG. 16 is a schematic flow diagram illustrating a method to handle unwanted noise.

A method 1600 of determining accurate coordinates relative to the reference pattern 720 of a given location in a scanned image produced by imaging a chart through the two-dimensional pattern glass 710 using the measurement system 600 in the case where some pixels in the region of interest of the digital image are affected by chart marks, dust, hair etc. will now be described with reference to the schematic flow diagram FIG. 16.

Figure 17A:
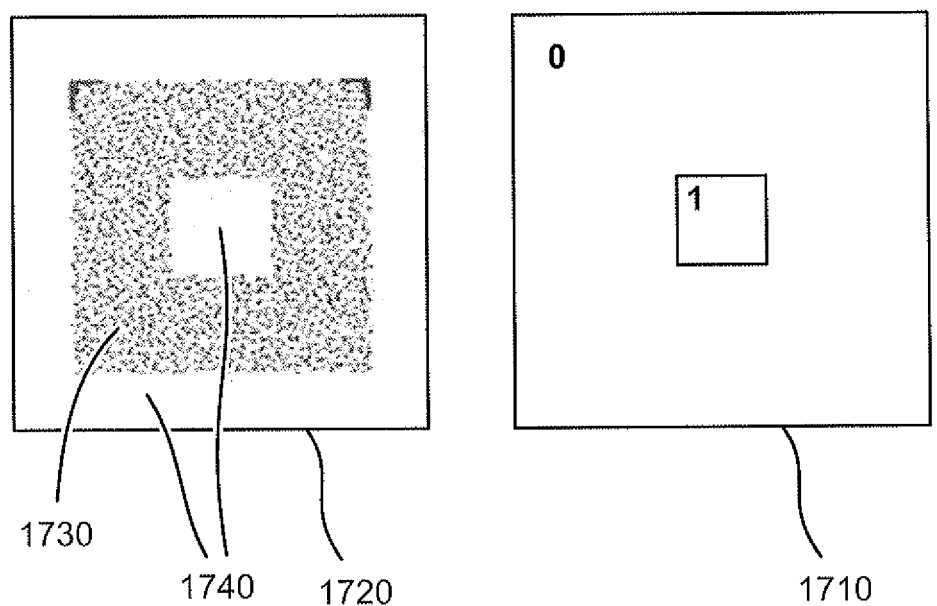
FIG. 17a illustrates a chart mark and a corresponding mask image.

Referring also to FIG. 17*a*, showing an example of a mask where part of the two-dimensional pattern near the centre of a patch is extracted, the method 1600 begins at a step 1610 where the processor 105 sets the mask, e.g. 1710, to 0 where the corresponding pixel in the digital image region $I_0$, e.g. 1720, is determined to be sufficiently close to a chart mark (e.g. 1730) or 1, otherwise (e.g. 1740). Note that all pixels of M may be 1 if it is not initially desired to neglect any pixels in the analysis.

At a next step 1620 the processor 105 determines refined simulation parameters. The step 1620 is identical to steps 1510 to 1560, inclusive, of the method 1500 described previously, save for the following modifications:

(1) in the step 1540 the comparison of $I_0$ and $S_0$ neglects any pixels in $I_0$ for which the corresponding pixel in M has value 0;

(2) in the step 1560 the error function, E, to be minimised is calculated according to Formula (22) as follows:

$$E = \sum_{x=0}^{W-1}\sum_{y=0}^{H-1} (I_0(x,y) - S(x+x_0, y+y_0))^2 M(x,y) \quad (22)$$

In a next step 1630, if it is desired to exclude additional pixels affected by dust etc. the method 1600 proceeds to a step 1640. Otherwise, the method 1600 proceeds to a step 1680.

In the step 1640 the processor 105 calculates a residual image, D. Each pixel in D is the difference between the corresponding pixels in $I_0$ and the image simulated with the refined simulation parameters, according to Formula (23), as follows.

$$D(x,y) = |I_0(x,y) - S(x+x_0, y+y_0)| \quad (23)$$

In a following step 1650 of the method 1600 the processor 105 determines the fraction, θ, of pixels to exclude. In the preferred RPPH arrangement, a typical value of θ is 0.1.

In a next step 1660 the processor 105 sorts the unmasked pixels in D in decreasing order of magnitude. If the initial number of unmasked pixels is denoted n, then the pixels in M corresponding to the first $\lfloor \theta \times n \rfloor$ pixels in the sorted pixels of D are set to 0.

Figure 17B:
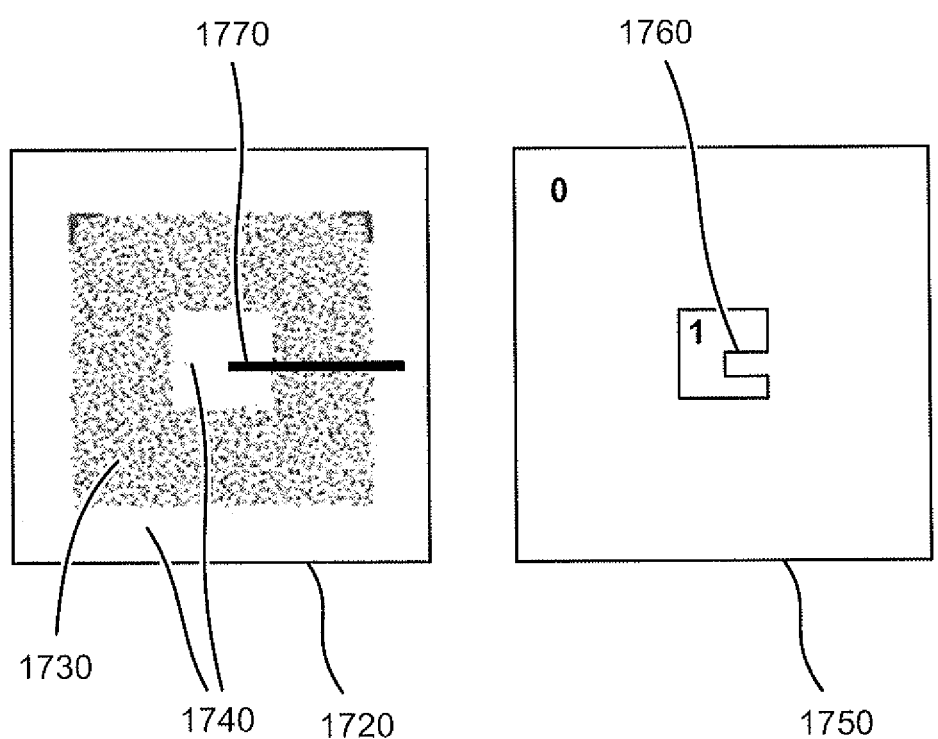
FIG. 17b illustrates a chart mark and a corresponding mask image with a hair obstructing the scanned image.

FIG. 17*b* shows an example of a mask 1750 where part of the two-dimensional pattern near the centre of a patch is extracted, except for a thin and long area 1760 where a piece of hair 1770 is obstructing the two-dimensional pattern in the scanned image.

A next step 1670 of the method 1600 is identical to the step 1620 described previously.

A final step 1680 is identical to the step 1570 of method 1500, described previously.

Following the step 1680, the method 1600 concludes at a step 1681.

First RPPH Arrangement

Figure 18:
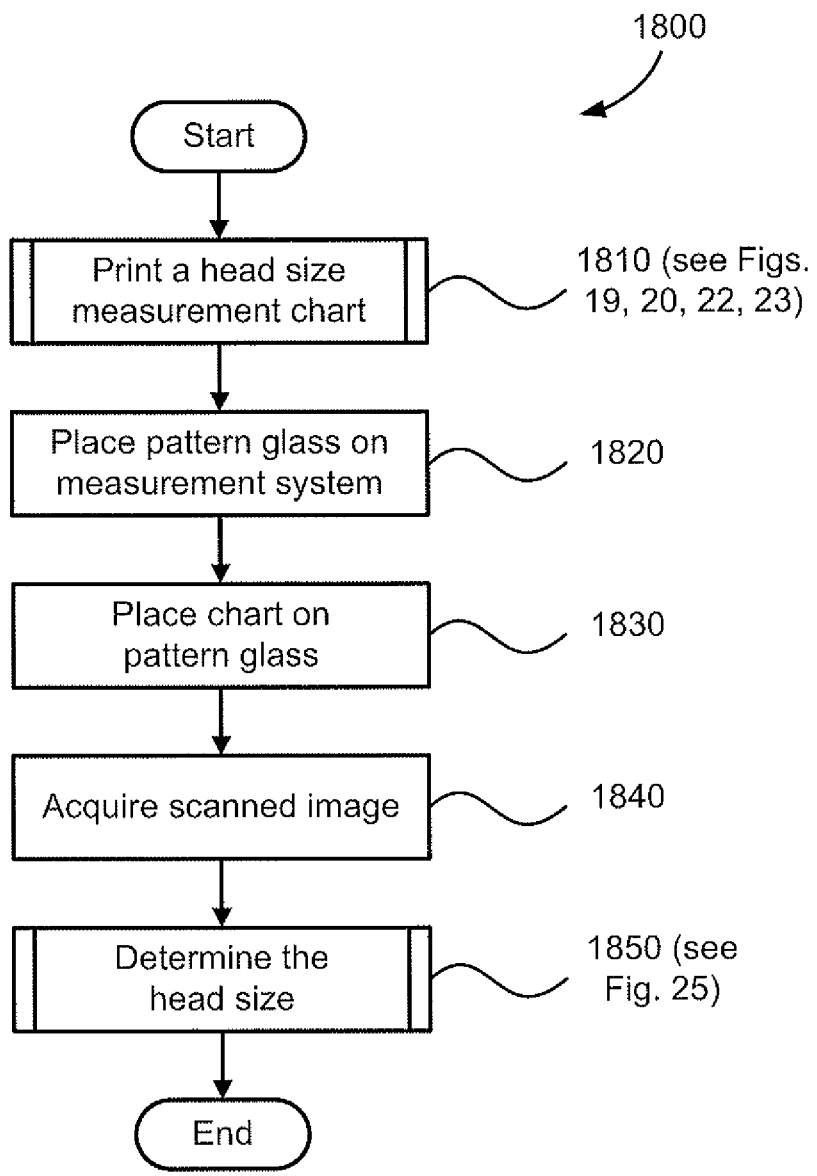
FIG. 18 is a schematic flow diagram illustrating the procedures of measuring the head size.

FIG. 18 is a schematic flow diagram illustrating a method 1800 for accurately measuring the head size 510 according to the RPPH approach.

The method 1800 begins at a step 1810, where a head size measurement chart is printed. The design of the chart and the chart printing process are described in detail below.

In a next step 1820, the two-dimensional pattern glass is placed on the measurement surface 610 as described previously for the step 910 of the method 900.

In a following step 1830, the head size measurement chart is placed on the two-dimensional pattern glass as described above for the step 920 of the method 900.

In a next step 1840, the scanned image is acquired as described for the step 930 above.

In a final step 1850 of the method 1800, the scanned image is processed to determine the desired head size 510. This step will be described in detail below.

It is apparent that the step 1820 of placing the two-dimensional pattern glass on the measurement surface 610 could alternately be performed prior to the step 1810. Further, the step 1820 could be eliminated if the two-dimensional pattern 750 were fabricated onto the glass surface 610 of the scanner.

Chart Design for the First RPPH Arrangement

Figure 19:
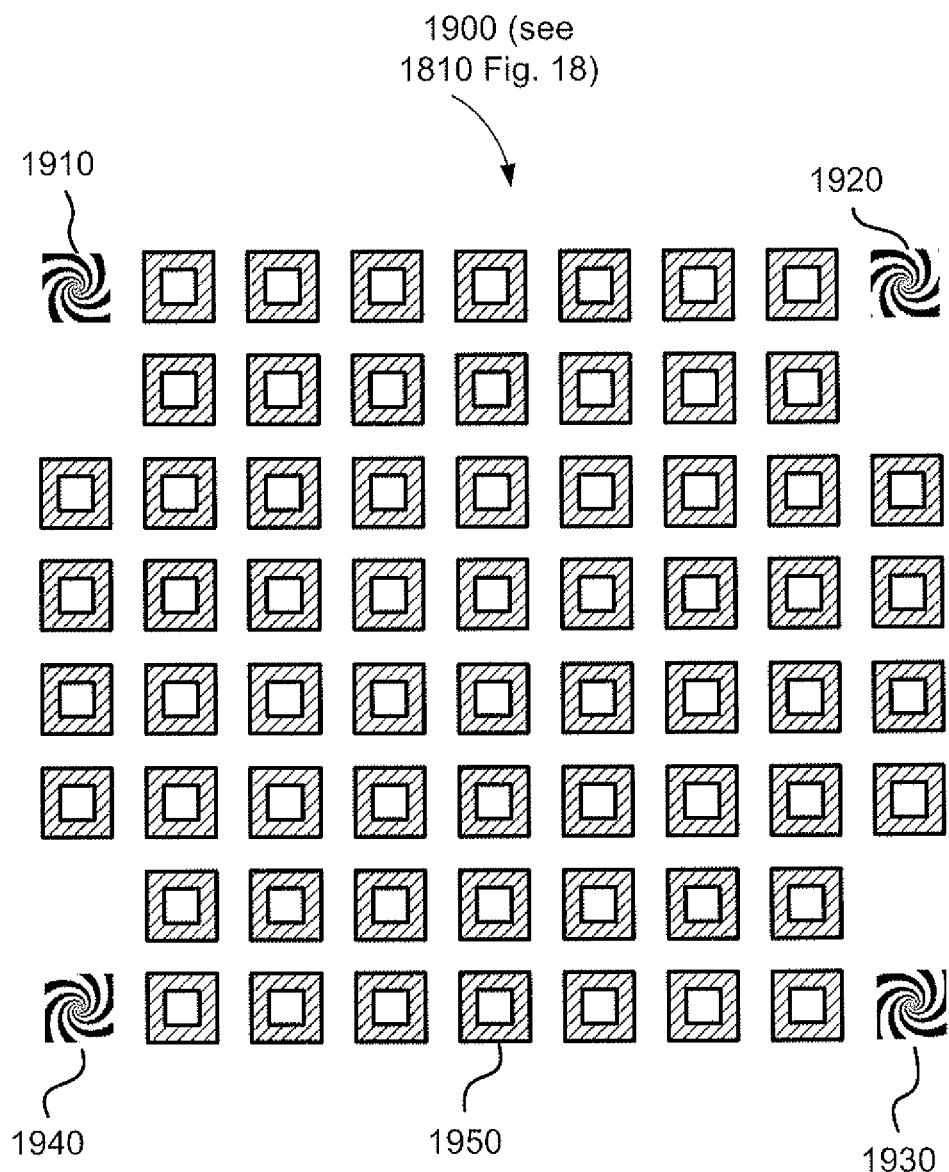
FIG. 19 illustrates an example of a head size measurement chart.

FIG. 19 shows an example of a head size measurement chart 1900. The chart has four LRHF spiral registration marks 1910, 1920, 1930 and 1940 and at least two "patches" 1950, as described below. The chart spiral registration marks are generated as described previously with respect to the reference pattern spiral registration marks 730 and 731 but with different adjustable parameters for ease of distinguishing two-dimensional pattern glass spirals from chart spirals. In this arrangement, the adjustable parameters for the chart spiral registration marks 1910, 1920, 1930 and 1940 are as follows:

(1) Nyquist radius, R=3.82;
(2) Spiral angle, s=30°; and
(3) Phase offset, f=180°, 120°, 60°, and 0° for marks 1910, 1920, 1930 and 1940, respectively.

The spiral registration marks 1910, 1920, 1930 and 1940 are used to detect the location and the orientation of the chart. It is possible to use other types of spirals or even other types of marks (e.g. crosses) to detect the location and the orientation of the chart. Furthermore, it is possible to detect the location and the orientation of the chart using the known pattern and location of the patches.

Patch Design

Figure 20:
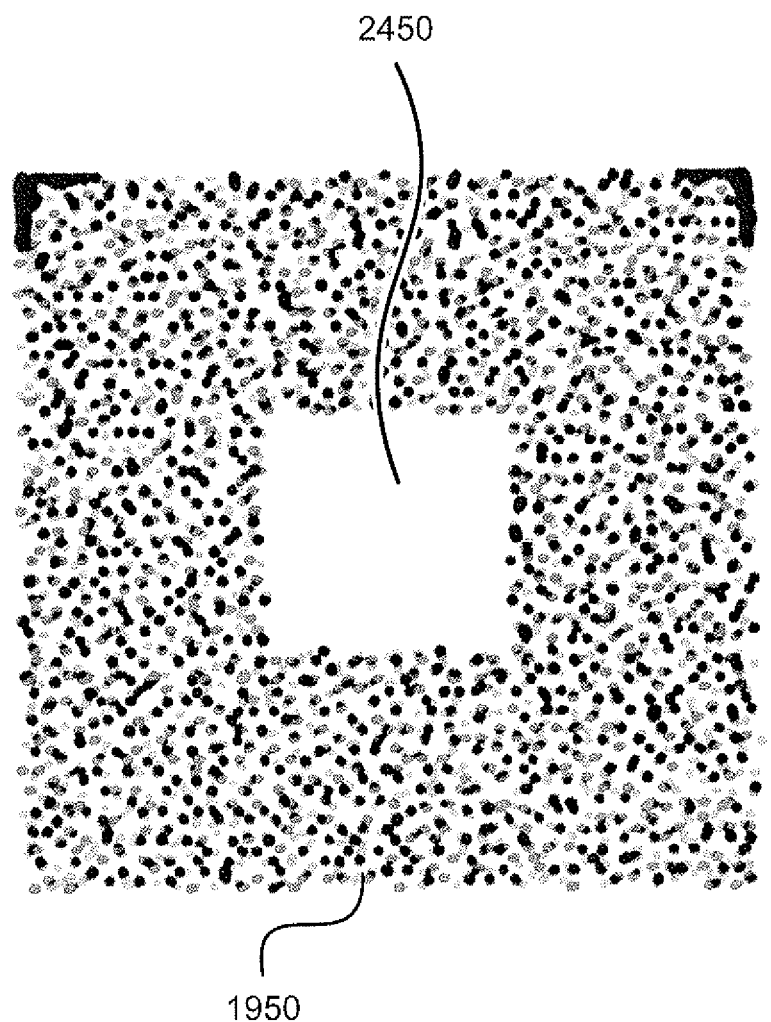
FIG. 20 is an image showing an example of a patch.

FIG. 20 shows a detailed example of a patch 1950. The patch 1950 consists of a group of printed ink dots (referred to as "patch marks", or more generally, "object marks"), with the dots being arranged such that the patch has both spread spatial and spread spectral support. Spread spatial support means that the ink dots are spread out approximately evenly to cover the printed area of a patch. Spread spectral support means that when the patch is represented by its Fourier Transform, the resulting frequency components spread out approximately evenly over the Fourier Transform representation. The patch, or more generally the graphic object of interest, is referred to as a second type of two-dimensional pattern. When correlated with a similar patch, this will result in a distinct, sharp correlation peak.

The area near the centre of the patch is void of printed dots. This area is called a hole, or more generally a separation area 2450. In general it is advantageous for the separation area 2450 to be near the centre of the patch, ie. near to or in the vicinity of the point of interest (eg the location coordinate 2923 in FIG. 29), to minimise effects of spatial scanner distortion in the measurement system 600. The definition of the location of a patch is chosen by the designer of the measurement system. However it is advatageous to define the location of a patch to be near the centroid of the patch since the errors due to scanner distortions are reduced. More generally, wherever the location of a graphical object is defined to be, the separation area should advantageously be located in the vicinity of or on this defined location of the graphical object.

The patches are printed by the nozzles of the to-be-measured head 210. The color or colors on the patches depends on the color or colors of the ink ejected by the nozzles. In the present RPPH arrangement, the patch is formed from cyan and magenta ink, but other colors can be used. In one example, the patch is a square, 3 mm on each edge.
Describe Correlation One aspect of the analysis of the head size measurement chart 1900 is the calculation of the relative locations of pairs of patches. Many methods of performing this calculation are known in the art. In the present RPPH arrangements, phase-only correlation is used, with the correlation peak located to subpixel resolution by Fourier interpolation. Other shift estimation methods such as gradient based shift estimation can be used instead. In such cases, the patch 1950 could be re-designed to ensure the best performance for the alternative shift estimation method.

Figure 21:
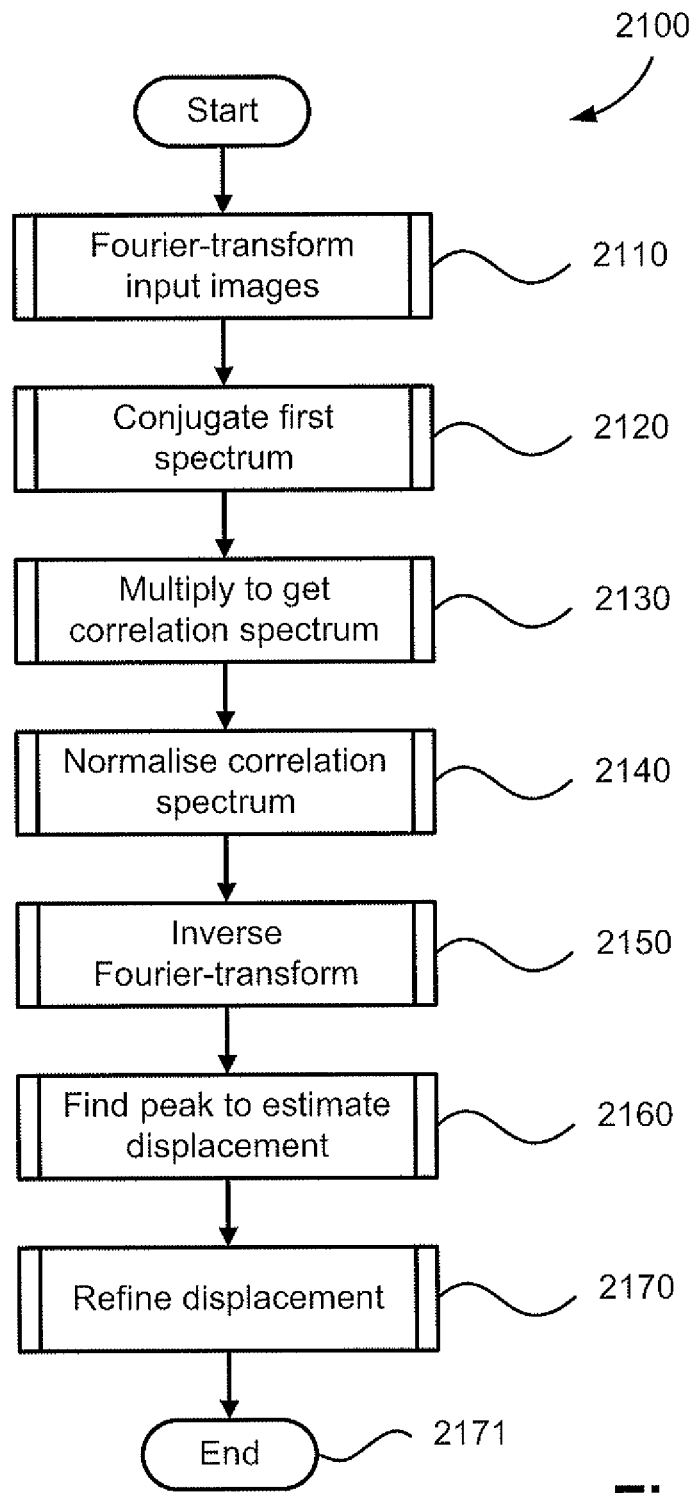
FIG. 21 is a schematic flow diagram illustrating a method of estimating the displacement of two image regions by correlation.

FIG. 21 is a schematic flow diagram illustrating a method 2100 of estimating the displacement of two equal-sized image regions by correlation. For the purposes of the following discussion, let the image regions be denoted $I_1$ and $I_2$ and the calculated average displacement between corresponding features in the image regions be denoted d. Further, let the width in pixels of each image region be denoted w, let the height in pixels be denoted h, let the uppermost leftmost pixel of each image region have coordinates (0, 0) with the first, x, coordinate increasing to the right and the second, y, coordinate increasing downward.

The method 2100 starts at a first step 2110 where a two-dimensional Fourier transform is applied to images $I_1$ and $I_2$ to form the spectra $S_1$ and $S_2$ respectively, according to Formulae (23b), below:

$$S_1(k, l) = \sum_{x=0}^{w-1}\sum_{y=0}^{h-1} I_1(x, y)e^{2pi\left(\frac{kx}{w}+\frac{ly}{h}\right)} \quad (23b)$$

$$S_2(k, l) = \sum_{x=0}^{w-1}\sum_{y=0}^{h-1} I_2(x, y)e^{2pi\left(\frac{kx}{w}+\frac{ly}{h}\right)}$$

where (k, l) is an arbitrary tuple of frequency components in a Fourier Spectrum (x, y) is a set of coordinates of an arbitrary pixel in an image w and h are the image width and height i is the imaginary number unit Both spectra $S_1$ and $S_2$ are two-dimensional, complex-valued images the same size as $I_1$ and $I_2$ but with the uppermost leftmost pixel coordinate of $(-\lfloor w/2 \rfloor, -\lfloor h/2 \rfloor)$.

In a next step 2120 of the method 2100, a conjugated spectrum $S_1^*$ is formed from the spectrum $S_1$ by negating the imaginary part of each pixel according to Formula (23c) as follows:

$$S_1^*(x, y)=(S_1(x, y))^* \quad (23c)$$

In a following step 2130, the two complex spectra $S_1^*$ and $S_2$ are pixel-wise multiplied to form a correlation spectrum E according to Formula (23d), below:

$$E(x, y)=S_1^*(x, y)S_2(x, y) \quad (23d)$$

The correlation spectrum E is further processed in a next step 2140 where each pixel of the complex-valued correlation spectrum E is scaled to an amplitude of one to form a normalised correlation spectrum $\hat{E}$ according to Formula (23e), below:

$$\hat{E}(x, y) = \begin{cases} \frac{E(x, y)}{|E(x, y)|} & \text{if } |E(x, y)| > 0 \\ 0 & \text{otherwise} \end{cases} \quad (23e)$$

In a following step 2150 of the method 2100 a two-dimensional inverse Fourier transform is applied to the normalised correlation spectrum $\hat{E}$ to form a correlation image C according to Formula (23f), as follows:

$$C(x, y) = \sum_{k=-\lfloor\frac{w}{2}\rfloor}^{w-1-\lfloor\frac{w}{2}\rfloor}\sum_{l=-\lfloor\frac{h}{2}\rfloor}^{h-1-\lfloor\frac{h}{2}\rfloor} \hat{E}(k, l)e^{-2pi\left(\frac{kx}{w}+\frac{ly}{h}\right)} \quad (23f)$$

The pixel with the largest absolute amplitude in the correlation image C is located in a next step 2160. If the width of image C in pixels is denoted w and the height in pixels is denoted h, the coordinates $(m_x, m_y)$ in image C of this pixel are then converted to a first estimate $d_0$, in image pixels, of the displacement of features in image $I_2$ relative to corresponding features in image $I_1$ according to Formula (23g), as follows:

$$d_0 = \left(m_x - w\left\lfloor\frac{2m_x}{w}\right\rfloor, m_y - h\left\lfloor\frac{2m_y}{h}\right\rfloor\right) \quad (23g)$$

In a following step 2170 of the method 2100, this initial estimated displacement is refined to sub-pixel resolution using a maximisation process.

Given a displacement d, initially equal to the value $d_0$ calculated in the previous step 2160, the function, γ, to be maximised in this step is the Fourier-interpolated correlation image C at location d. The function γ may be calculated according to Formula (23h), below:

$$\gamma(x, y) = \sum_{k=-\lfloor\frac{w}{2}\rfloor}^{w-1-\lfloor\frac{w}{2}\rfloor}\sum_{l=-\lfloor\frac{h}{2}\rfloor}^{h-1-\lfloor\frac{h}{2}\rfloor} \hat{E}(k, l)e^{-2pi\left(\frac{kx}{w}+\frac{ly}{h}\right)} \quad (23h)$$

In the preferred RPPH arrangement, γ is maximised by varying d using the Simplex algorithm of Nelder and Mead, but other suitable methods are known in the art.

Following step 2170, the method 2100 concludes at a step 2171.
Print the Head Size Measurement Chart FIGS. 22 and FIG. 23 illustrate how the printing process of a chart according to the procedure of FIG. 18 may be used to measure the head size 510.

Figure 22:
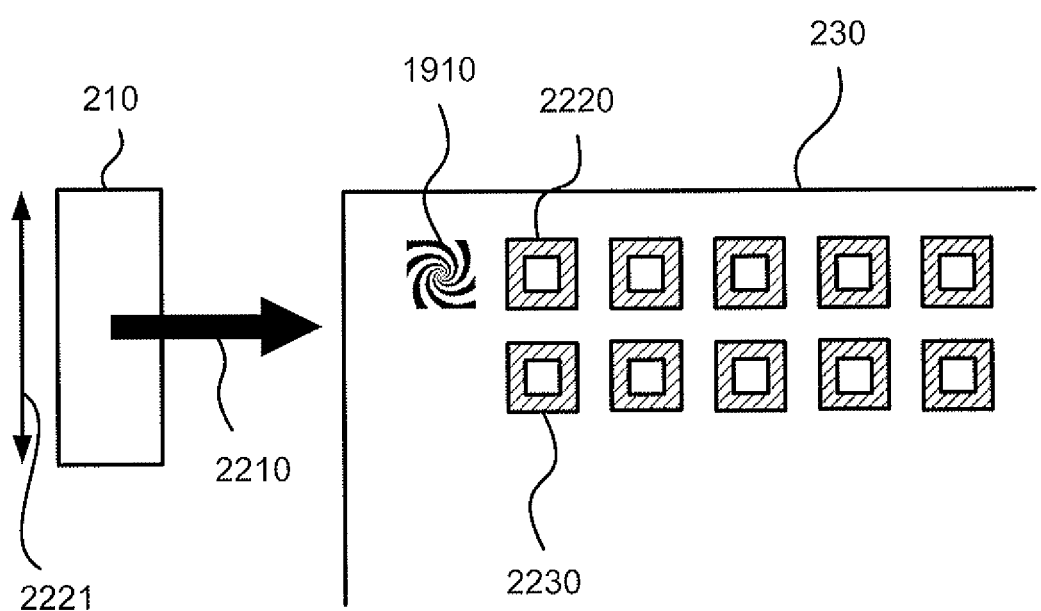
FIG. 22 and FIG. 23 illustrate how the printing process of a chart according to the procedure of FIG. 18 may be used to measure the head size.

Referring first to FIG. 22, the print head 210 (which in FIG. 22 is wide enough, as depicted by a reference numeral 2221, to print a pair of patches 2220, 2230 during a single passage) makes a passage 2210 across the printing medium 230, which is in a first position, and records (prints) at least two patches, e.g. 2220 and 2230, arranged according to the patch layout shown in FIG. 19. As described previously with reference to FIG. 5, the distance between the patches in a pair of patches, such as the pair 2220 and 2230, is the desired head size 510.

Figure 23:
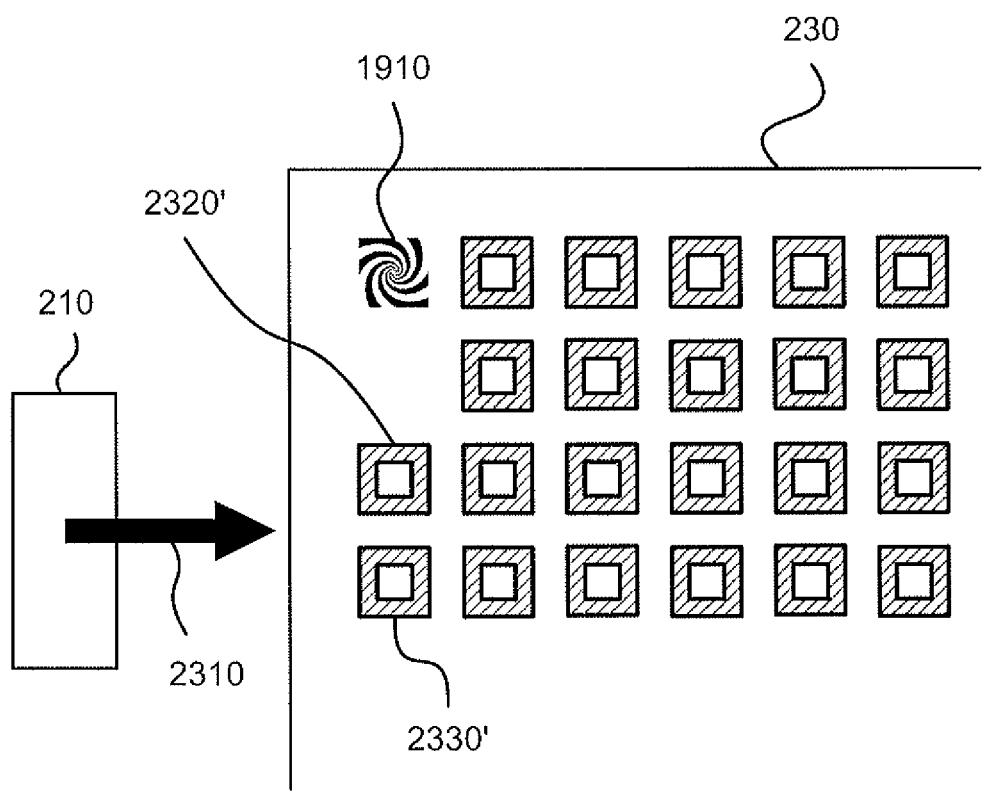

Referring now to FIG. 23, the printing medium advance mechanism 250 then moves the printing medium 230 to a second position, and a second passage 2310 of the print head 210 records further patches, e.g. 2320' and 2330'. In the preferred RPPH arrangement, the complete measurement chart 1900 is printed after four passages of the print head 210. Note that the printing process may be different for different printers, for example, the passages 2210 and 2310 may be forward passages, backward passages or a combination.

An alternative chart design to measure head size can include just a single pair of patches. However in the present RPPH arrangement a plurality of pairs of patches are printed, as described above, to improve the accuracy of the head size measurement by the use of statistics.

Acquire the Scanned Image

Figure 24A:
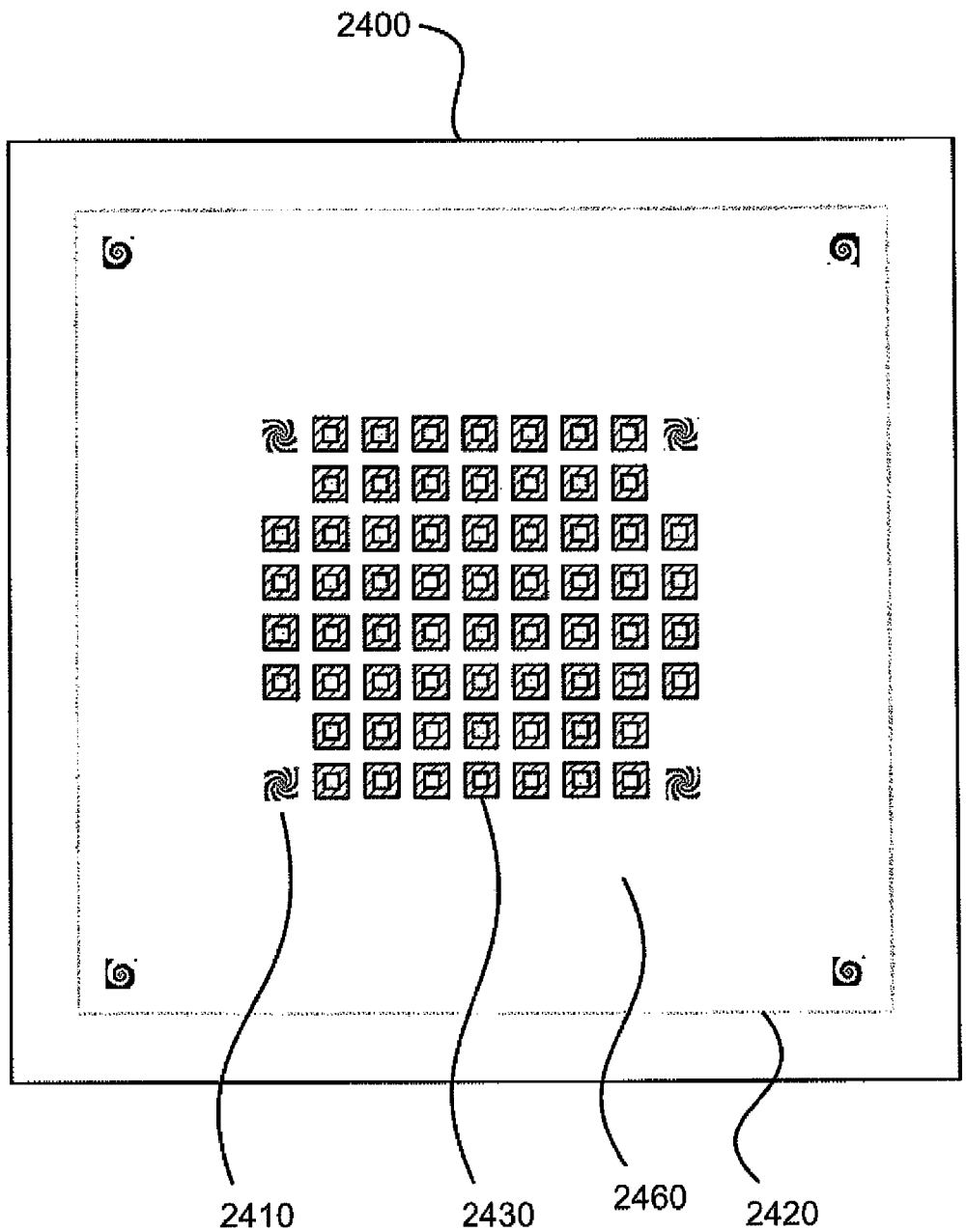
FIG. 24a illustrates an example of a scanned image.

FIG. 24*a* illustrates a scanned image 2400 (also see 2918 in FIG. 29) of the head size measurement chart 1900 imaged through the two-dimensional pattern glass 710. In the scanned image 2400, the image of the reference pattern 2420 is superposed on the image of the head size measurement chart 2410. On the scanned image 2400, individual patches 2430 can be seen.

The scanner resolution must be carefully chosen to accommodate the best accuracy with respect to the size of the dots (ie pattern marks) in the two-dimensional pattern glass 710 and with respect to the size of the dots (ie patch marks) in the patches 1950. In the preferred arrangement, the scan is acquired at a scan resolution of 2400 pixels per inch.

Figure 24B:
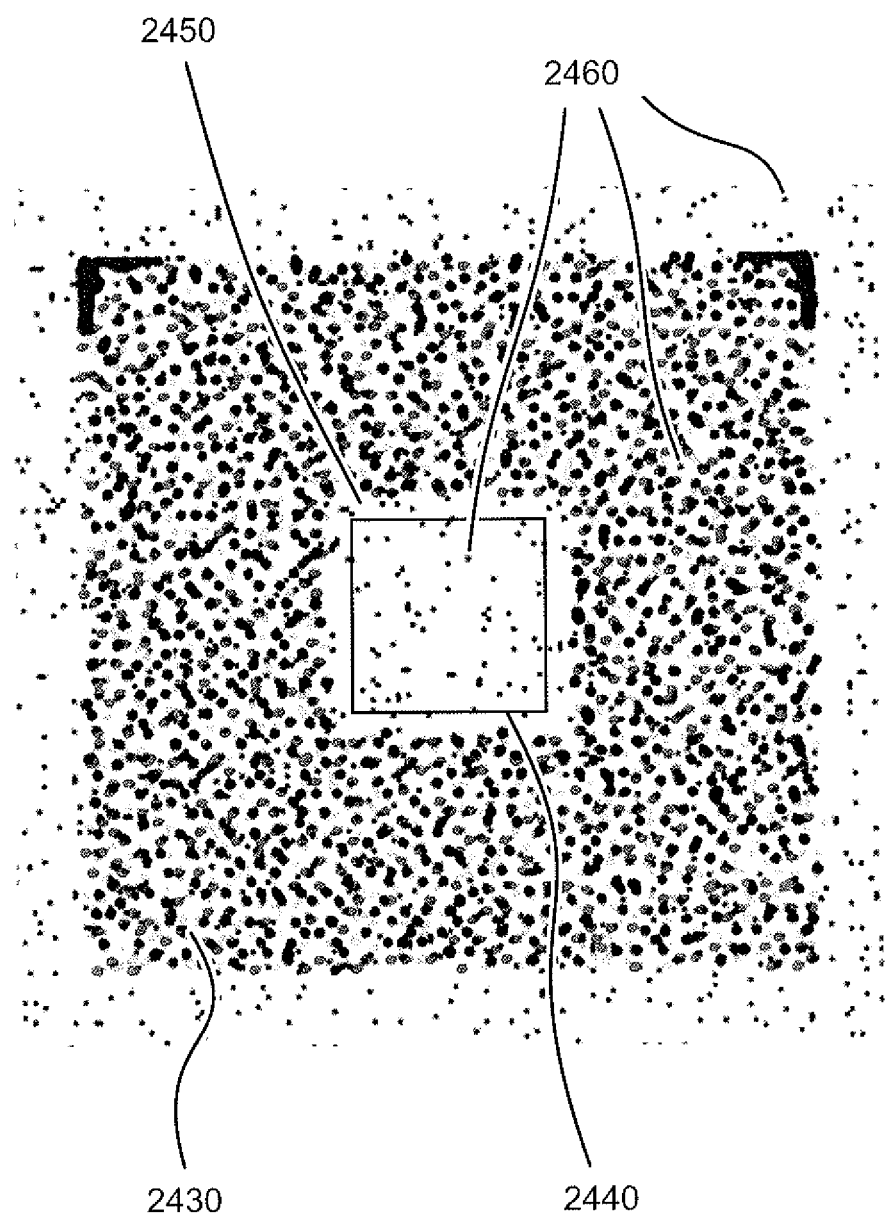
FIG. 24b illustrates an enlargement of a scanned image of a patch and the separation area in a patch.

FIG. 24*b* illustrates an enlarged portion of the scanned image 2400, showing a patch 2430 with the image 2460 of the unobstructed two-dimensional reference pattern 750 showing through in the separation area 2450. The image 2460 of the pattern marks on the two-dimensional reference pattern are also superposed on the image of the patch marks from the patch 2430.

Analyse the Scanned Image to Determine the Head Size

Figure 25:
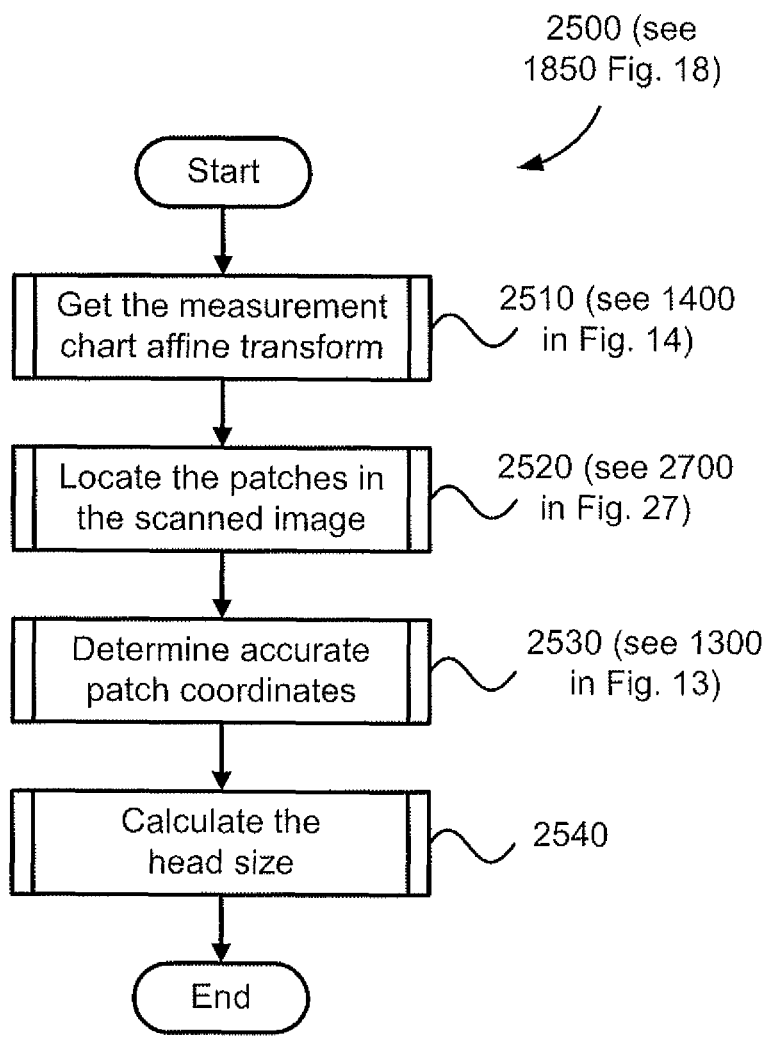
FIG. 25 is a schematic flow diagram illustrating a method of analysing the scanned image to determine the head size according to one RPPH arrangement.

FIG. 25 shows a flow chart for a method 2500 of analysing the scanned image 2400 to determine the head size 510. This method 2500 can be used to carry out the step 1850 of the method 1800.

The method 2500 begins at a step 2510 where an affine transform between the coordinates of the measurement chart 1900 and the coordinates of the scanned image 2400 is determined This is accomplished according to the method 1400 as described previously except that the LRHF registration mark adjustable parameters and locations used are those for the chart spiral registration marks 1910, 1920, 1930 and 1940 rather than the reference pattern spiral registration marks 730 and 731.

Let the parameters of the affine transform be the matrix $A_C$ and the vector $b_C$. Then the affine transform relates coordinates in the measurement chart 1900, $(x_C, y_C)$ to coordinates in the scanned image 2400, $(x_S, y_S)$ according to Formula (24), below:

$$\begin{pmatrix} x_S \\ y_S \end{pmatrix} = A_C \begin{pmatrix} x_C \\ y_C \end{pmatrix} + b_C \qquad (24)$$

As described previously, the parameters of the affine transformation could also be determined using other marks on the measurement chart such as the patches, e.g. 1950.

Referring again to FIG. 25, at a next step 2520 the processor 105 determines the coordinates in the scanned image 2400 of each patch.

Figure 26:
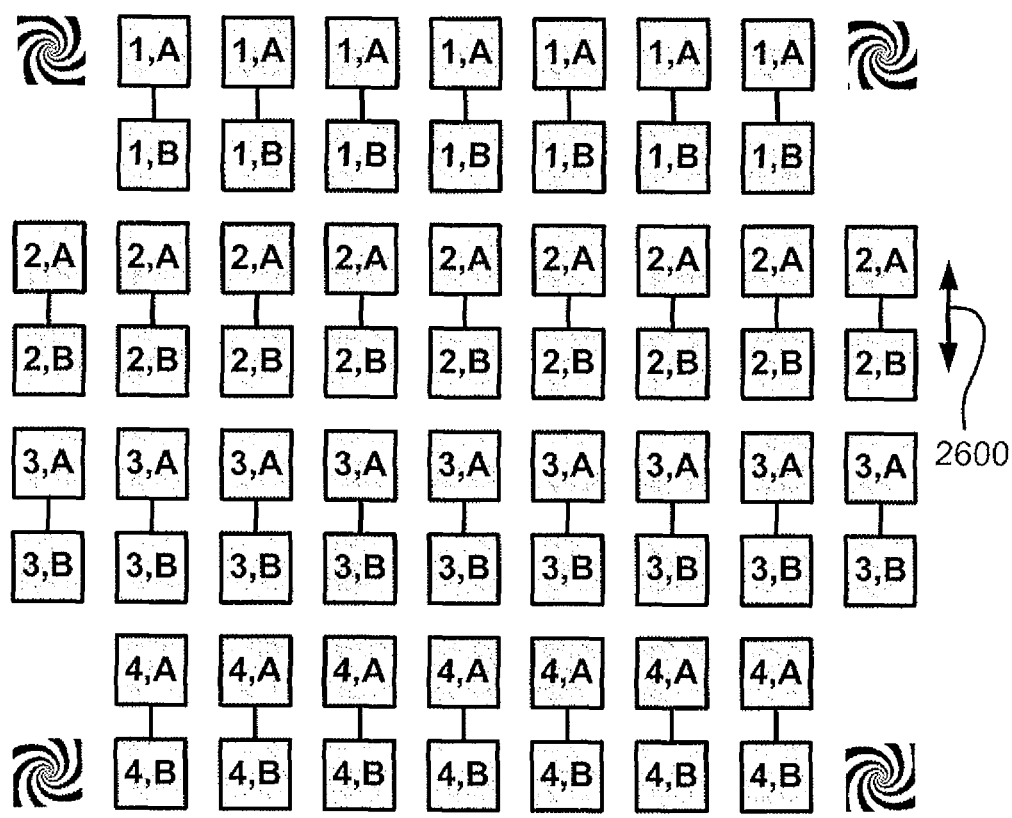
FIG. 26 is the head size measurement chart as depicted in FIG. 19, but each patch is labelled with a number and a character.

FIG. 26 shows again the head size measurement chart 1900 but with each patch labelled with a number and a character. The number indicates the passage in which a given patch is printed. The character indicates which nozzles of the print head 210 are used to print the patch. For example, 'A' may refer to the nozzle group 520 and 'B' to the nozzle group 530 in FIG. 5. Lines are drawn between patches that are printed at the same time. The distance (depicted illustratively by an arrow 2600) between a patch printed by nozzle group 'A' and the patch printed at the same time by nozzle group 'B' is the head size 510.

In a step 2520, the processor 105 locates each patch in the scanned image 2400. This step will be described in detail below.

After determining the location of each patch in step 2520, a next step 2530 of the method 2500 determines the coordinates of each patch relative to the two-dimensional pattern glass 710. This may be accomplished according to the method 1300 described previously.

Note that the method 1300 uses the method 1500. Referring again to FIG. 24*b*, note further that in the steps 1510 and 1520 of the method 1500, the dimensions W and H and the region to extract from the scanned image correspond to the extraction region 2440. This extraction region 2440 can be slightly smaller than the separation area 2450 so that the extracted region does not include images of the dots belonging to the patch 2430 outside the separating area 2450. The centre of the extraction region 2440 is based on the computed patch centre coordinates in the step 2520 of the method 2500.

Referring again to FIG. 20, note that in general the accuracy of the estimated shift between patches (and hence the coarse estimation of the location coordinate 2923) depends on the size of the area with patch dots (ie patch marks) 1950 (see FIGS. 19 and 20). The term "shift" represents a required displacement of one extracted image of a patch in order to match the extracted image of another patch. Similarly the accuracy of the two-dimensional reference pattern matching operation (ie the accurate estimation of the reference pattern coordinate 2904') depends on the size of the area of the extraction region 2440 (see FIG. 24*b*) and hence on the separation area 2450 (see FIGS. 20 and 24*b*). For a given patch area, as the separation area 2450 increases in size, the area used for patch dots 1950 decreases in size and vice versa. Therefore in the RPPH approach, there is a trade-off between the separation area 2450 and the area with patch dots 1950. A large separation area 2450 reduces the accuracy of the patch analysis (which provides the approximate locations of patches) and a small separation area 2450 reduces the accuracy of the two-dimensional reference pattern analysis (which provides the accurate locations of patches). In the present RPPH arrangement, the optimum size of the separation area 2450 is chosen by empirical experiments. For a patch size of 3 mm by 3 mm, the separation area 2450 can be 1 mm by 1 mm.

In a final step 2540 of the method 2500 the desired head size is calculated from the two-dimensional pattern glass coordinates of each patch. Because the two-dimensional pattern glass is rigid and not sensitive to thermal expansion, the distance between two patches in two-dimensional pattern glass 710 coordinates corresponds to the physical distance between the patches on paper. Consequently, if two patches on paper are printed with a displacement (ie an inter-patch distance) of one head size 510, then the head size may be determined by measuring the distance in two-dimensional pattern glass 710 coordinates between the patches.

Referring again to FIG. 26, in this RPPH arrangement, there are 32 pairs of patches with each pair separated by a distance of the head size. For a given chart layout, let N denote the number of patch pairs and let $X_1, X_2, \ldots, X_N$ denote the physical distances measured for the pairs. Then the desired head size 510 may be calculated as the average distance according to Formula (25).

$$\text{head size} = \frac{1}{N} \sum_{i=1}^{N} X_i \qquad (25)$$

Locate a Patch in the Scanned Image

Figure 27:
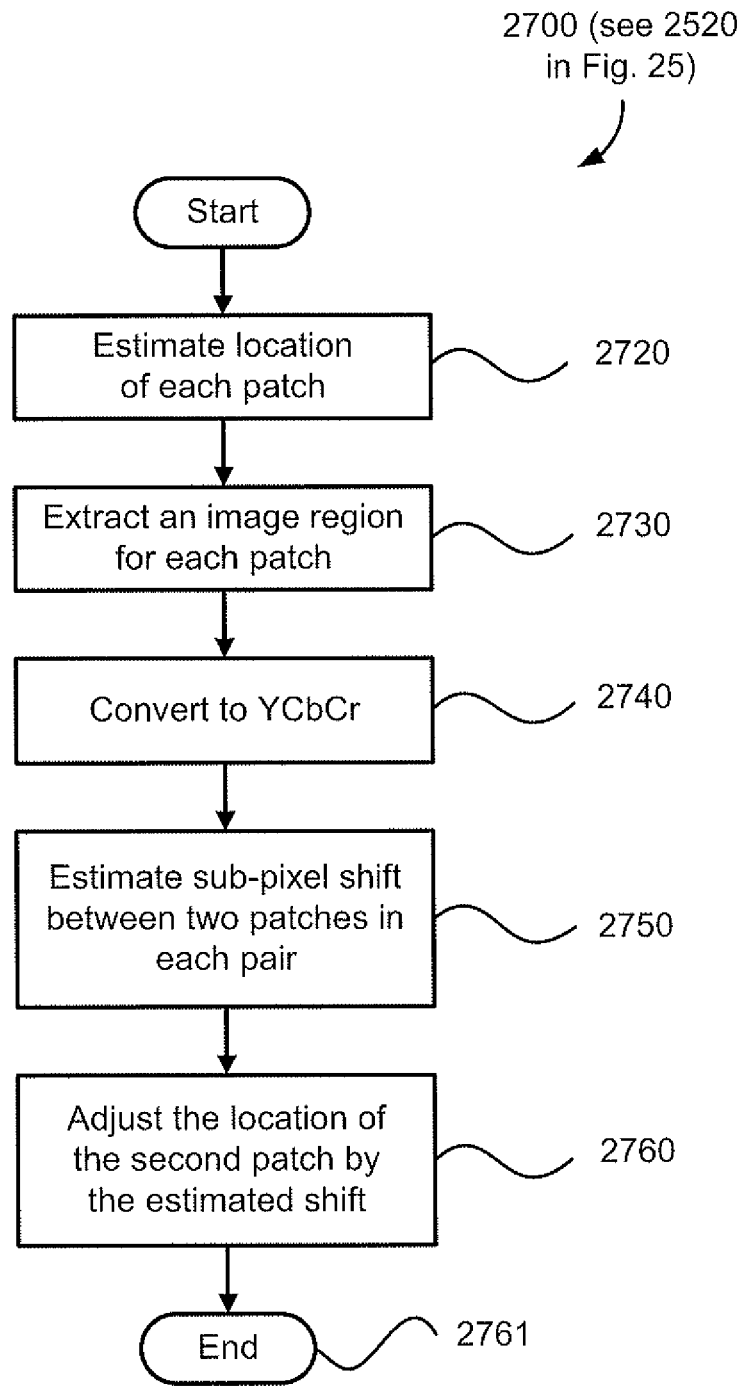
FIG. 27 is a schematic flow diagram illustrating a method of estimating the head size from a scanned image.

FIG. 27 shows a flow diagram for a method 2700 of locating each patch 2430 in the scanned image 2400. This method 2700 can be used to carry out the step 2520 of the method 2500.

The method 2700 begins at a step 2720 where the location of each patch 2430 is estimated using the known location of the patch in the measurement chart 1900 and the affine transform determined in the previous step 2510.

In a following step 2730 of the method 2700, for each patch 2430, extract an image region that contains the patch. For a patch size of 3 mm on side, the region size could be 4.2 mm on side, which is equivalent to 400 pixels at 2400 pixels per inch.

Referring again to FIG. 24b, as described above, the image of the dots (ie the pattern marks) from the two-dimensional reference pattern 2460 is superposed on the image of the dots (ie the patch marks) from the patch 2430. It is desirable to separate the image signals from the two types of dots for analysis. In the present RPPH arrangement the image of the dots from the two-dimensional reference pattern 2460 has a grey color and the image of the dots from the patch 2430 has cyan and magenta colors.

In a step 2740 of the method 2700, the color space of each extracted patch is converted to YCbCr color space. The color space from which to convert depends on the measuring system 600. In the present RPPH arrangement the scanned image 2400 is acquired in RGB color space.

The step 2740 can also be done earlier at any time since the start of the method 2700 and before the step 2750, in which case the image to convert may be the whole scanned image 2400.

In the step 2750 of the method 2700, the sub-pixel shift between the extracted region of an 'A' patch to the extracted region of the corresponding 'B' patch is estimated. This can be accomplished by using the method 2100 described previously using the Cr color channel of the extracted patch images 2430.

This method significantly reduces the interference of the two-dimensional reference pattern dots (ie the pattern marks) 2460 (see FIGS. 24a and 24b) on the analysis of the patches 2430 (see FIGS. 24a and 24b). An explanation is now given. Both the white paper background and the grey dots from the two-dimensional pattern 2460 appear as color values close to 0.5 in the Cr channel. The magenta dots from a patch 2430 show up as color values close to 1.0 and the cyan dots from a patch 2430 show up as color values close to 0.0. The grey dots from the two-dimensional pattern 2460 are suppressed and the contrast of the two colors (cyan and magenta) of the dots from a patch 2430 are enhanced.

A last step 2760 of the method 2700 adjusts the location of the 'B' patch by the estimated shift. The method 2700 then ends at a step 2761.

Extensions to the Main RPPH Arrangement such as Different Hole Shapes and Topology In other arrangements of the RPPH approach, the shape, size and topology of the separation area 2450 can be varied.

Figure 28:
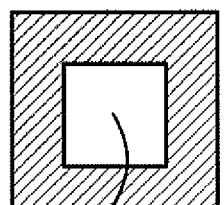
FIG. 28 illustrates some alternative designs of the patch and the separation area.
Figure 28:
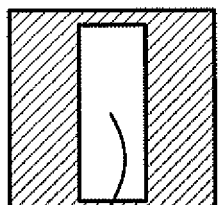
Figure 28:
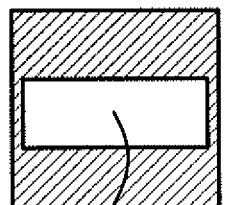
Figure 28:
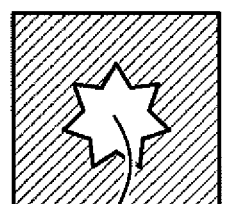
Figure 28:
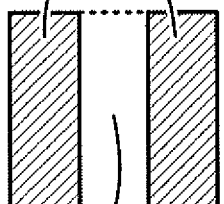
Figure 28:
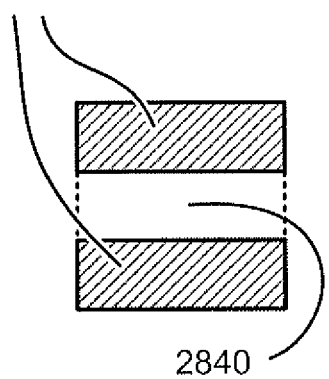
Figure 28:
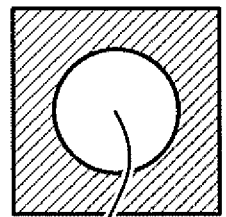
Figure 28:
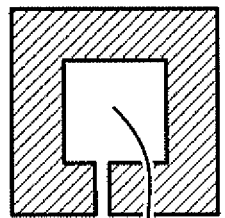
Figure 28:
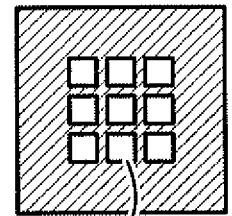

FIG. 28 illustrates some possible examples of patch designs.

In one example, a separation area 2810 can be a square but the size can be larger or smaller than the size used in the preferred RPPH arrangement.

In other examples, the separation area 2820 or 2830 can be a vertical or horizontal rectangle. This may be needed to optimise the patch for a scanner spatial distortion that is significantly different in the vertical and horizontal directions.

Other examples show that the rectangular separation area 2840 or 2850 can be as long as the side of the patch 1950, dividing the patch into disjoint sections 2845 or 2855.

In other examples, the separation area 2860 or 2870 can be a circle or an oval or an irregular shape.

In yet further examples, the separation area can have different topologies. The separation area 2880 can be joined to the area outside the patch 1950, or the separation area 2890 can comprise of a plurality of disjoint areas inside the patch 1950. Other suitable patch designs can be used in the RPPH arrangements where the patch comprises a plurality of object marks and the two-dimensional reference pattern comprises a plurality of pattern marks, by determining a location coordinate for the patch, and providing one or more separation areas in the patch in the vicinity of the location coordinate to thereby minimise occlusion by said object marks of pattern marks belonging to a superposed two-dimensional reference pattern, wherein the two dimensional reference pattern is superposed over the graphical object in order to facilitate determination of a reference pattern coordinate associated with the location coordinate, said reference pattern coordinate defining the location of the graphical object. In some examples, the location coordinate coincides with the centre, or the centroid, or some other suitable location, of the separation area.

Extensions to the Main RPPH Arrangement such as YUV or Yellow Color Spaces

In another arrangement of the RPPH approach, the accuracy of the measurements can be improved by reducing the scanner mis-registration. Scanner mis-registration is the spatial misalignment of the different color channels with which the scanner operates. This mis-registration reduction can be accomplished by optimising the correlation between the images from the different color channels before converting the color space from RGB into YCbCr in the step 2740 of the method 2700.

In another arrangement of the RPPH approach, in the step 2740 of the method 2700, other YUV color spaces (for example Luma/Luminance and Chroma/Chrominance color spaces) can also be used instead of YCbCr color space. Other color spaces can also be designed to maximise the separation of the different types of dots based on their color characteristics, or on a subset of their color characteristics.

In another arrangement of the RPPH approach, the patches 1950 can be printed in yellow color. In this case the B color channel in the RGB color space enhances (ie. making large color signal values) both the patch dots 2430 and the two-dimensional pattern dots 2460. The R (or Green) channel enhances the two-dimensional pattern dots 2460 but does not enhance the patch dots 2430. Hence the R or G color channel can be used to analyse the two-dimensional pattern dots 2460. Similarly, the (B minus R) or (B minus G) color signal can be used to analyse the patch dots 2430. In this case the separation area 2450 in the patch 1950 may not be needed.

Extension to the Main RPPH Arrangement Using Sparse Patch

In another arrangement of the RPPH approach, the patches 1950 are printed with low ink density, meaning there are few object marks and they are spaced further apart. In this arrangement the separation area is not void of object marks; the separation area can be thought of to be filled with sparse object marks, and the patches are called sparse patches.

Figure 61:
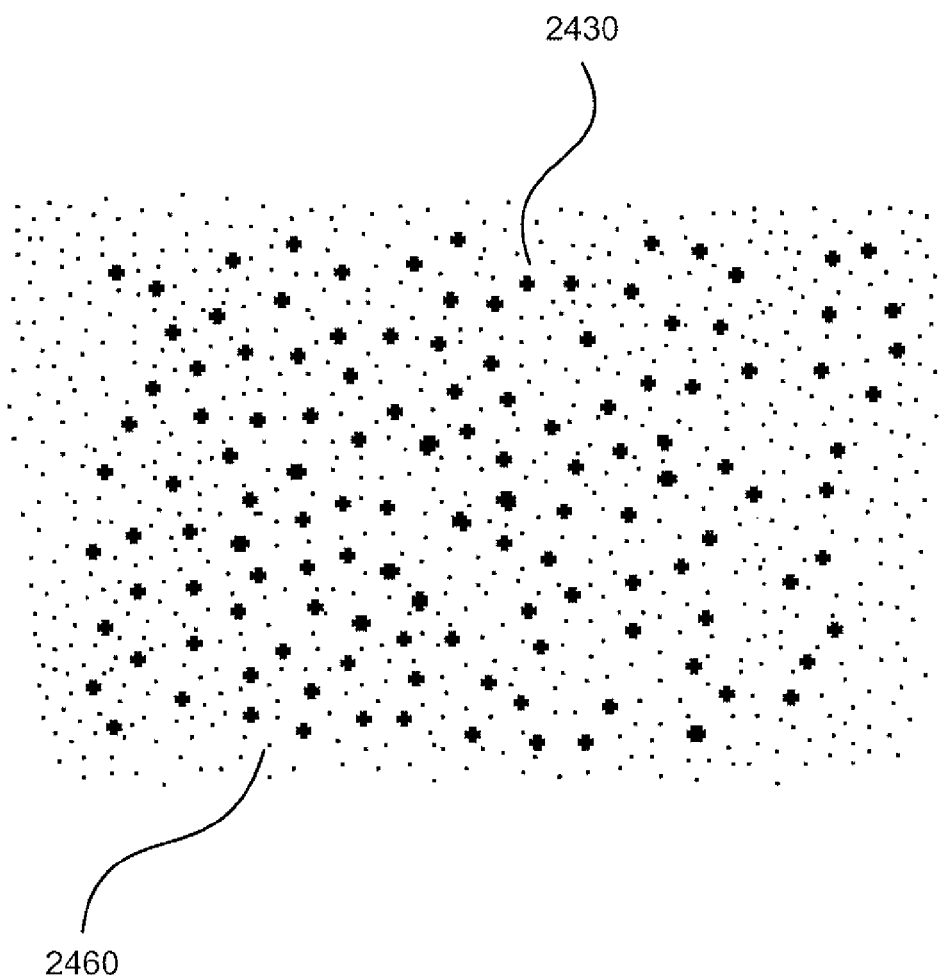
FIG. 61 is an image showing an example of a sparse patch.

FIG. 61. shows an example of a sparse patch with object marks 2430 superposed with the reference pattern marks 2460. In this case, the object marks 2430 are larger than the pattern marks 2460 so the sparse patches can be located using correlation and the pattern marks 2460 would have negligible effects on the results. Conversely the pattern marks 2460 are not significantly occluded by the sparse object marks 2430, therefore the pattern marks 2460 can be analysed without having to exclude the object marks 2430.

The designer of the measurement system must determine a suitable combination of the size of a pattern mark, the density of the pattern marks, the size of a sparse patch, the ink density of the sparse patches, and the scan resolution, perhaps by empirical means. An example of a good combination includes 6 mm by 2.7 mm sparse patches with 0.5% ink density, square pattern marks with 8 microns on each side and 4% pattern density, and a scan resolution of 2400 dpi.

Methods, apparatuses and computer program products are disclosed for determining a head size of a print head of a printer. Methods, apparatuses and computer program products are also disclosed for determining a spatial alignment characteristic of a printer. In the following description, numerous specific details, including particular colourants, printing technologies, and sizes in terms of pixels, and the like are set forth. However, from this disclosure, it will be apparent to those skilled in the art that modifications and/or substitutions may be made without departing from the scope and spirit of the invention. In other circumstances, specific details may be omitted so as not to obscure the invention.

Methods of measuring the head size of an inkjet print head and the spatial characteristics of an inkjet printer using a two-dimensional measurement system, a relative position estimation of printed noise patches (or regions), and the design of these patches so as to enable accurate estimates based on cross-correlation.

[Processing Environment]

Figure 30:
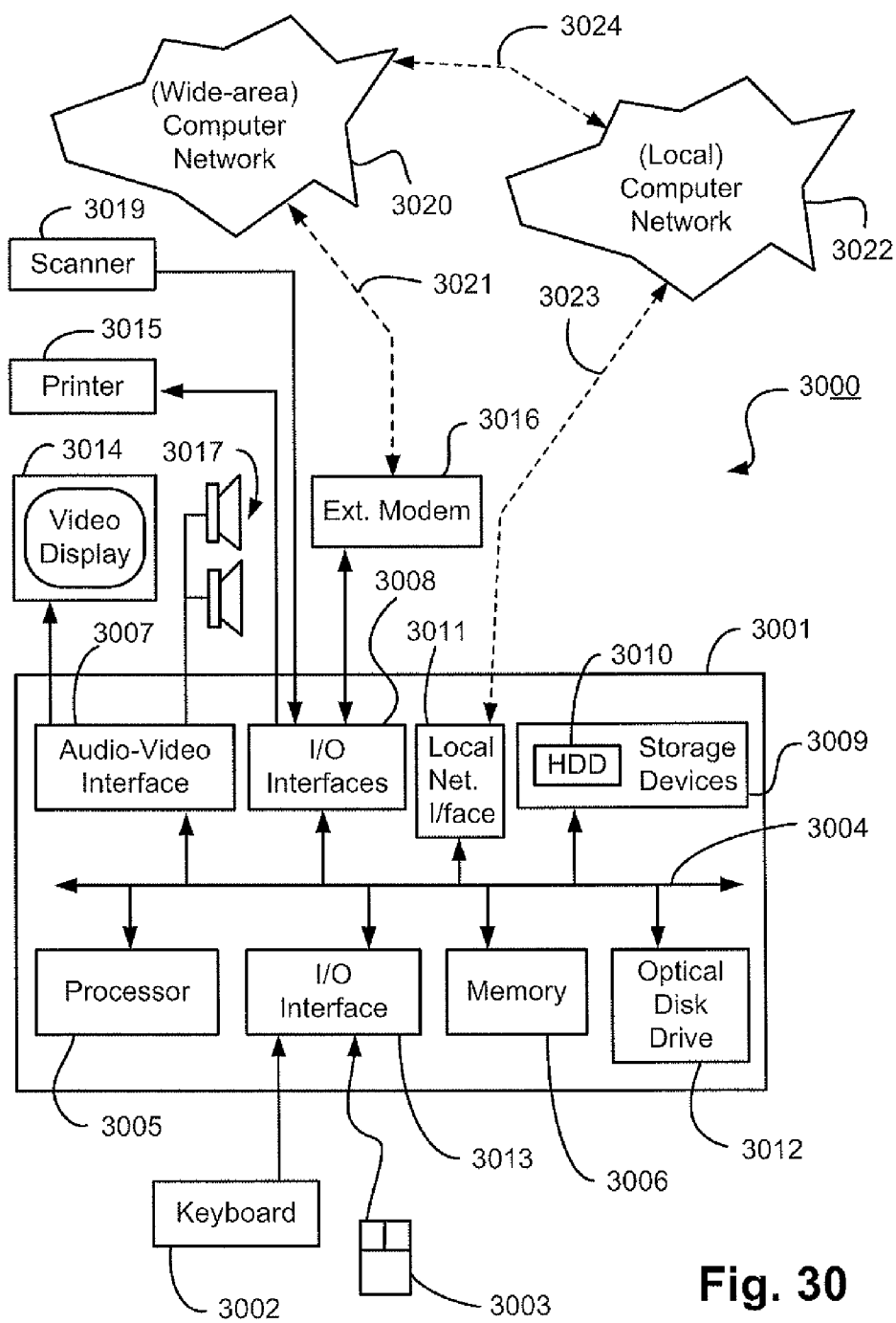
FIG. 30 is a schematic block diagram of a general purpose computer on which the embodiments of the invention may be practised.

Methods of determining head size of a printer described hereinafter may be implemented using a computer system 3000, such as that shown in FIG. 30. Methods in accordance with embodiments of the invention may be implemented as software, such as one or more application programs executable within the computer system 3000. In particular, the steps of the methods of measuring head size are effected by instructions in the software that are carried out within the computer system 3000. The instructions may be formed as one or more computer program code modules, each for performing one or more particular tasks. The software may also be divided into two separate parts, in which a first part and the corresponding code modules perform the measurement of the head size and a second part and the corresponding code modules manage a user interface between the first part and the user. The software may be stored in a computer readable medium, including the storage devices described hereinafter, for example. The software is loaded into the computer system 3000 from the computer readable medium, and then executed by the computer system 3000. A computer readable medium having such software or computer program recorded on the medium is a computer program product. The use of the computer program product in the computer system 3000 preferably effects an advantageous apparatus for image processing, particularly for head size measurement.

As seen in FIG. 1, the computer system 3000 is formed by a computer module 3001, input devices such as a keyboard 3002, a mouse pointer device 3003 and a scanner 3019, and output devices including a printer 3015, a display device 3014 and loudspeakers 3017. An external Modulator-Demodulator (Modem) transceiver device 3016 may be used by the computer module 3001 for communicating to and from a communications network 3020 via a connection 3021. The network 3020 may be a wide-area network (WAN), such as the Internet or a private WAN. Where the connection 3021 is a telephone line, the modem 3016 may be a traditional "dial-up" modem. Alternatively, where the connection 3021 is a high capacity (eg: cable) connection, the modem 3016 may be a broadband modem. A wireless modem may also be used for wireless connection to the network 3020.

The computer module 3001 typically includes at least one processor unit 3005, and a memory unit 3006 for example formed from semiconductor random access memory (RAM) and read only memory (ROM). The module 3001 also includes an number of input/output (I/O) interfaces including an audio-video interface 3007 that couples to the video display 3014 and loudspeakers 3017, an I/O interface 3013 for the keyboard 3002 and mouse 3003 and optionally a joystick (not illustrated), and an interface 3008 for the external modem 3016, scanner 3019 and printer 3015. In some implementations, the modem 3016 may be incorporated within the computer module 3001, for example within the interface 3008. The computer module 3001 also has a local network interface 3011 which, via a connection 3023, permits coupling of the computer system 3000 to a local computer network 3022, known as a Local Area Network (LAN). As also illustrated, the local network 3022 may also couple to the wide-area network 3020 via a connection 3024, which would typically include a so-called "firewall" device or a device with similar functionality. The interface 3011 may be formed by an Ethernet™ circuit card, a wireless Bluetooth™ or an IEEE 802.11 wireless arrangement. The networks 3020 and 3022 may represent sources of image data, and image data may also be sourced from the scanner 3019. The scanner 3019 may be a flatbed scanner for scanning documents, or a fingerprint scanner or an eye scanner for biometric scanning.

The interfaces 3008 and 3013 may afford both serial and parallel connectivity, the former typically being implemented according to the Universal Serial Bus (USB) standards and having corresponding USB connectors (not illustrated). Storage devices 3009 are provided and typically include a hard disk drive (HDD) 3010. Other devices such as a floppy disk drive and a magnetic tape drive (not illustrated) may also be used. An optical disk drive 3012 is typically provided to act as a non-volatile source of data. Portable memory devices, such as optical disks (eg: CD-ROM, DVD), USB-RAM, and floppy disks for example may then be used as appropriate sources of data to the system 3000.

The components 3005, to 3013 of the computer module 3001 typically communicate via an interconnected bus 3004 and in a manner which results in a conventional mode of operation of the computer system 3000 known to those skilled in the relevant art. Examples of computers on which the described arrangements can be practised include IBM-PC's and compatibles, Sun Sparcstations, Apple Mac™ or alike computer systems evolved therefrom.

Typically, the application programs discussed above are resident on the hard disk drive 3010 and read and controlled in execution by the processor 3005. Intermediate storage of such programs and any data, such as image data, fetched from the networks 3020 and 3022 or scanner 3019 may be accomplished using the semiconductor memory 3006, possibly in concert with the hard disk drive 3010. In some instances, the application programs may be supplied to the user encoded on one or more CD-ROMs and read via the corresponding drive 3012, or alternatively may be read by the user from the networks 3020 or 3022. Still further, the software can also be loaded into the computer system 3000 from other computer readable media. Computer readable media refers to any storage medium that participates in providing instructions and/or data to the computer system 3000 for execution and/or processing. Examples of such media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 3001. Examples of computer readable transmission media that may also participate in the provision of instructions and/or data include radio or infra-red transmission channels as well as a network connection to another computer or networked device, and the Internet or Intranets including e-mail transmissions and information recorded on Websites and the like.

The second part of the application programs and the corresponding code modules mentioned above may be executed to implement one or more graphical user interfaces (GUIs) to be rendered or otherwise represented upon the display 3014. Through manipulation of the keyboard 3002 and the mouse 3003, a user of the computer system 3000 and the application may manipulate the interface to provide controlling commands and/or input to the applications associated with the GUI(s).

The methods to be described may also be implemented, at least in part, in dedicated hardware such as one or more integrated circuits performing the functions or sub functions to be described. Such dedicated hardware may include graphic processors, digital signal processors, or one or more microprocessors and associated memories.

[Inkjet Printer and Print Head]

Figure 31A:
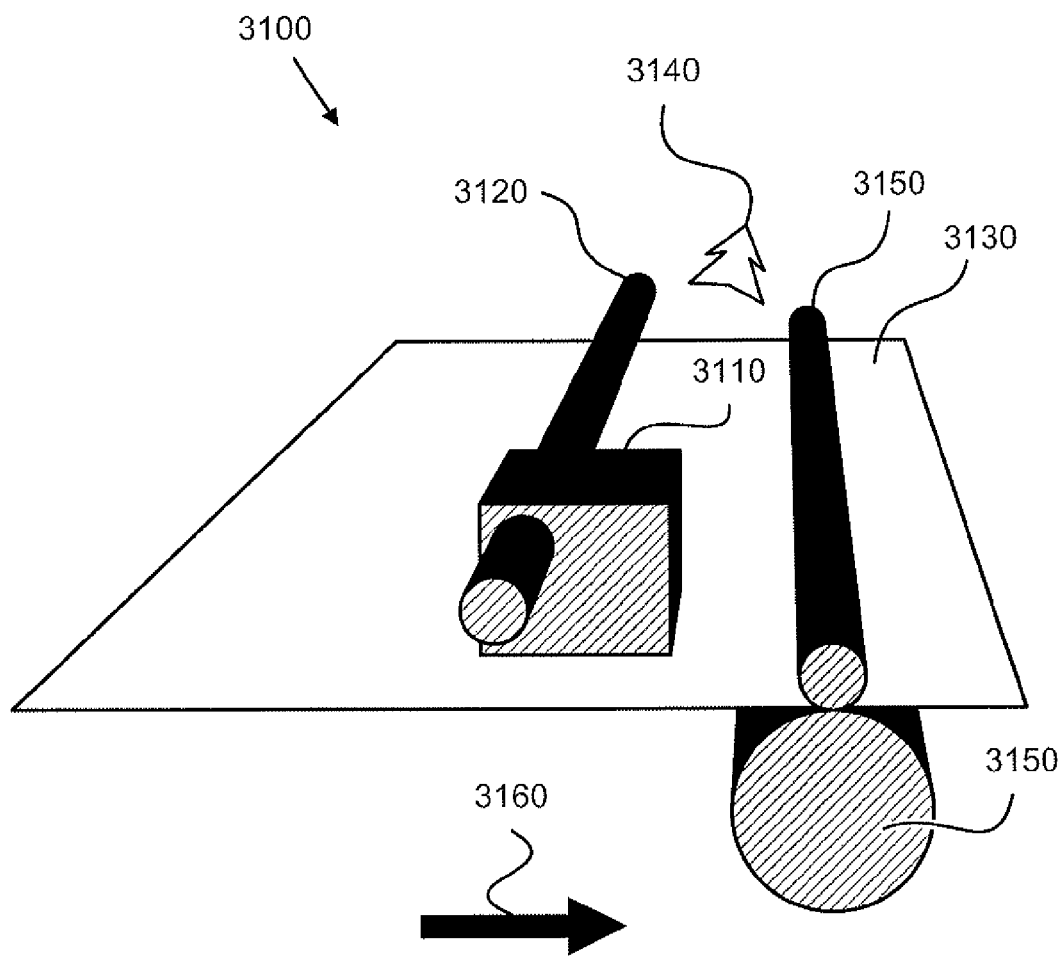
FIG. 31a is a block diagram providing a simplified representation of the mechanical layout of an inkjet printer.

FIG. 31*a* illustrates a simplified representation of the internal arrangement of an inkjet printer 3100. The arrangement comprises a print head 3110 having ink ejection nozzles (not illustrated) organised into groups based on colour and/or ink volume. The print head 3110 is mounted on a carriage 3120 which transverses a print medium 3130 and forms image swaths during a forward passage in a scan direction 3140 and a back passage opposite to the scan direction 3140, by controlling the ejection of ink from the ink ejection nozzles within the nozzle banks. The inkjet printer 3100 further comprises a print medium advance mechanism 3150, which transports the print medium 3130 in a direction 3160 perpendicular to the print head scan direction 3140. The distance that the print medium 3130 is advanced is called the line feed distance.

Figure 31B:
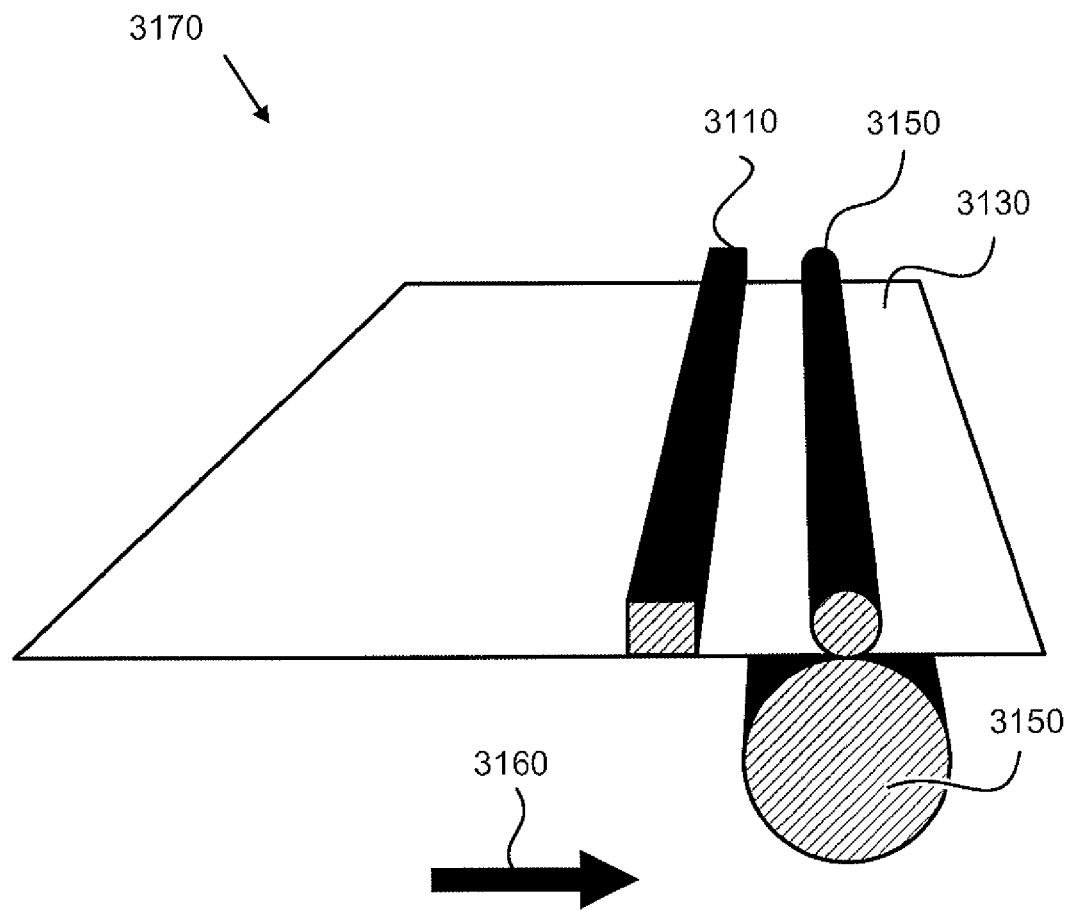
FIG. 31b is a block diagram providing a simplified representation of the mechanical layout of an inkjet printer.

FIG. 31*b* illustrates a simplified representation of the internal arrangement of a full-width fixed head printer 3170. The arrangement comprises a print head 3110 having ink ejection nozzles (not illustrated) organised into groups based on colour and/or ink volume. The print head 3110 is stationary and forms image by controlling the ejection of ink from the ink ejection nozzles within the nozzle banks while the print medium advance mechanism 3150 transports the print medium 3130. The print head 3110 extends across the entire printable area of the printing medium 3130 in one dimension. Otherwise, the configuration of this printer 3170 is the same as that of printer 3100 of FIG. 31*a*.

FIG. 3 illustrates a typical layout 300 of the ink eject nozzle banks 310 (four in this embodiment) of the print head 3110. Each nozzle bank 310 comprises multiple ink ejection nozzles 320 extending perpendicularly to the print head scan direction 3140.

For an inkjet printer to produce images that do not contain noticeable visual artefacts, alignment is required between the nozzle banks 310 used within the same passage and between the nozzle banks 310 used during the forward and back passages respectively. The print medium advance mechanism 3150 of FIGS. 31*a* and 31*b* must also be calibrated to advance the print medium 3130 to correctly align swaths.

To produce optimal image quality, each individual printing system must be characterised, and components of that printing system must be calibrated accordingly. One important parameter to measure in the process of calibration is the head size.

FIG. 4 illustrates the action of two inks ejected from the print head 3110. The arrangement comprises a print head 3110 having ink ejection nozzles 3120 (only two are depicted in FIG. 4), ejecting inks onto a print medium 3130 and forming two ink dots 410. The physical distance on the print medium 3130 between two ink dots 410 is denoted the head size 420. Because the print head 3110 may not be exactly parallel to the print medium 3130 and because the inks may not be ejected exactly perpendicularly to the print medium 3130, in general the head size 420 (indicated by arrow extending between ink dots 410) is not the same as the physical distance 430 between the two nozzles 320.

FIG. 5 illustrates the action of two groups of ink dots 410 ejected from the print head 3110. An alternative definition of the head size 420 is the average distance 510 on the print medium 3130 between corresponding ink dots 410 in each group, one group of ink dots 410 printed by a nozzle group 520 and another group of ink dots 410 printed by a nozzle group 530. When the nozzle spacing is consistent, the distance 420 on the print medium 3130 between two corresponding ink dots 410 should be the same as the average distance on the print medium 3130 between two ink groups 510.

For the purposes of the following discussion, the head size is defined as the average distance between two ink groups 510.

[Imaging System]

Figure 32:
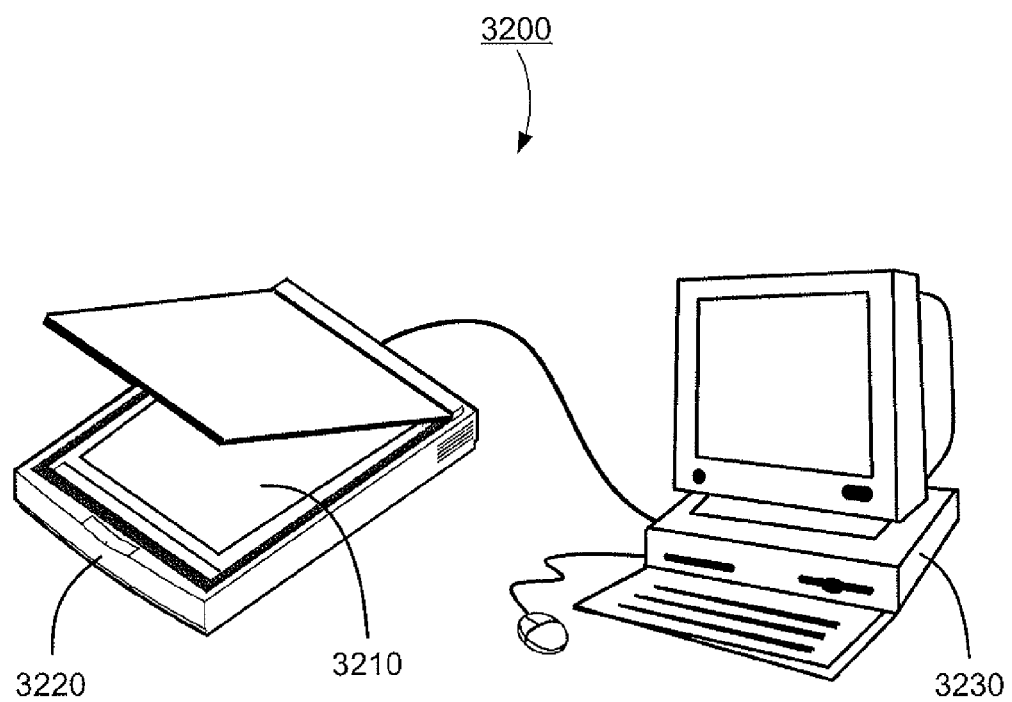
FIG. 32 is a block diagram showing a measurement system that comprises a flat bed scanner, attached to a computer.

FIG. 32 shows a measurement system 3200 for determining a two-dimensional position of a location on a surface 3210 imaged by the system 3200. The measurement system 3200 comprises a flat bed scanner 3220, attached to a computer 3230.

[Two-Dimensional Pattern Glass]

Due to spatial distortions introduced by the scanner 3220, positions on the surface 3210 imaged by the system 3200 do not directly correspond with pixel positions of a digital image resulting from scanning the surface.

To accurately determine the physical two-dimensional position of a feature of interest on the surface 3210, the scanner surface 3210 may be prepared with a reference pattern. A feature of interest may then be located relative to the reference pattern rather than merely relying on the pixel position containing the feature.

Such a reference pattern may also be manufactured on a separate transparent sheet, which could be placed between the scanner surface 3210 and the object being imaged.

Figure 33A:
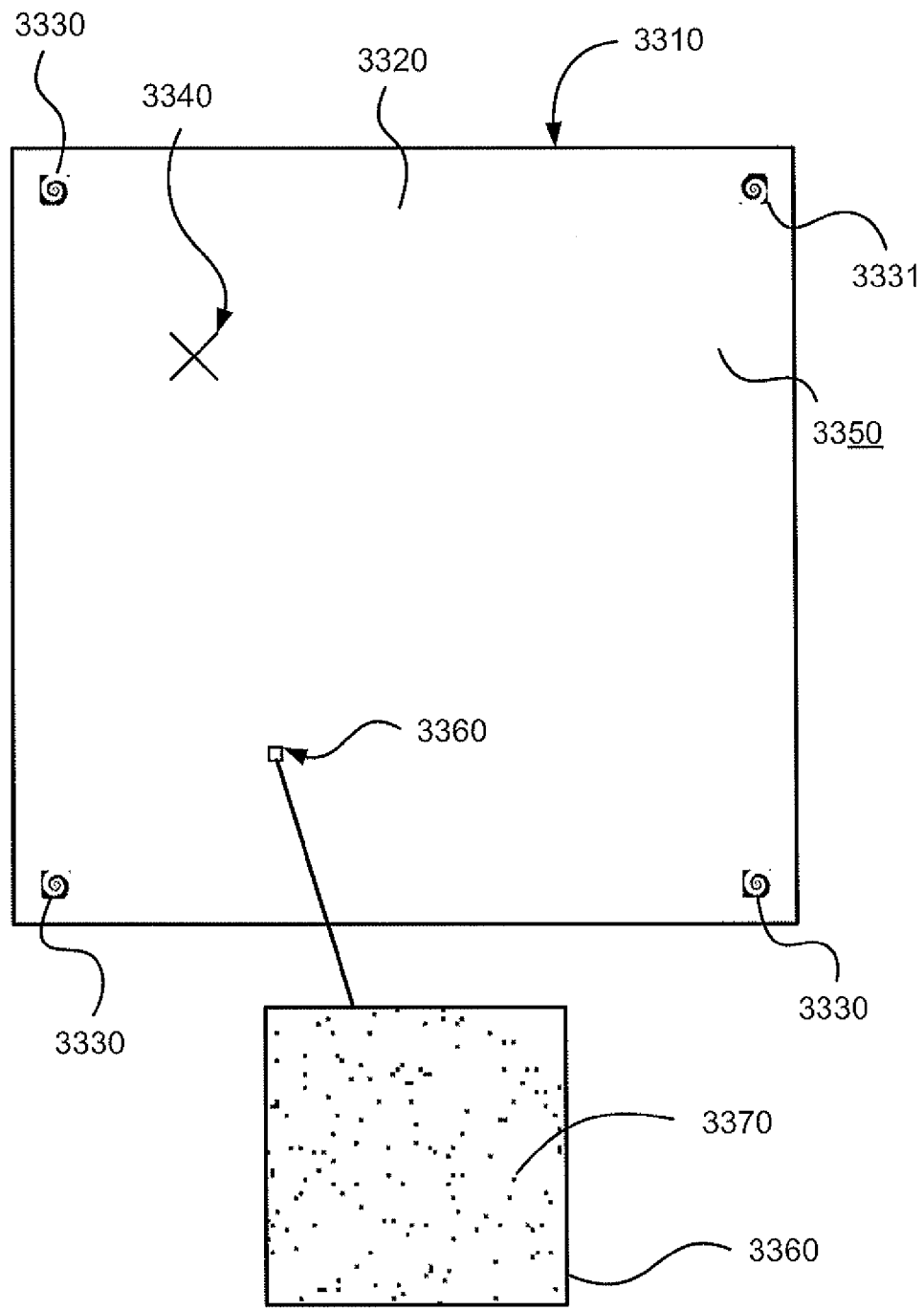
FIG. 33a is a block diagram showing an example of a two-dimensional pattern glass, including a magnified portion of the glass.

FIG. 33*a* illustrates an example of a two-dimensional pattern glass 3310, comprising a transparent sheet prepared with a reference pattern 3320, described in detail below, on one surface.

The two-dimensional pattern glass substrate can be a material with a low coefficient of thermal expansion such as fused silica and the reference pattern 3320 is manufactured by forming chrome particles on the substrate. Since the two-dimensional pattern glass 3310 is used as a reference, the accuracy of a measurement is determined in part by the accuracy of the two-dimensional pattern glass 3310 manufacturing process. For a target measurement accuracy of 1 micron standard deviation using a measurement system 3200 with optical resolution of around 1600 dots per inch (15.875 microns/pixel), the reference pattern 3320 may be manufactured onto the two-dimensional pattern glass substrate using a standard ultraviolet (UV) lithographic process with a minimum feature (mark) size of around 400 nm.

The reference pattern can comprise registration marks 3330 and 3331 used to determine a location (e.g. 3340) approximately and a special pattern 3350 used to determine a location accurately. In the embodiment of FIG. 33a, a registration mark 3330, 3331 is located in each corner of the square substrate.

A spiral pattern can be used as the registration mark 3330 and 3331, described in detail below. Three of these spiral marks 3330 are identical while the fourth spiral mark 3331 is a negative image of spiral marks 3330. As described below, these marks permit the estimation of the geometrical relationship between the digital image and the reference pattern 3320. Other reference marks may be used instead.

As illustrated in the enlargement 3360, the special pattern 3350 can comprise a two-dimensional pseudo-random noise pattern having a marking density of approximately 4%, with each marking (e.g. 3370) taking the form of a square 8 microns in size.

Figure 33B:
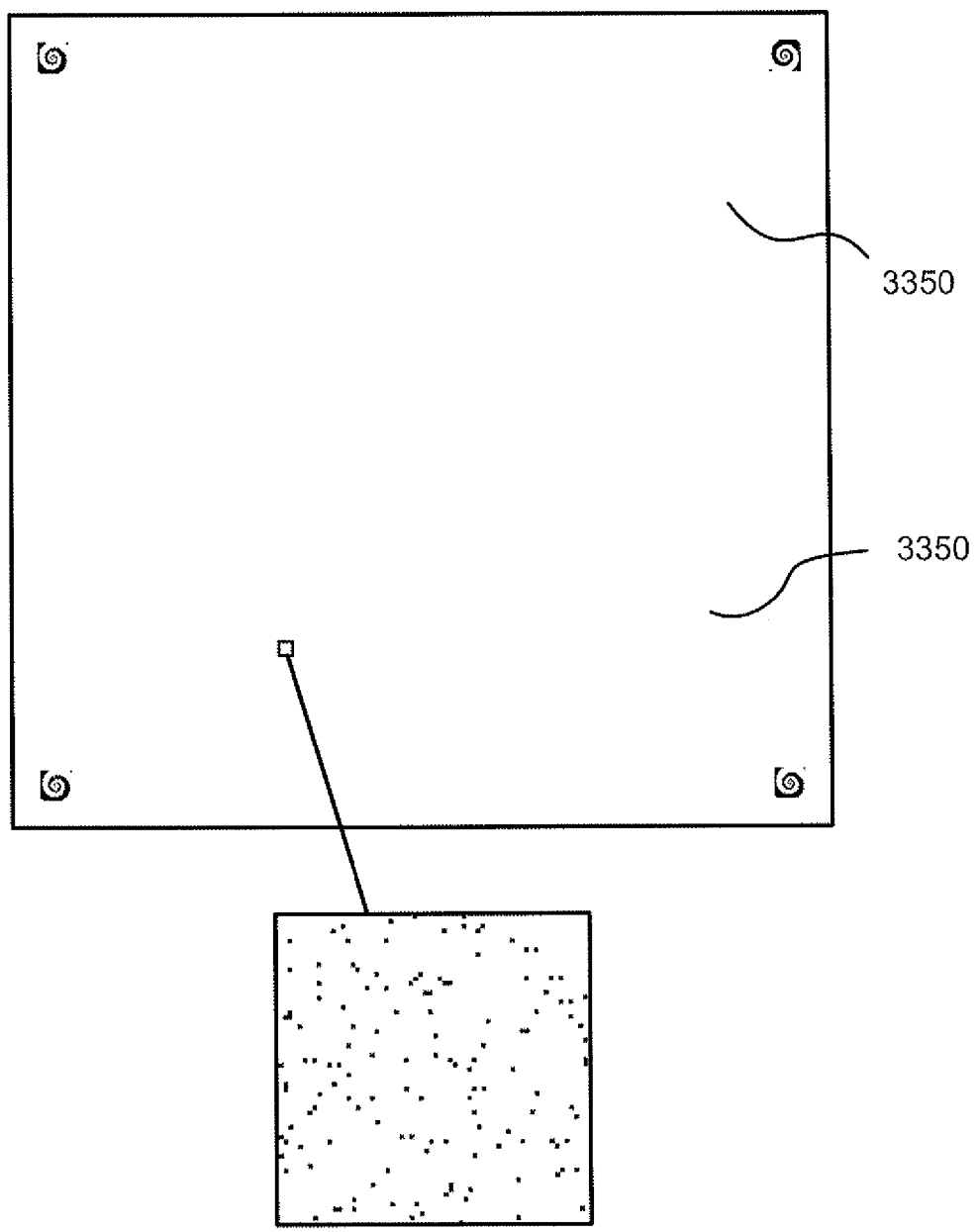
FIG. 33b is a block diagram showing an example of a two-dimensional pattern glass having a plurality of special patterns.

FIG. 33a illustrates one special pattern 3350 that is fabricated onto the two-dimensional pattern glass 3310. As shown in FIG. 33b, a plurality of special patterns 3350 can be fabricated onto the two-dimensional pattern glass 3310.

[Logarithmic Radial Harmonic Function Registration Marks]

As described previously, the reference pattern 3320 can include four spiral registration marks 3330 and 3331. Each spiral is a bitmapped version of a logarithmic radial harmonic function (LRHF). Mathematically, an LRHF is a complex-valued function defined on a plane. As an example, FIG. 8 shows an illustration of the real 810 and imaginary 820 parts of an LRHF. An LRHF has the properties of scale and rotation invariance, which means that if an LRHF is transformed by scaling or rotation the transformed LRHF is still an LRHF.

An LRHF has three parameters that may be adjusted. The first parameter is referred to as the Nyquist radius R, which is the radius at which the frequency of the LRHF becomes greater than p radians per pixel (e.g., 830). The second parameter is referred to as the spiral angle s, which is the angle that the spiral arms (e.g., 840) make with circles centred at the origin (e.g., 850). The third parameter is referred to as the phase offset f. An LRHF may be expressed in polar coordinates (r, θ), in accordance with Formula (26) as follows:

$$l(r, \theta) = e^{j(m\kappa + n \ln r + f)} \quad (26)$$

where the values of m and n may be determined in accordance with the following Formulae (27):

$$n = Rp \cos s$$
$$m = \lfloor Rp \sin s \rfloor \quad (27)$$

Each spiral registration mark image is created as a bitmap, which samples the LRHF with the Nyquist radius R, the spiral angle s and the phase offset f. In the preferred embodiments, each spiral bitmap is a square approximately 5 millimeters on edge with square pixels 8 microns on edge.

In accordance with the above definition of radius r and angle θ, the value of a pixel in the spiral bitmap with coordinates (r, θ) may be determined in accordance with Formula (28) as follows:

$$\begin{cases} 1 & \text{if } r > R \text{ and } \mathrm{Re}(f(r, \theta)) > 0 \\ 0 & \text{otherwise} \end{cases} \quad (28)$$

The adjustable parameters for the reference pattern spiral registration marks 3330 and 3331 can be as follows:
(1) Nyquist radius, R=6.33;
(2) Spiral angle, s=−9.08°; and
(3) Phase offset, f=0° for marks 3330 and f=180° for mark 3331.

[Determining the Accurate Location of a Feature on a Surface]

A method 900 for determining an accurate position on the two-dimensional pattern glass 3310 of a feature of interest on a surface is described with reference to FIG. 9.

The method 900 begins at step 910 where the two-dimensional pattern glass 3310 is placed on the measurement system surface 3210 (see FIG. 32). The pattern glass 3310 can usually be placed in the middle of the measurement system surface 3210, where the scanners tested typically demonstrated the highest optical resolution. The pattern glass 3310 and the measurement system surface 3210 are preferably clean and free from dust, fingerprints etc.

In the following step 920, the chart to be measured is placed on the pattern glass 3310. The chart embodies a test pattern.

FIG. 10 illustrates the relationship between the two-dimensional pattern glass 3310 (see FIG. 33a), the measurement system surface 3210 and the chart to be measured 1010. The two-dimensional pattern glass 3310 is oriented to place the reference pattern 3320 on the surface immediately adjacent to the surface to be measured 1010. The optical resolution and other performance characteristics of a measurement system 3200 are not usually the same in all orientations on the measurement system surface 3210. As the orientation of the surface to be measured on the measurement system surface 3210 is changed, the accuracy of a measurement typically also changes. The optimal orientation depends on the particular characteristics of the measurement system 3200 and the measurement being made and should be determined empirically for a particular system.

The surface to be measured should be flat and that the gap between the surface to be measured and the two-dimensional pattern glass 3310 should be as small as practicable. There are many possible ways to achieve this. As illustrated in FIG. 11, in the preferred embodiments of the invention, a flat weight 1110 may be placed on top of the surface to be measured 1010. Too light a weight may not serve the purpose, while too heavy a weight may bend the measurement system surface 3210, possibly impairing system accuracy. The suitable weight can be determined empirically.

Returning to FIG. 9, in the next step 930 of the method 900, a scanned image is acquired. A position measurement is performed in the measurement system 3200 of FIG. 32 by scanning, thus imaging, the surface 1010 to be measured through the reference pattern 3320 manufactured onto the surface of the two-dimensional pattern glass 3310. With the relationship between the surface 1010 to be measured, the pattern glass 3310, and the measurement system surface 3210 being that illustrated in FIG. 10, any position on the surface 1010 to be measured has a corresponding position relative to the reference pattern 3320 and hence the two-dimensional pattern glass 3310.

The digital image resulting from the scan, henceforth denoted the "scanned image" or "scan", is transferred to the computer 3000 where the scanned image is stored.

In the step 940 of the method 900, the scanned image is processed. The image is analysed to determine the measurement result. This analysis typically entails the determination of locations in the pattern glass 3310 of features in the scanned image. The pixels of the scanned image include information resulting from the reference pattern 3320. To determine the spatial position relative to the two-dimensional pattern glass 3310 of a feature in the scanned image, an application program is executed within the computer 3000.

The executed application program detects and analyses the properties of the pattern 3320 around the pixel position of that feature and uses the detected properties to determine the corresponding spatial position on the pattern glass 3310. This process is described in detail below. The method 900 then ends.

[Two-Stage Alignment]

As a result of distortions in the measurement system 3200, locating a reference pattern mark (e.g. 3370) in the digital image can be problematic. This locating task can be accomplished using a combination of "coarse alignment" and "fine alignment".

Coarse alignment represents an approximate mapping between the location of a mark in the reference pattern 3320 and the location of the mark in the scanned image. The coarse alignment may use an affine transformation.

The coarse-alignment affine transform is specified by a matrix A and a vector b and transforms coordinates (x, y) in the reference pattern 3320 to coordinates ($x_S$, $y_S$) in the scan according to Formula (29), below:

$$\begin{pmatrix} x_S \\ y_S \end{pmatrix} = A \begin{pmatrix} x \\ y \end{pmatrix} + b. \tag{29}$$

Since the mapping between locations in the two-dimensional pattern glass and locations in the scanned image is usually more complicated than an affine transform, coarse alignment may not adequately represent the actual transformation. To represent this transformation more accurately, a fine alignment transform may be used to apply corrections to locations determined using the coarse alignment transform.

As illustrated in FIG. 12, the fine alignment transform may be represented as a set of displacement vectors (e.g. 1210). Each displacement vector is associated with a location (e.g. 1220) in the scanned image 1230, and measures the amount of shift between the coarsely-aligned reference pattern image and the scanned image at that location. Such a set of displacement vectors may be referred to as a "displacement map", d.

The displacement vectors can be arranged on a regular grid (e.g. 1240) in the scanned image. As shown in FIG. 12, the exterior border of the grid 1240 should contain at least the region of interest (e.g. 1250) in the scanned image. The grid step size, P, may be varied. A smaller value of P gives more spatial detail but may reduce the accuracy to which a displacement vector can be determined As an example, if the region of interest in the scanned image is a square, 400 pixels on edge, P may be set to 256 and displacement map grid of three points in each direction, as illustrated in FIG. 12, may be used.

The coarse and fine alignment steps may be combined into a single "warp map", w. If (x, y) are the coordinates of a mark in the reference pattern 3320, the warp map w maps (x, y) to a corresponding location in the scanned image in accordance with Formula (30) as follows:

$$w(x, y) = \left( A \begin{pmatrix} x \\ y \end{pmatrix} + b \right)^T + d\left( \left( A \begin{pmatrix} x \\ y \end{pmatrix} + b \right)^T \right). \tag{30}$$

However, the displacement map d(x, y) is only defined at a few places, namely the grid point locations (e.g., 1220). To determine a value for Formula (30) at other locations, the displacement map d is interpolated. Many methods of interpolation are known in the art. Depending on the number of points in each direction, appropriate methods of interpolation along a particular grid axis might be linear, quadratic or cubic interpolation. Cubic interpolation may be used if there are at least four points available; if there are three points, quadratic interpolation may be used, and otherwise linear interpolation may be used.

[Determine Locations on the Pattern Glass]

Figure 34:
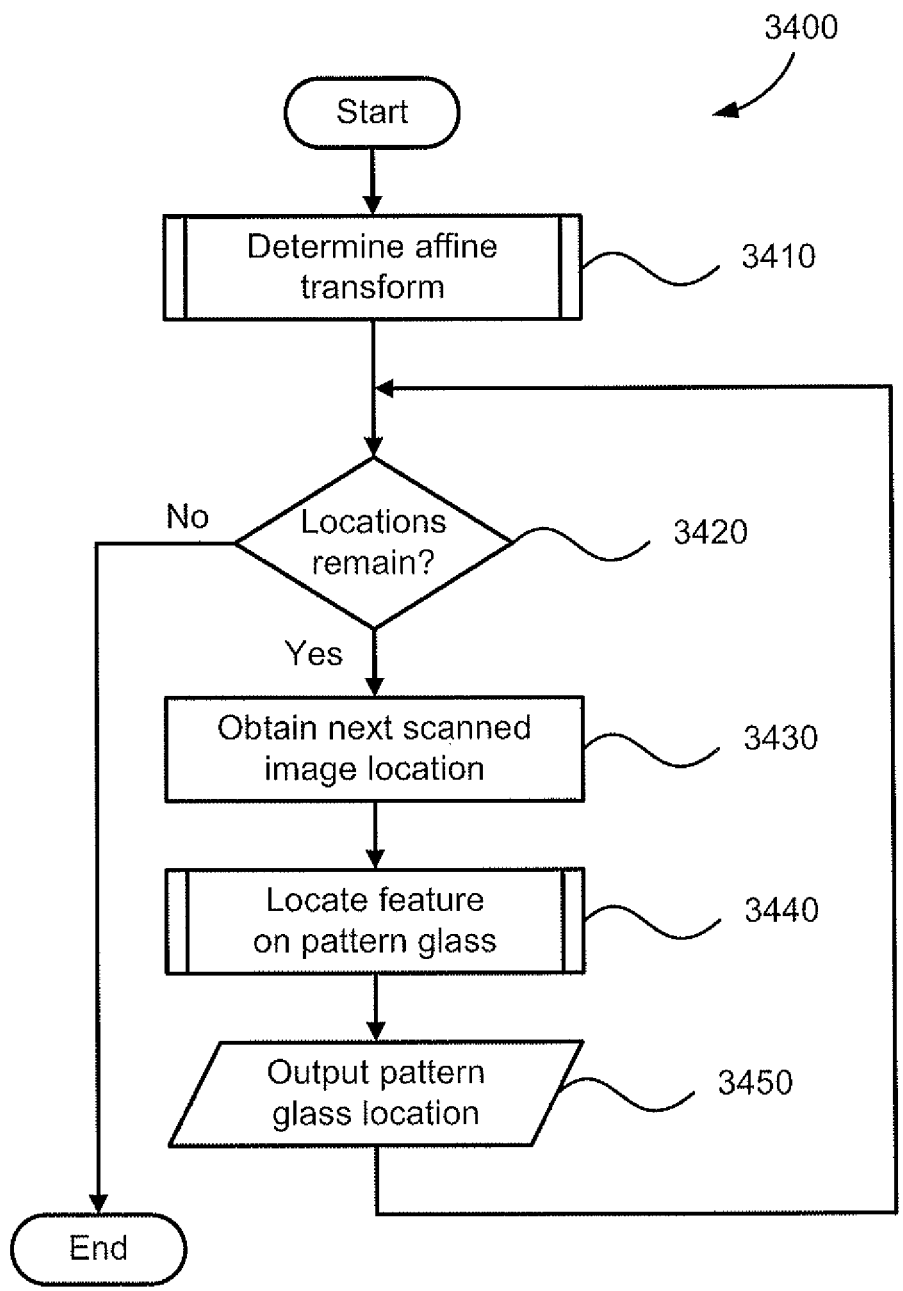
FIG. 34 is a schematic flow diagram illustrating a method of determining the location relative to the two-dimensional pattern glass of features in the scanned image.

FIG. 34 is a schematic flow diagram illustrating a method 3400 of determining the location relative to the two-dimensional pattern glass 3310 of features in the scanned image.

In step 3410, the affine transform is determined. The coarse-alignment affine transform described above is determined from the locations of the spiral registration marks 3330 and 3331.

Referring now to the schematic flow diagram FIG. 14, a method 1400 of determining the affine transform using the spiral registration marks is described.

The method 1400 begins at step 1410, where the processor 3005 generates a spiral template image, within the digital memory 3006, for example. Each pixel in the spiral template image is complex-valued. Each value is stored as a pair of double-precision floating point numbers representing the real and imaginary parts of the pixel. The spiral template image has height and width equal to $T_s$, the template size. The template size $T_s$ may vary. The template size $T_s$ may be chosen to make the spiral template image approximately the same size as the spirals in the scanned image. In one example, $T_s=256$.

Polar coordinates (r, θ) in the spiral template are defined, with the origin in the centre of the template. The pixel value at polar coordinates (r, θ) in the spiral template image may be determined in accordance with Formula (31) as follows:

$$\begin{cases} e^{j(m\theta + n \ln r)} & \text{if } r > R \\ 0 & \text{otherwise,} \end{cases} \tag{31}$$

where m and n are defined by Formulae (2) above and the Nyquist radius R and the spiral angle s have the values used in the generation of the reference pattern 3320.

At step 1420, the processor 3005 generates a correlation image. The processor performs a correlation between the scanned image and the complex-valued spiral template image to generate the correlation image.

The correlation of two images $I_1$ and $I_2$ is a correlation image $I_x$. The correlation image $I_x$ may be determined in accordance with Formula (32) below:

$$I_x(x, y) = \sum_{x', y'} I_1(x', y') I_2(x' + x, y' + y). \tag{32}$$

The sum of Formula (7) ranges over all x' and y' where $I_1$ is defined, and, in the image $I_2$, the values of pixels outside the image are considered to be zero. If either of the images $I_1$ or $I_2$ is complex-valued, the correlation image $I_x$ may be complex-valued too.

The resulting correlation image $I_x$ contains peaks (i.e., pixels with large modulus relative to neighbouring pixels), at the locations of spirals 3330 and 3331 in the scanned image. The phase of the pixel value of a peak is related to the phase f of a corresponding spiral (e.g. 3331) that was included in the reference pattern 3320. The three spirals 3330 that were generated with f=0 have peaks with similar phase, while the one spiral 3331 that was generated with f=p typically has a peak with opposite phase to the peaks of the other three spirals. Since the underlying LRHF of the spirals is scale-invariant and rotation-invariant, detection is robust to rotation and differences between the resolution of the scanned image and the resolution employed in the fabrication of the pattern glass 3310.

At step 1430, the processor 3005 locates the peaks in the correlation image, examines the correlation image resulting from step 1420 and locates the four peaks corresponding to each of the spirals 3330 and 3331 in accordance with the known arrangement of the spirals in reference pattern 3320.

At step 1440, the processor 3005 calculates the affine transform. In particular, the processor calculates parameters A and b that minimise the error between the known coordinates of the spirals 3330 and 3331 in the reference pattern, transformed to scanned image coordinates according to Formula (26), above and the corresponding scanned image locations determined in the step 1430.

Referring to FIG. 34, in decision step 3420, a check is made to determined if scanned image locations remain to be processed. In steps 3420, 3430, 3440 and 3450, the method 3400 iterates over a set of scanned image locations for which the corresponding pattern glass 3310 location is desired.

In step 3420, the processor 3005 determines if there is any scanned image location for which the corresponding pattern glass 3310 location has not yet been determined. If there is such a location (YES), the method 3400 proceeds to step 3430. If there is no such location (NO), the method 3400 ends.

In step 3430, the processor 3005 obtains the next scanned image location.

In step 3440, the processor 3005 locates the feature on the pattern glass. The scanned image location is found in the pattern glass 3310 according to a method 1500 described in detail hereinafter.

In step 3450, the pattern glass location is output. The location can be saved for subsequent processing. The method 3400 then returns to the step 3420.

[Simulate Scanned Image Pixel]

FIG. 15 is a schematic flow diagram illustrating a method 1500 of determining accurate coordinates relative to the reference pattern 3320 of a given location in a digital image produced by imaging a chart through the two-dimensional pattern glass 3310 using the measurement system 3200.

As described in detail hereinafter, in step 1530, the processor 3005 calculates a simulated version of part of the scanned image from the known reference pattern 3320 and a set of parameters used to model the process of image acquisition using the measurement system 3200. Before describing method 1500, the simulation process is first detailed.

The appearance in the simulated image of each marking (e.g. 3370) in the special pattern 3350 can be modelled using a two-dimensional Gaussian function. As described previously, the location in the simulated image of a marking (e.g. 3370) may be calculated using a warp map. Specifically, the simulation parameters comprise:

(1) the value of a scanned image pixel distant from any reference pattern marks (the "background" level), B;

(2) the value of a scanned image pixel distant from any unmarked region of the reference pattern (the "foreground" level), F;

(3) the standard deviation of the Gaussian function in the horizontal and vertical directions, $s_x$ and $s_y$, respectively;

(4) the coarse alignment parameters, namely the affine matrix, A, and vector, b; and (5) the fine alignment parameters, namely the displacement map, d.

Let R denote an image of the reference pattern, where R(x, y)=1 indicates the presence of a mark at location (x, y) and R(x, y)=0 indicates the absence of a mark. Then, given the simulation parameters mentioned above, the value, S, of the pixel at location $(x_S, y_S)$ in the simulated image may be calculated according to Formula (33) below:

$$S(x_S, y_S) = \qquad (33)$$
$$B + (F-B) \int_{x=-8}^{8} \int_{y=-8}^{8} R(x, y) \frac{e^{-\|(w(x,y)-(x_S-y_S))diag(s_x,s_y)^{-1}\|^2/2}}{2 p s_x s_y} |J_w(x, y)| dy dx,$$

where:

w(x, y) is the warp map calculated according to Formula (30), above;

$diag(s_x, s_y)$ represents a 2×2 matrix with main diagonal coefficients $s_x$ and $s_y$;

$\|\ \|$ represents the Euclidean norm; and $|J_w(x, y)|$ is the determinant of the Jacobian matrix of w at (x, y).

The reference image, R, can be stored as a raster array, $R_A$, in the digital memory of the computer 3000, with each pixel the same size and shape as a special pattern marking (e.g. 3370): a square 8 microns in size. If the number of pixels in the x and y directions are $N_x$ and $N_y$, respectively, R and $R_A$ are related according to Formula (34) below:

$$R(x, y) = \begin{cases} R_A(x_A, y_A) & \text{if } 0 \le x_A < N_x \text{ and } 0 \le y_A < N_y \\ 0 & \text{otherwise} \end{cases} \qquad (34)$$

where $x_A$ and $y_A$ are defined as follows:

$$x_A = \left\lfloor \frac{x}{8 \ \mu m} + \frac{1}{2} \right\rfloor \qquad (35)$$

$$y_A = \left\lfloor \frac{y}{8 \ \mu m} + \frac{1}{2} \right\rfloor$$

In this case, S may be calculated according to Formula (36) below:

$$S(x_S, y_S) = \qquad (36)$$
$$B + (F-B) \sum_{x_A=0}^{N_x-1} \sum_{y_A=0}^{N_y-1} R(x, y) \frac{e^{-\|(w(x,y)-(x_S,y_S))diag(s_x,s_y)^{-1}\|^2/2}}{2 p s_x s_y} |J_w(x, y)| \times 64 \ \mu m^2,$$

where x and y are defined as follows:

$x = x_A \times 8 \ \mu m$ $y = y_A \times 8 \ \mu m$ \qquad (37)

[Converting Scan coordinates to Pattern Glass Coordinates]

The method 1500 of determining accurate coordinates relative to the reference pattern 3320 of a given location in a digital image produced by imaging a chart through the two-dimensional pattern glass 3310 using the measurement system 3200 is described with reference to FIG. 15.

As described above, a warp map, w, provides a mapping from coordinates in the reference pattern 3320 to coordinates in the scanned image. To determine accurate coordinates relative to the reference pattern of a given location in the scanned image, the method 1500 first generates a warp map relating a region in the reference pattern to a region including the location of interest in the scanned image and determines the location in the reference pattern mapping to the location of interest.

In the subsequent discussion, approximate values of the simulation parameters B, F, s, A and b, described previously, are assumed to be known. For the purposes of the following discussion, (1) let these approximate values be denoted $B_0$, $F_0$, $s_0$, $A_0$ and $b_0$, respectively; and (2) define a uniformly zero displacement map, $d_0$, according to Formula (38), below:

$$d_0(x, y) = (0, 0), \quad (38)$$

The method 1500 begins at step 1510, where the processor 3005 determines a window width, W, and height, H, in scanned image pixels for subsequent processing. The parameters W and H typically correspond to distances in the range of 700 microns to 5000 microns.

At step 1520 a region, $I_0$, of the digital image that is W pixels wide and H pixels high, centred on the input digital image coordinates, is extracted from the scanned image to be analysed. If the coordinates of the first pixel, in scanline order, of the region $I_0$ are denoted $(x_0, y_0)$, the pixels of $I_0$ are related to the pixels of I according to Formula (39), below:

$$I_0(x, y) = I(x+x_0, y+y_0) \quad (39)$$

In step 1530, a new image region, $S_0$, also W pixels wide and H pixels high, is calculated in the digital memory 3006 of computer 3000. Each pixel, $S_0(x, y)$, of this image is calculated using the simulation parameters $B_0$, $F_0$, $s_0$, $A_0$, $b_0$, and $d_0$ as described above, according to Formula (40), as follows:

$$S_0(x, y) = S(x+x_0, y+y_0). \quad (40)$$

In step 1540, the regions $I_0$ and $S_0$ are compared to determine a shift, i.e., a two-dimensional integer-coordinate translational offset $\Delta_0$, from $I_0$ to $S_0$. Many methods to achieve this are well known. The phase-only correlation can be used.

In step 1550, the affine transform is corrected for shift. The affine transform vector is adjusted to account for the offset between the scan and simulated scan images $I_0$, $S_0$ according to Formula (41):

$$b_1 = b_0 - \Delta_0. \quad (41)$$

The method 1500 continues at step 1560, where the processor 3005 refines the simulation parameters. The difference between $I_0$ and the simulated image is minimised by varying the simulation parameters B, M, s, and d.

More specifically, the error function, E, to be minimised may be the squared residual error calculated according to Formula (42) as follows:

$$E = \sum_{x=0}^{W-1} \sum_{y=0}^{H-1} (I_0(x, y) - S(x+x_0, y+y_0))^2. \quad (42)$$

Non-linear minimisation requires initial conditions for the variables which are being varied. These initial conditions are defined as follows:
B: Approximate value, $B_0$;
F: Approximate value, $F_0$;
s: Approximate value, $s_0$; and
d: Zero displacement map, $d_0$.

The affine transform parameters are not varied by the minimisation process, but have fixed values as follows:
A: Approximate value, $A_0$; and
b: Adjusted value, $b_1$.

A non-linear least-squares minimisation scheme, known as the Levenberg-Marquardt method, can be used, and many other such methods are well known.

The minimisation is performed in step 1560. In step 1570, the processor 3005 determines the reference pattern coordinates. The desired reference image coordinates corresponding to the input digital image coordinates are determined using the refined simulation parameters.

Let the value of the displacement map d corresponding to the minimum value of E be denoted $d_1$. Then the refined warp map, $w_1$, may be calculated according to Formula (43) as follows:

$$w_1(x, y) = A_0(x, y)^T + b_1 + d_1(A_0(x, y)^T + a_1). \quad (43)$$

To determine the desired reference image coordinates ($x_R$, $y_R$) from $w_1$ and the input digital image coordinates ($x_1$, $y_1$), a second minimisation process is used. The error function, e, to be minimised in this step may be calculated according to Formula (44), below:

$$e = \|w_1(x_R, y_R) - (x_1, y_1)\|^2. \quad (44)$$

The initial value of ($x_R$, $y_R$) may be calculated from the affine component of $w_1$ according to Formula (45) as follows:

$$(x_R, y_R)_0 = A_0^{-1}((x_1, y_1) - b_1). \quad (45)$$

The error function e can be minimised by varying ($x_R$, $y_R$) using the Simplex algorithm of Nelder and Mead. Other well known methods may also be practiced.

The desired reference image coordinates ($x_R$, $y_R$), correspond to the minimum value of e (expected to be 0).

Following step 1570, method 1500 concludes.

[Pixel Masking and Dust, Hair etc. Rejection]

The method 1500 is based on the assumption that the digital image region, $I_0$, being analysed may be modelled as dark-coloured reference pattern marks on a uniform light-coloured background. However, other marks on the chart often obscure the reference pattern marks in some subregion of $I_0$. In addition, dust, hair, etc. between the chart and the two-dimensional pattern glass 3310 or between the pattern glass and the measurement system surface 3210 is often imaged along with the pattern glass and the chart.

In such cases, the accuracy of the reference pattern coordinates determined by method 1500 may be improved by neglecting pixels affected by chart marks, dust or hair, etc. This can be accomplished using a mask image, M, with the same dimensions as $I_0$, stored in the digital memory of computer 3000. The pixels of the mask image M are set according to Formula (46), below:

$$M(x, y) = \begin{cases} 0 & \text{if pixel } (x, y) \text{ is to be neglected} \\ 1 & \text{otherwise} \end{cases} \quad (46)$$

For the purposes of the subsequent discussion, if the mask image indicates that a given pixel is to be neglected, the pixel is termed a "masked" pixel and has a mask image value of zero. All other pixels are termed "unmasked" and have a mask image value of one.

Figure 35:
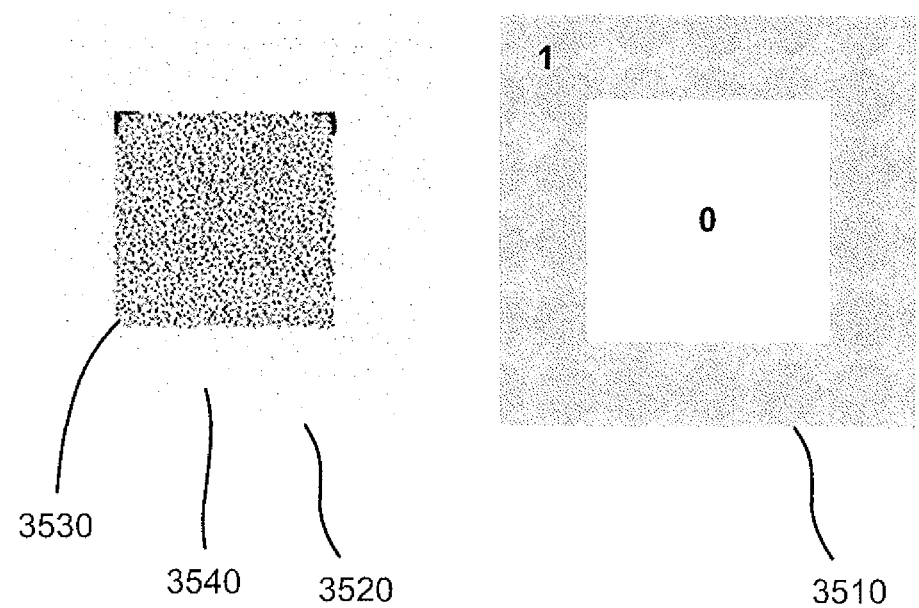
FIG. 35 comprises images of a chart mark and a corresponding mask image.

A method 1600 of determining accurate coordinates relative to the reference pattern 3320 of a given location in a scanned image produced by imaging a chart through the two-dimensional pattern glass 3310 using the measurement system 3200 in the case where some pixels in the region of interest of the digital image are affected by chart marks, dust, hair etc. is described with reference to FIG. 16 and FIG. 35.

The method 1600 begins at step 1610 where the processor 3005 sets the mask M to exclude chart marks. The mask M, shown as mark 3510 in FIG. 35, is set to 0 where the corresponding pixel in the digital image region $I_0$, 3520 is determined to be sufficiently close to a chart mark (e.g. 3530) or is set to 1 otherwise (e.g. 3540). All pixels of M may be 1 if no pixels are to be neglected in the analysis initially.

At step 1620, the processor 3005 corrects the shift and refines simulation parameters. Refined simulation parameters are determined. Step 1620 is identical to steps 1510 to 1560, inclusive, of method 1500 described previously, save for the following modifications:

(1) in step 1540, the comparison of $I_0$ and $S_0$ neglects any pixels in $I_0$ for which the corresponding pixel in M has value 0;

(2) in step 1560, the error function, E, to be minimised is calculated according to Formula (47) as follows:

$$E = \sum_{x=0}^{W-1} \sum_{y=0}^{H-1} (I_0(x, y) - S(x + x_0, y + y_0))^2 M(x, y). \quad (47)$$

In decision 1630, a check is made to determine if dust, hair, etc. is to be excluded. If it is desired to exclude additional pixels affected by dust etc. (YES), the method 1600 proceeds to step 1640. Otherwise (NO), the method 1600 proceeds to step 1680.

In step 1640, the processor 3005 calculates a residual image, D. Each pixel in D is the difference between the corresponding pixels in $I_0$ and the image S simulated with the refined simulation parameters, according to Formula (48), as follows.

$$D(x, y) = |I_0(x, y) - S(x + x_0, y + y_0)| \quad (48)$$

In step 1650, the processor 3005 determines the fraction, θ, of pixels to exclude. A typical value of θ can be 0.1.

In step 1660 the processor 3005 sets the mask M to exclude pixels with large residuals. The unmasked pixels in D are sorted in decreasing order of magnitude. If the initial number of unmasked pixels is denoted n, the pixels in M corresponding to the first $\lfloor \theta \times n \rfloor$ pixels in the sorted pixels of D are set to 0.

Step 1670 of method 1600 is identical to the step 1620 described previously. The shift is corrected, and the simulation parameters are refined.

Step 1680 is identical to the step 1570 of method 1500, described previously. In step 1680, the reference pattern coordinates are determined Following step 1680, method 1600 concludes.

[First Embodiment]

FIG. 18 is a schematic flow diagram illustrating a method 1800 for accurately measuring the head size 510.

The method 1800 begins at step 1810, where a head size measurement chart is printed. The design of the chart and the chart printing process are described in detailed below.

In step 1820, the two-dimensional pattern glass is placed on the measurement surface 3210 as described previously for the step 910 of the method 900.

In step 1830, the head size measurement chart is placed on the two-dimensional pattern glass, as described above for the step 920 of the method 900.

In step 1840, the scanned image is acquired, as described for the step 930 above.

In step 1850, the scanned image is processed to determine the desired head size 510. This step is described in detail below.

The step of placing the two-dimensional pattern glass on the measurement surface 3210 could be performed prior to step 1810. Further, the step 1810 could be eliminated if the two-dimensional pattern 3350 were fabricated onto the glass of the scanner.

[Chart Design for the First Embodiment]

Figure 36:
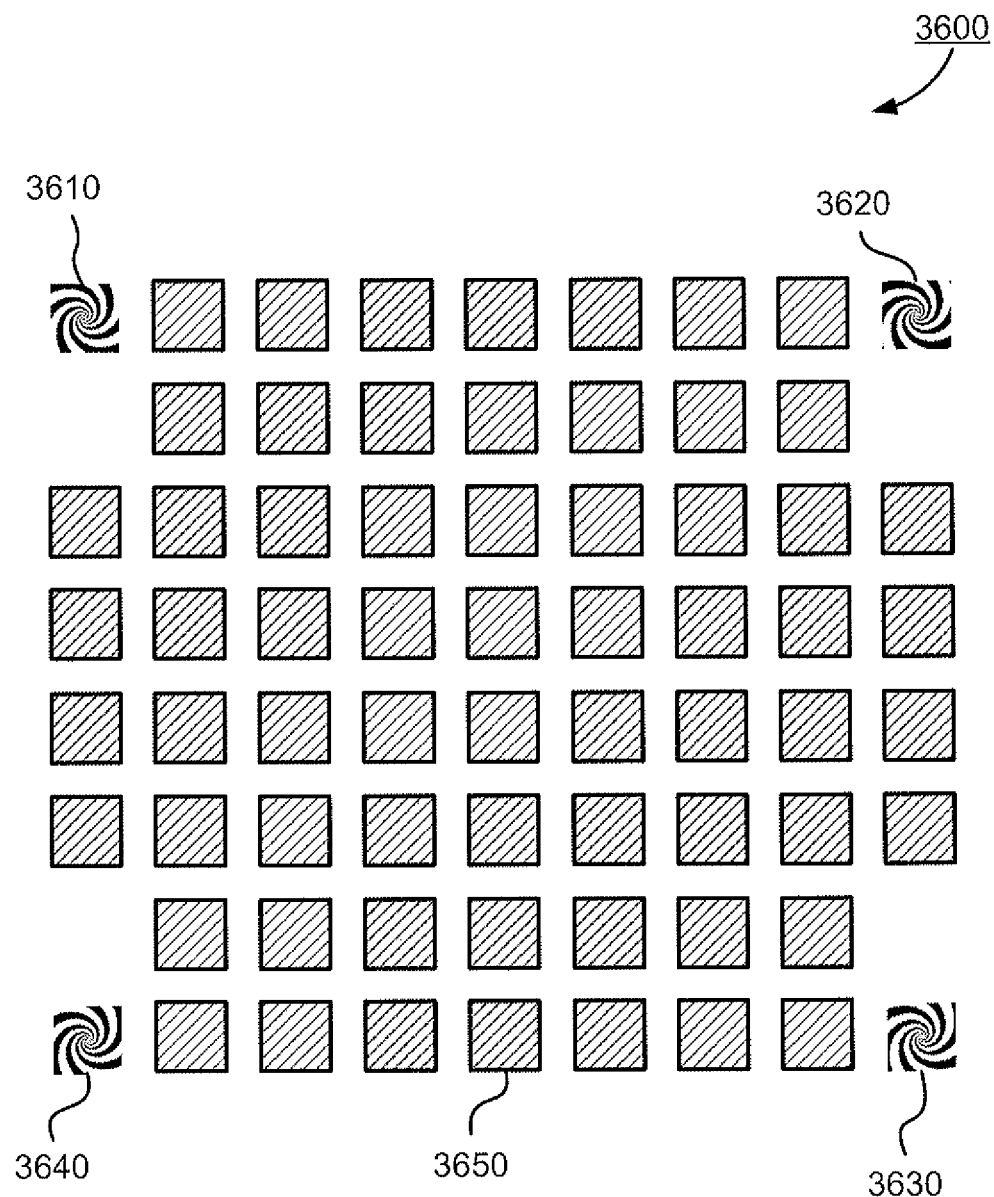
FIG. 36 is an example of a head size measurement chart.

FIG. 36 shows an example of a head size measurement chart 3600. The chart 3600 has four LRHF spiral registration marks 3610, 3620, 3630 and 3640 and at least two "patches" 3650, described below. The chart 3600 is a test pattern that can be printed on a print medium using the print head of the printer, of which the head size is to be determined. As used hereinafter, the phrase "head size measurement chart" refers to a test pattern. The chart spiral registration marks 3610, 3620, 3630, 3640 are generated as described previously with respect to the reference pattern spiral registration marks 3330 and 3331 of FIG. 33a, but with different adjustable parameters for ease of distinguishing two-dimensional pattern glass spirals from chart spirals. The adjustable parameters for the chart spiral registration marks 3610, 3620, 3630 and 3640 can be as follows:

(1) Nyquist radius, R=3.82;
(2) Spiral angle, s=30°; and
(3) Phase offset, f=180°, 120°, 60°, and 0° for marks 3610, 3620, 3630 and 3640, respectively.

The spiral registration marks 3610, 3620, 3630 and 3640 are used to detect the location and the orientation of the chart 3600. Other types of spirals or even other types of marks (e.g. crosses) can be used to detect the location and the orientation of the chart 3600. Furthermore, the location and the orientation of the chart can be detected using the known pattern and location of the patches.

[Patch Design]

FIG. 20 shows a detailed example of a patch 3650. A patch 3650 comprises a group of printed ink dots, with the dots being arranged such that the patch has both wide spatial and wide spectral support so as to form a spread spectral pattern. When correlated with a similar patch, this results in a distinct, sharp correlation peak. (also referred to as a spread spectrum pattern)

The patches are printed by the nozzles of the to-be-measured head 3110. The colour or colours on the patches depends on the colour or colours of the ink ejected by the nozzles. The colourants may be CMYK inks, but other colours could be used. In one example, the patch is a square that is 3 mm on edge, formed from cyan and magenta ink colourant dots (where "colourant dots" can also be referred to as "object marks").

[Describe Correlation]

One aspect of the analysis of the head size measurement chart 3600 is the calculation of the relative locations of pairs of patches. Many methods of performing this calculation are known Phase-only correlation can be used, with the correlation peak located to subpixel resolution by Fourier interpolation. Other shift estimation methods such as gradient based shift estimation could be used instead. In such cases, the patch 3650 could be re-designed to ensure the best performance for the alternative shift estimation method.

Figure 37:
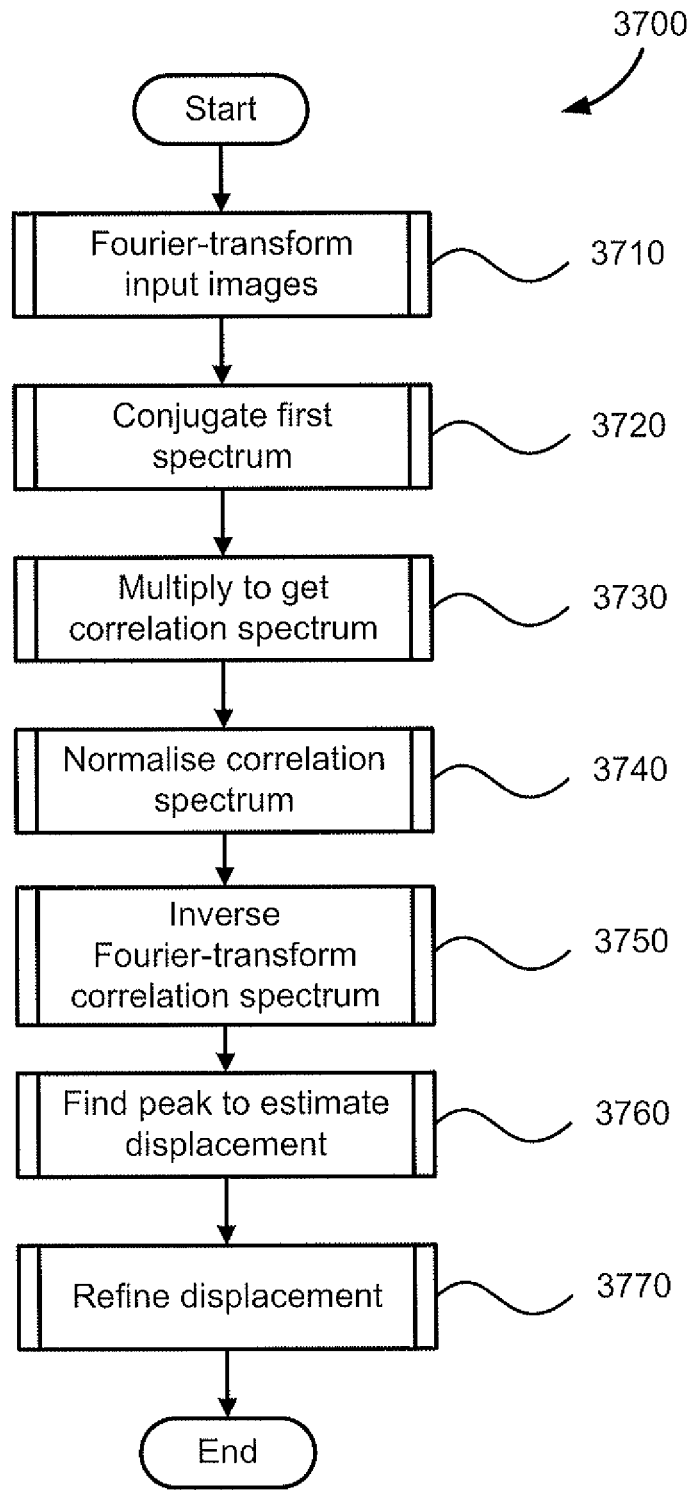
FIG. 37 is a schematic flow diagram illustrating a method of estimating the displacement of two image regions by correlation.

FIG. 37 is a schematic flow diagram illustrating a method 3700 of estimating the displacement of two equal-sized image regions by correlation. For the purposes of the following discussion, let the image regions be denoted $I_1$ and $I_2$ and the calculated average displacement between corresponding features in the image regions be denoted d. Further, let the width in pixels of each image region be denoted w, let the height in pixels be denoted h, and let the uppermost leftmost pixel of each image region have coordinates (0, 0) with the first, x, coordinate increasing to the right and the second, y, coordinate increasing downward.

The method 3700 starts at 3710 where a two-dimensional Fourier transform is applied to input images $I_1$ and $I_2$ to form the spectra $S_1$ and $S_2$ respectively, according to Formulae (48b), below:

$$S_1(k, l) = \sum_{x=0}^{w-1}\sum_{y=0}^{h-1} I_1(x, y)e^{2\pi i\left(\frac{kx}{w}+\frac{ly}{h}\right)}, \text{ and} \quad (48b)$$

$$S_2(k, l) = \sum_{x=0}^{w-1}\sum_{y=0}^{h-1} I_2(x, y)e^{2\pi i\left(\frac{kx}{w}+\frac{ly}{h}\right)}.$$

Both spectra $S_1$ and $S_2$ are two-dimensional, complex-valued images of the same size as $I_1$ and $I_2$, but with the uppermost leftmost pixel coordinate of $(-\lfloor w/2\rfloor,-\lfloor h/2\rfloor)$.

In step 3720, a conjugated first spectrum $S_1^*$ is formed from spectrum $S_1$. This is done by negating the imaginary part of each pixel according to Formula (48c) as follows:

$$S_1^*(x, y) = (S_1(x, y))^*. \quad (48c)$$

In the following step 3730, the two complex spectra $S_1^*$ and $S_2$ are combined by multiplying on a pixel-by-pixel basis to form a correlation spectrum E according to Formula (48d), below:

$$E(x, y) = S_1^*(x, y)S_2(x, y). \quad (48d)$$

The correlation spectrum E is further processed in the next step 3740 is normalised. Each pixel of the complex-valued correlation spectrum E is scaled to an amplitude of one to form a normalised correlation spectrum $\hat{E}$ according to Formula (48e), below:

$$\hat{E}(x, y) = \begin{cases} \frac{E(x, y)}{|E(x, y)|} & \text{if } |E(x, y)| > 0 \\ 0 & \text{otherwise.} \end{cases} \quad (48e)$$

In step 3750, a two-dimensional inverse Fourier transform is applied to the normalised correlation spectrum $\hat{E}$ to form a correlation image C according to Formula (48f), as follows:

$$C(x, y) = \sum_{k=-\lfloor\frac{w}{2}\rfloor}^{w-1-\lfloor\frac{w}{2}\rfloor}\sum_{l=-\lfloor\frac{h}{2}\rfloor}^{h-1-\lfloor\frac{h}{2}\rfloor} \hat{E}(k, l)e^{-2pi\left(\frac{kx}{w}+\frac{ly}{h}\right)}. \quad (48f)$$

In step 3760, the peak in the correlation image C is found to estimate the displacement. The pixel with the largest absolute amplitude in the correlation image C is located. If the width of image C in pixels is denoted w and the height in pixels is denoted h, the coordinates $(m_x, m_y)$ in image C of this pixel are converted to a first estimate $d_0$, in image pixels, of the displacement of features in image $I_2$ relative to corresponding features in image $I_1$ according to Formula (48g), as follows:

$$d_0 = \left(m_x - w\left\lfloor\frac{2m_x}{w}\right\rfloor, m_y - h\left\lfloor\frac{2m_y}{h}\right\rfloor\right). \quad (48g)$$

In step 3770, this initial estimated displacement is refined to sub-pixel resolution using a maximisation process.

Given a displacement d, initially equal to the value $d_0$ calculated in the previous step 3760, the function, γ, to be maximised in this step is the Fourier-interpolated correlation image C at location d. The function γ may be calculated according to Formula (48h), below:

$$\gamma(x, y) = \sum_{k=\lfloor\frac{w}{2}\rfloor}^{w-1-\lfloor\frac{w}{2}\rfloor}\sum_{l=-\lfloor\frac{h}{2}\rfloor}^{h-1-\lfloor\frac{h}{2}\rfloor} \hat{E}(k, l)e^{-2pi\left(\frac{kx}{w}+\frac{ly}{h}\right)}. \quad (48h)$$

The function γ can be maximised by varying d using the Simplex algorithm of Nelder and Mead, but many other methods known in the art may also be practised.

Following step 3770, method 3700 concludes.

The essence of the correlation process 3700 is to determine the displacement between the two images. There are other alternative correlation processes, for example, gradient based shift estimation that could be used instead. In addition, the patch 3650 could also be re-designed to ensure the best performance for the alternative correlation process.

[Print the Head Size Measurement Chart]

Figure 38:
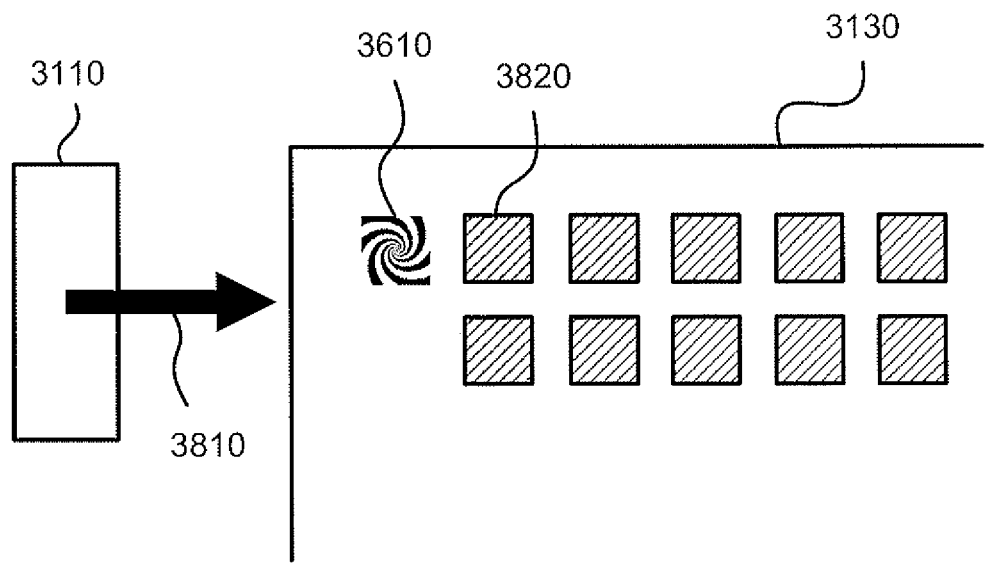
FIG. 38 and FIG. 39 are block diagrams illustrating the printing process of a chart which may be used to measure the head size.
Figure 39:
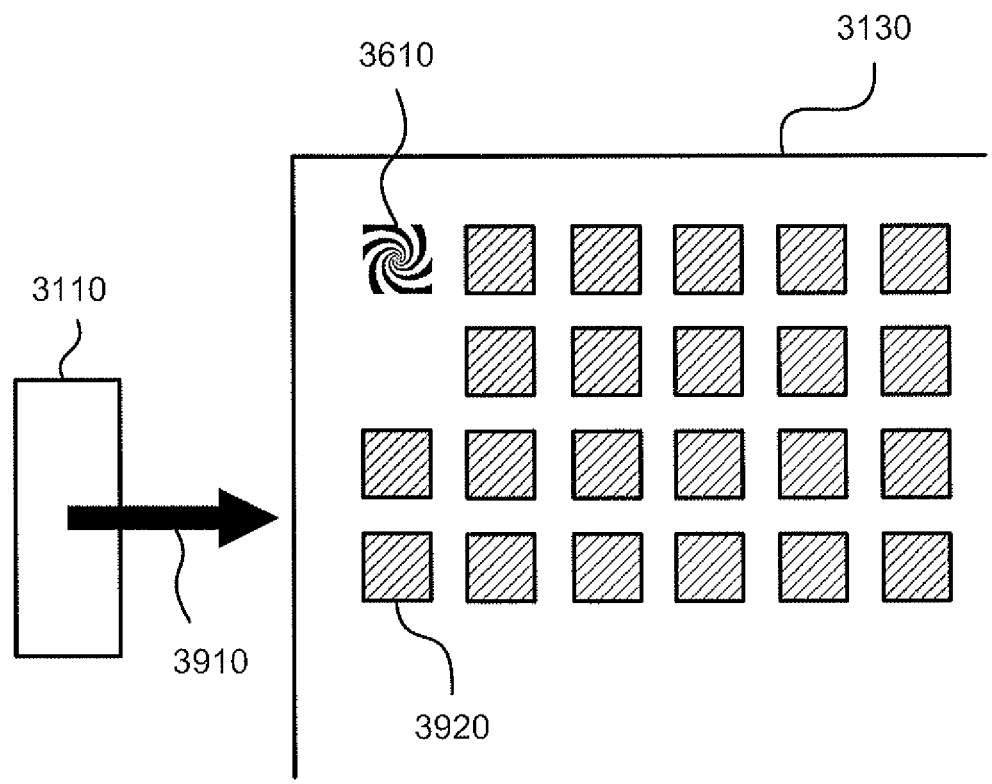

FIG. 38 and FIG. 39 illustrate the process 1810 in FIG. 18 of printing a chart which may be used to measure the head size 510.

Referring first to FIG. 38, the print head 3110 (see FIG. 31a) makes a passage 3810 across the printing medium 3130, which is in a first position and records (prints) a number of patches, e.g. 3820, arranged according to the patch layout shown in FIG. 36. An LRHF spiral registration mark 3610 is located to the left of patch 3820. As described previously with reference to FIG. 5, the distance between the patches is the desired head size 510.

Referring now to FIG. 39, the printing medium advance mechanism 3150 moves the printing medium 3130 to a second position, and a second passage 3910 of the print head 3110 records further patches, e.g. 3920. The complete measurement chart 3600 is printed after four passages. The printing process may be different for different printers, for example, the passages 3810 and 3910 may be forward passages, backward passages or a combination of forward and backward passages.

[Acquire the Scanned Image]

Figure 40:
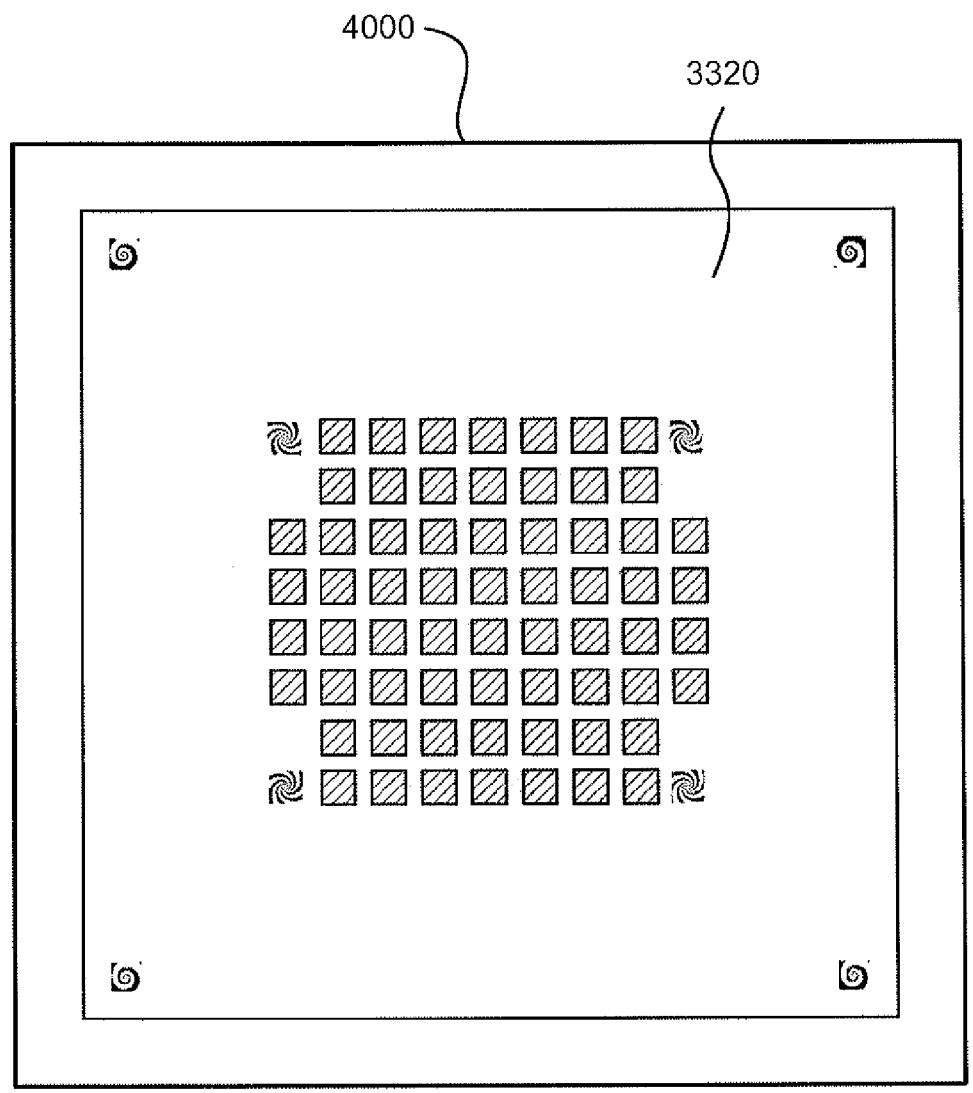
FIG. 40 shows an example of a scanned image.

FIG. 40 illustrates a scan 4000 of the head size measurement chart 3600 imaged through the two-dimensional pattern glass 3310. In the scanned image 4000, the reference pattern 3320 is superimposed on the head size measurement chart 3600. The scan can acquired at a resolution of 2400 dpi, although other resolutions may be practised.

[Analyse the Scanned Image to Determine the Head Size]

Figure 41:
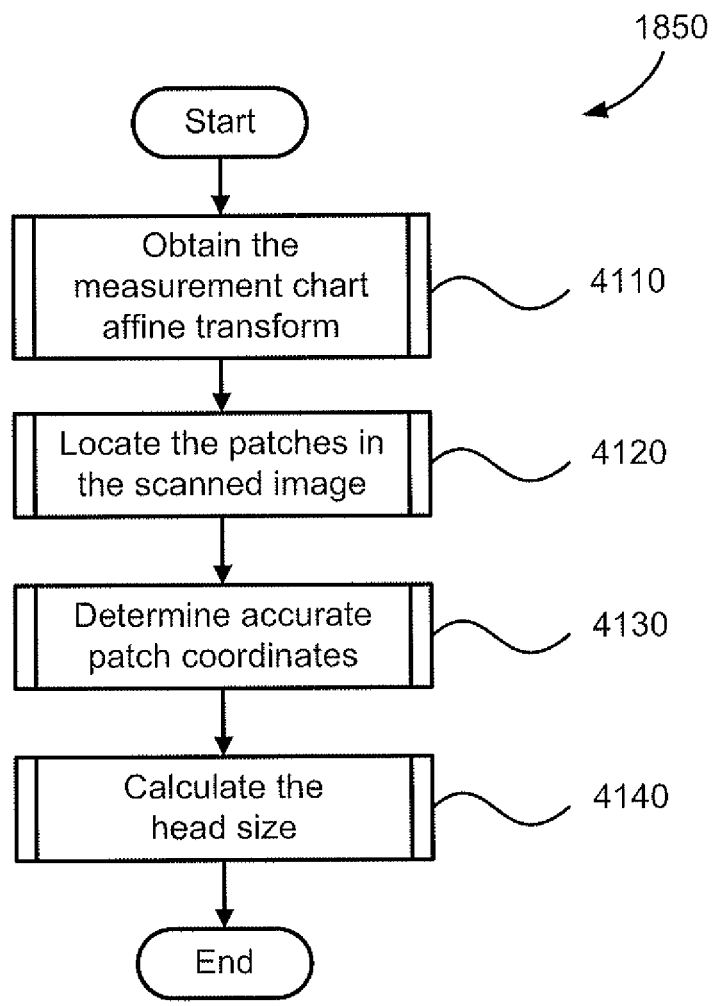
FIG. 41 is a schematic flow diagram illustrating a method of analysing the scanned image to determine the head size according to an embodiment of the invention.

The schematic flow diagram FIG. 41 illustrates the method 1850 of analysing the scanned image 4000 to determine the head size 510.

The method 1850 begins at step 4110 where the affine transform of the measurement chart is obtained. An affine transform between the coordinates of the measurement chart 3600 and the coordinates of the scanned image 4000 is determined This is accomplished according to the method 1400 as described previously, except that the LHRF registration mark adjustable parameters and locations used are those for the chart spiral registration marks 3610, 3620, 3630 and 3640 rather than the reference pattern spiral registration marks 3330 and 3331.

The parameters of the affine transform are the matrix $A_C$ and the vector $b_C$. The affine transform relates coordinates in the measurement chart 3600, $(x_C, y_C)$ to coordinates in the scanned image 4000, $(x_S, y_S)$ according to Formula (49), below:

$$\begin{pmatrix} x_S \\ y_S \end{pmatrix} = A_C \begin{pmatrix} x_C \\ y_C \end{pmatrix} + b_C. \tag{49}$$

As described previously, the parameters of the affine transformation could also be calculated using other marks on the measurement chart such as the patches, e.g. 3650.

Referring again to FIG. 41, at step 4120, the processor 3005 locates the patches in the scanned image. The coordinates of each patch in the scanned image 4000 are calculated.

FIG. 26 shows again the head size measurement chart 3600 of FIG. 36, but with each patch labelled with a number and a character. The number indicates the passage in which a given patch is printed. The character indicates which nozzles of the print head 3110 are used to print the patch. For example, 'A' may refer to the nozzle group 520 and 'B' to the nozzle group 530 in FIG. 5. Lines are drawn between patches that are printed at the same time. The distance between a patch printed by nozzle group 'A' and the patch printed at the same time by nozzle group 'B' is the head size 510.

In step 4120, the processor 3005 locates the patches in the scanned image 4000, according to the following steps:

(1) Calculate an estimated location for each patch using the known location of the patch in the chart and the affine transform determined in the previous step 4110;

(2) For each patch, extract an image region that contains the patch. For a patch size of 3 mm, the region size could be 200 pixels at 1200 dpi;

(3) Perform sub-pixel shift estimation between the extracted region of an 'A' patch to the extracted region of the corresponding 'B' patch; and (4) Adjust the location of the 'B' patch by the estimated shift.

Alternatively, step 4120 may be accomplished according to the following steps:

(1) Calculate an estimated location for each patch using the known location of the patch in the chart and the affine transform determined in the previous step 4110;

(2) For each patch, extract an image region that contains the patch. For a patch size of 3 mm, the region size could be 200 pixels at 1200 dpi;

(3) Perform sub-pixel shift estimation between the extracted region of each patch and the known theoretical pattern of the patch; and (4) Adjust the location of the patch by the estimated shift.

After determining the location of each patch in step 4120, the next step 4130 determines the accurate coordinates of each patch relative to the two-dimensional pattern glass 3310. This may be accomplished according to the method 3400 described previously.

In step 4140, the head size is calculated from the two-dimensional pattern glass coordinates of each patch. Because the two-dimensional pattern glass is rigid and not sensitive to thermal expansion, the distance between two patches in two-dimensional pattern glass 3310 coordinates corresponds to the physical distance between the patches on paper. Consequently, if two patches on paper are printed with a displacement of one head size 510, then the head size may be determined by measuring the distance in two-dimensional pattern glass 3110 coordinates between the patches. Such two patches are known as a measurement pattern. Referring again to FIG. 26, in this embodiment, there are 32 pairs of patches with each pair separated by a distance of the head size. For a given chart layout, let N denote the number of patch pairs and let $X_1, X_2, \ldots, X_N$ denote the physical distances measured for the pairs. Then the desired head size 510 may be calculated as the average distance according to Formula (50).

$$\text{head size} = \frac{1}{N} \sum_{i=1}^{N} X_i \tag{50}$$

[Second Embodiment]

Figure 42:
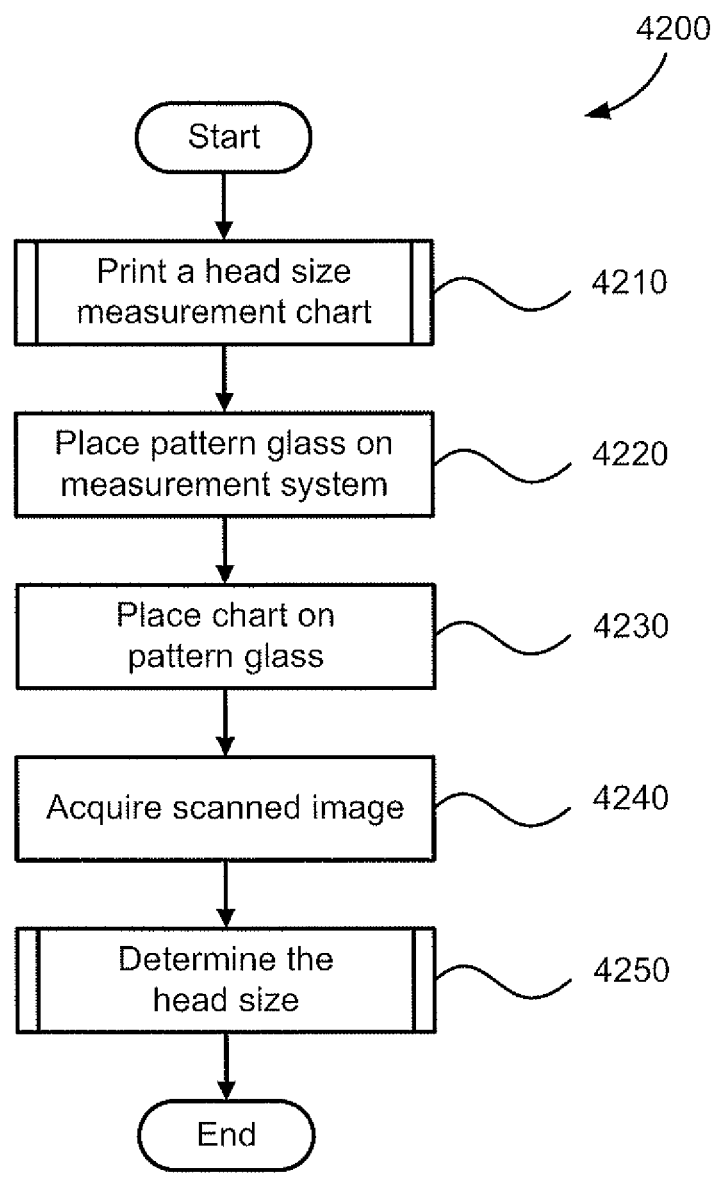
FIG. 42 is a schematic flow diagram illustrating a method of analysing the scanned image to determine the head size according to another embodiment of the invention.

A second embodiment of the invention is described with reference to the schematic flow diagram FIG. 42 illustrating an alternative method 4200 for accurately measuring the head size 510.

As can be seen with reference to FIG. 18, the steps in method 4200 are the same as those for the corresponding method 1800 in first embodiment. The method 4200 differs from the method 1800 in the design of the test chart and the method of analysing the scanned image.

The method 4200 begins at step 4210, where a head size measurement chart is printed. The design of the chart and the chart printing process are described in detailed below.

In step 4220, the two-dimensional pattern glass is placed on the measurement surface 3210 as described previously for the step 910 of the method 900.

In step 4230, the head size measurement chart is placed on the two-dimensional pattern glass as described above for the step 920 of the method 900.

In step 4240, the scanned image is acquired as described for step 930 above.

In step 4250, the scanned image is processed to determine the desired head size 510. This step is described in detail below.

[Chart Design and Printing for the Second Embodiment]

Figure 43:
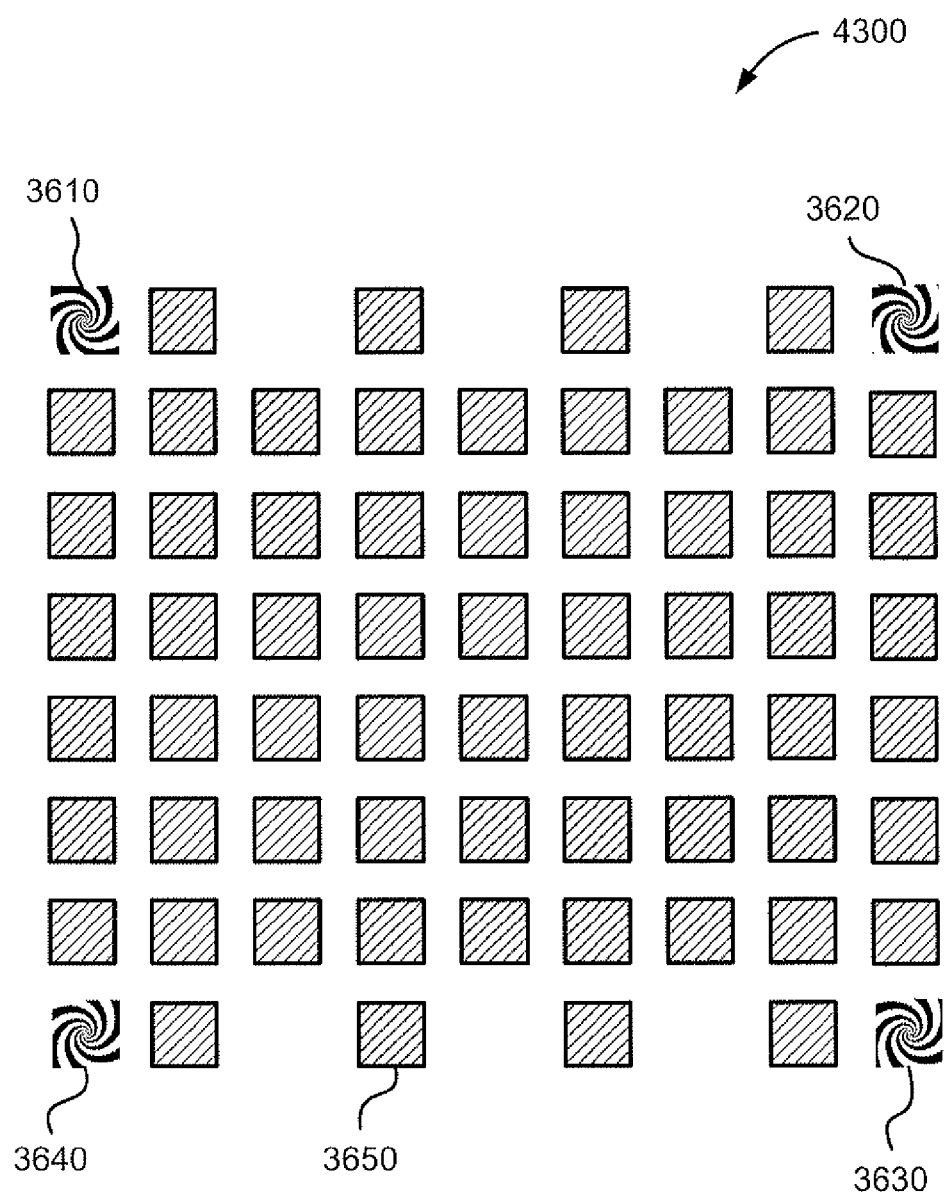
FIG. 43 is an example of a head size measurement chart.

FIG. 43 shows an example of a head size measurement chart 4300. Like the previous example chart 3600, the chart 4300 has four spirals 3610, 3620, 3630, 3640 and has two or more patches 3650, but the layout of the patches is different.

Figure 44:
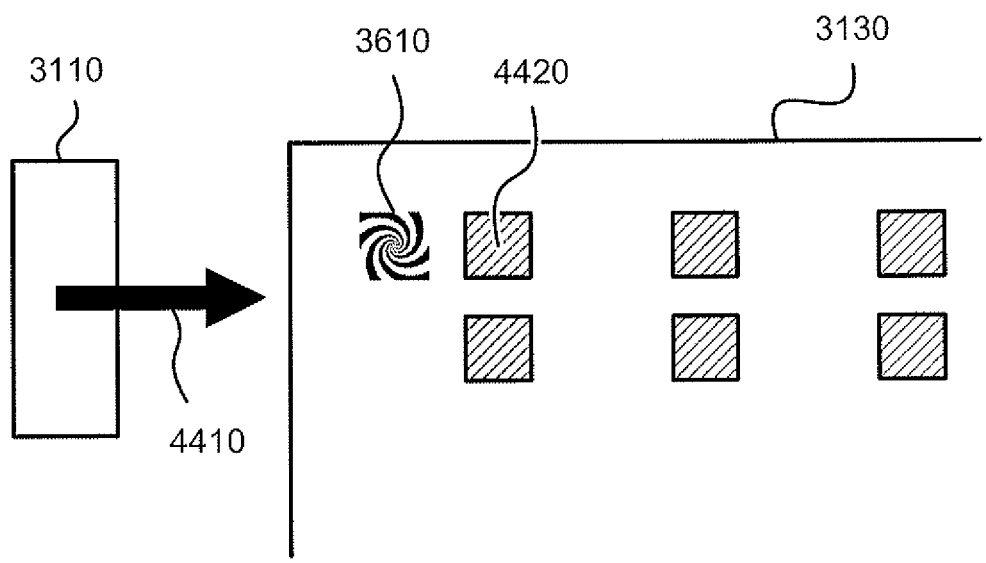
FIGS. 44, 45 and 46 illustrate the printing process for a head size measurement chart.
Figure 45:
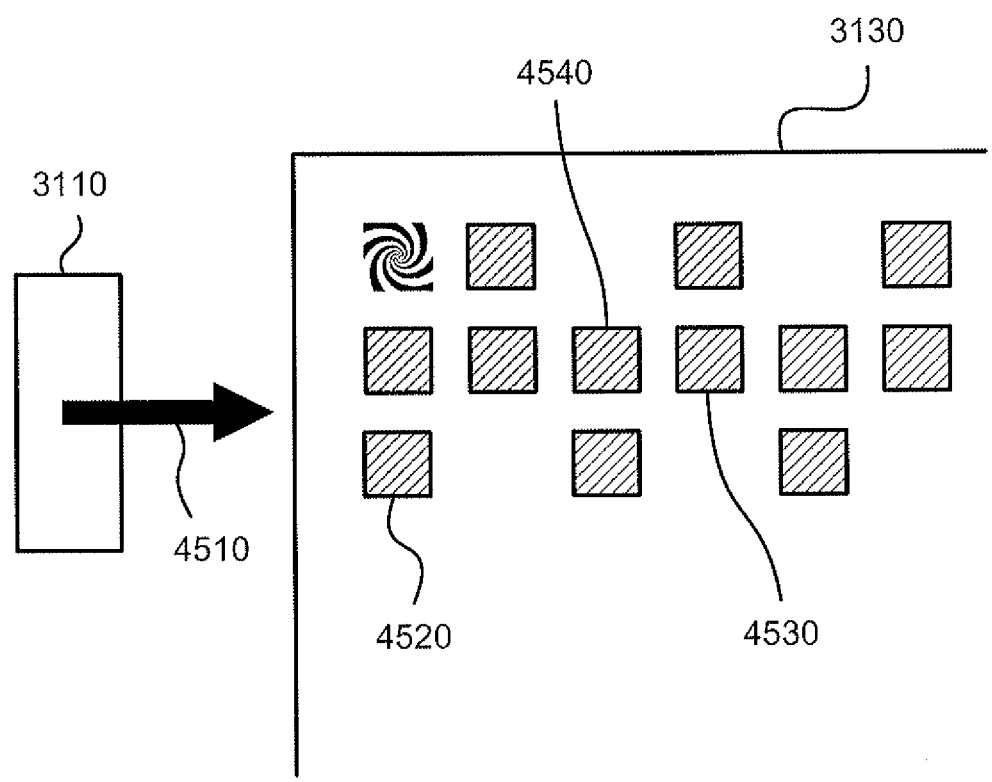
Figure 46:
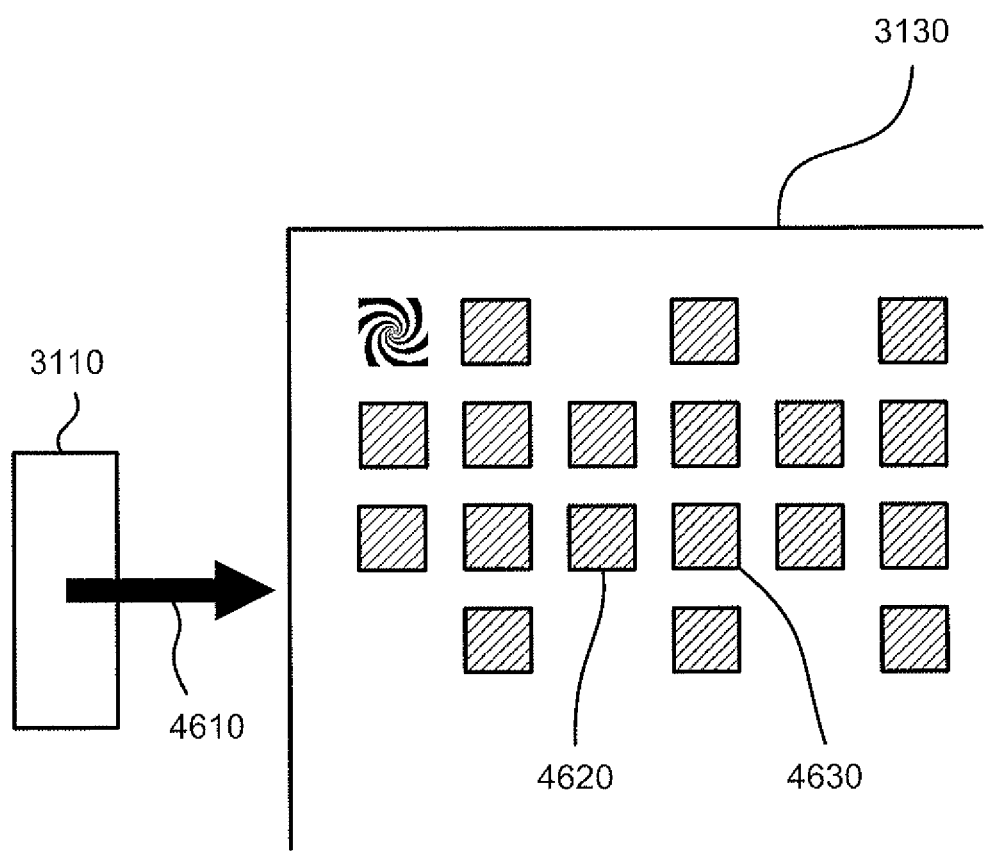

FIGS. 44, 45 and 46 illustrate the process of printing the chart 4300 which may be used to measure the head size 3110. Referring first to FIG. 44, the print head 3110 makes a passage 4410 across the printing medium 3130 and records (prints) a number of patches, e.g. 4420, with the patches arranged according to the patch layout shown in FIG. 43. As described previously with reference to FIG. 5, the distance between the patches is the desired head size 510.

As illustrated in FIG. 45, the printing medium advance mechanism 3150 moves the printing medium 3130 to a second position, and a second passage 4510 of the print head 3110 records further patches, e.g. 4520. The distance moved by the printing medium 3130 is carefully chosen so that the lower patches printed in the first passage 4410, e.g. 4530 are roughly aligned with the upper patches printed in the second passage 4510, e.g. 4540.

FIG. 46 illustrates a third printing passage 4610. As for the second passage 4510, the distance moved by the printing medium 3120 is carefully chosen so that the lower patches printed in the second passage, e.g. 4620, are roughly aligned with the upper patches printed in the third passage, e.g. 4630.

FIG. 26 shows again the head size measurement chart 3600 but with each patch labelled with a number and a character. The number indicates the passage in which a given patch is printed. The character indicates which nozzles of the print head 3110 are used to print the patch. For example, 'A' may refer to the nozzle group 520 and 'B' to the nozzle group 530 in FIG. 5. Lines are drawn between patches that are printed at the same time. The distance between a patch printed by nozzle group 'A' and the patch printed at the same time by nozzle group 'B' is the head size 510. Such pair of patches is known as a measurement pattern.

FIG. 47 shows again the head size measurement chart 4300 with each patch labelled by a number and a character. As described previously with respect to FIG. 26 for the first embodiment, the number indicates the passage in which a given patch is printed and the character indicates which nozzles of the print head 3110 are used to print the patch. As for FIG. 26, lines are drawn between patches that are printed at the same time.

Analyse the Scanned Image in the Second Embodiment

The different measurement chart 4300 design compared to the measurement chart 3600 permits an advantageous method of analysis to determine the desired head size 510.

Figure 48:
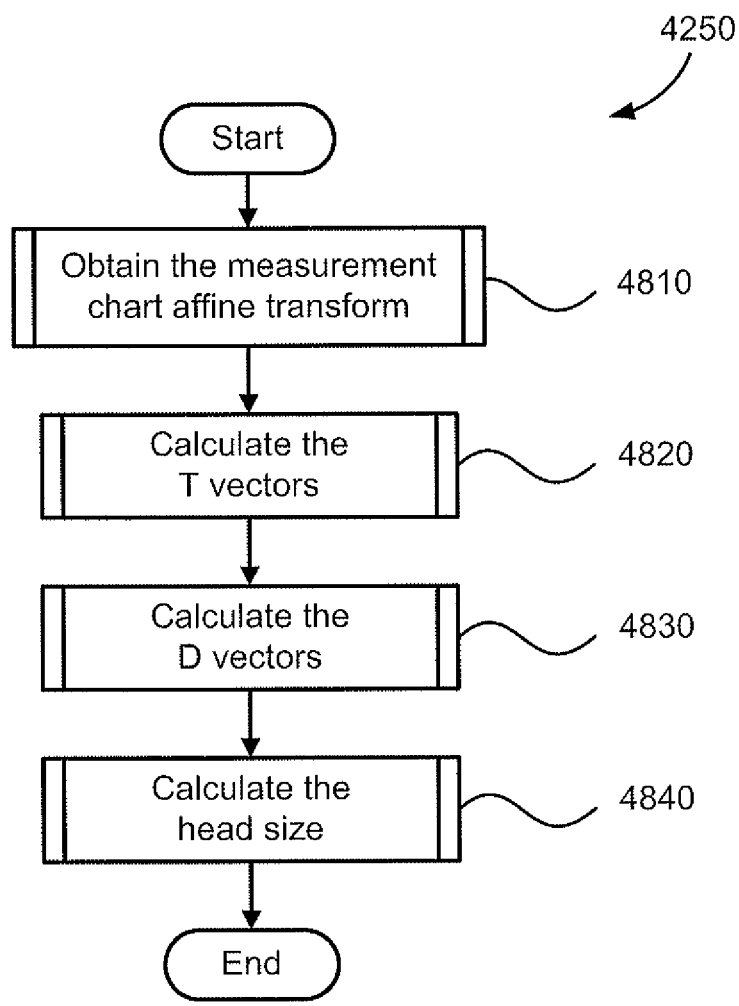
FIG. 48 is a schematic flow diagram illustrating a method of analysing the scanned image to determine the head size according to a further embodiment of the invention.

Referring now to the schematic flow diagram FIG. 48, the method 4250 of analysing the scanned image in the second embodiment to determine the head size 510 is described.

The method 4250 begins at step 4810 where an affine transform between the coordinates of the measurement chart 3600 and the coordinates of the scanned image is obtained. This is accomplished according to the method of step 4110 of the method 1850 described previously for the first embodiment.

[Define T, H and D Vectors]

Figure 47:
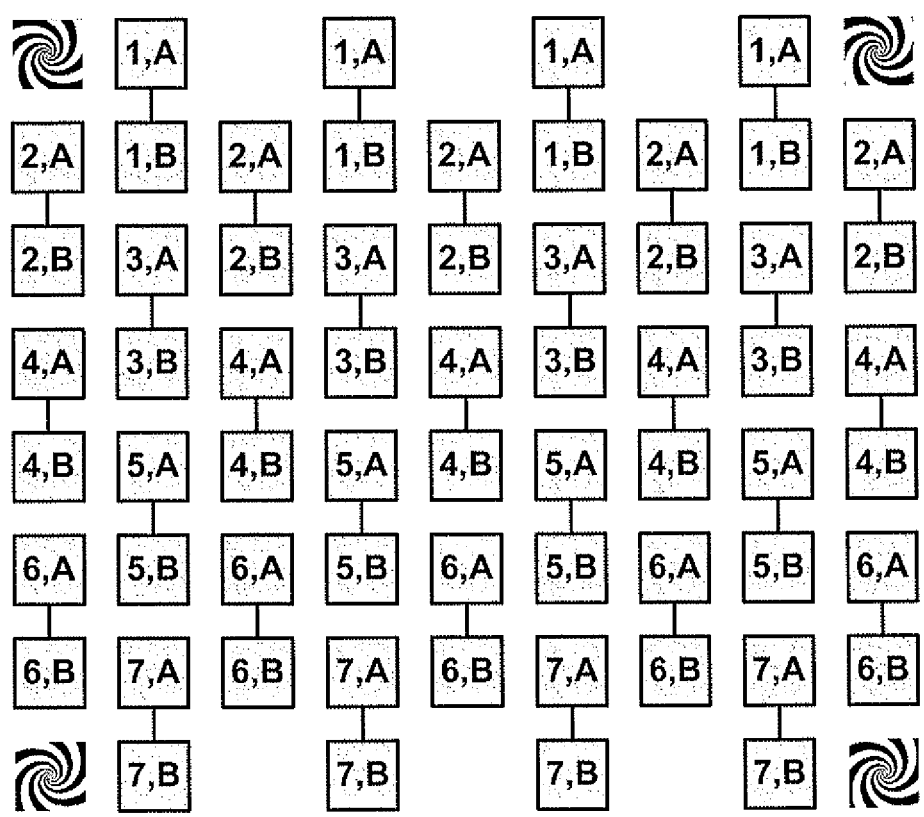
FIG. 47 is the head size measurement chart with each patch labelled by a number and a character.
Figure 49:
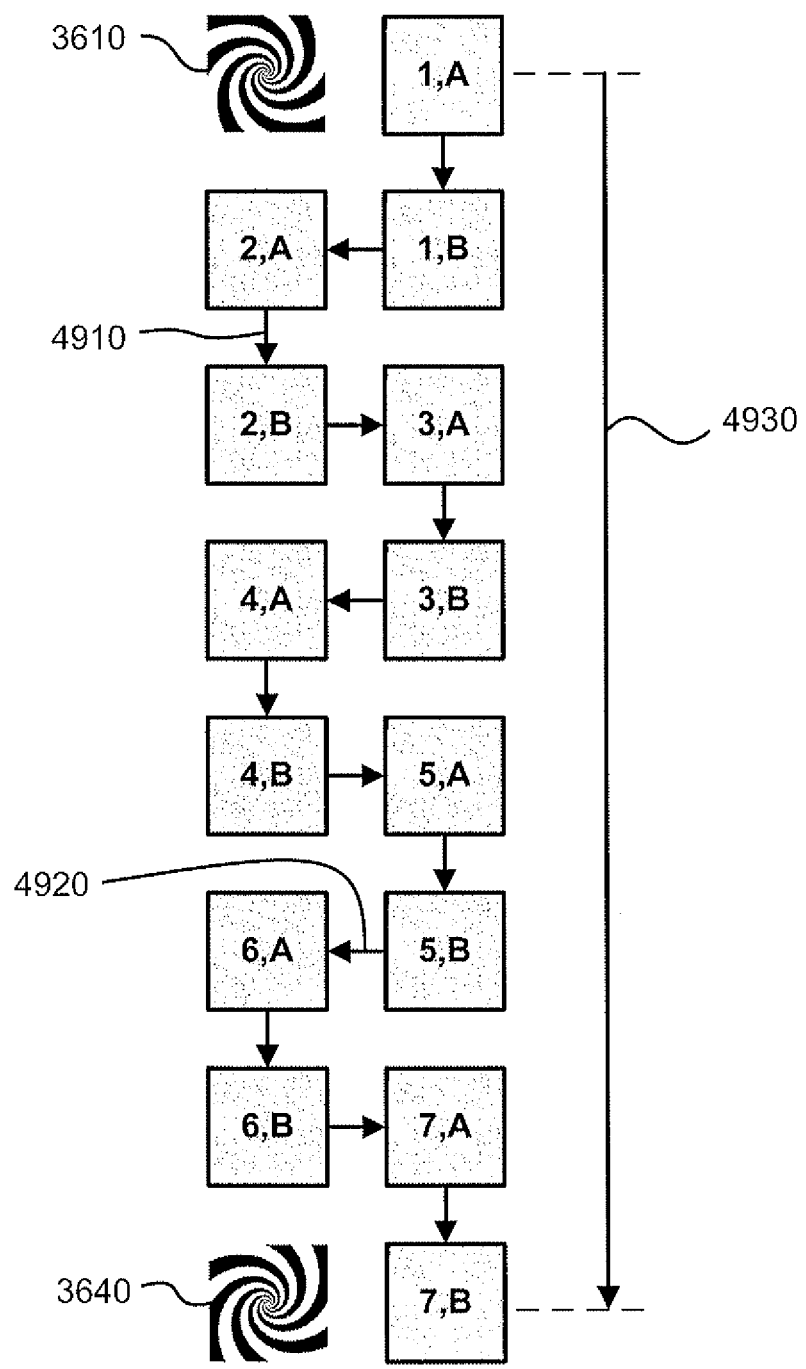
FIG. 49 shows an enlargement of a region of FIG. 47, and illustrates a measurement chain.

FIG. 49 shows an enlargement of a region of FIG. 47, with additional arrows drawn. Each arrow represents a displacement vector from the centre point of one patch to the centre point of the other patch. For the purposes of the following discussion, three different types of displacement vectors, namely H-vectors, D-vectors and T-vectors are defined.

The arrow 4910 represents a H-vector from the patch labelled "2,A" to the patch labelled "2,B". H-vectors correspond to the displacement between an "A" patch and a "B" patch printed at the same time and thus correspond to the head size 510. There are seven H-vectors shown in FIG. 49, specifically, the displacement vectors: (1) from "1,A" to "1,B"; (2) from "2,A" to "2,B"; (3) from "3,A" to "3,B"; (4) from "4,A" to "4,B"; (5) from "5,A" to "5,B"; (6) from "6,A" to "6,B"; and (7) from "7,A" to "7,B".

The arrow 4920 represents a D-vector from the patch labelled "5,B" to the patch labelled "6,A". There are six D-vectors shown in FIG. 49, specifically, the displacement vectors: (1) from "1,B" to "2,A"; (2) from "2, B" to "3,A"; (3) from "3,B" to "4,A"; (4) from "4,B" to "5,A"; (5) from "5,B" to "6, A"; and (6) from "6,B" to "7,A". The vertical component of each D-vector is related to the head size and the distance of the print medium 3130 advance between print passages.

The arrow 4930 represents a T-vector from the patch labelled "1,A" to the patch labelled "7,B". A T-vector represents the total displacement between the "A" patch in the first passage to the corresponding "B" patch in the last passage. There is one T-vector shown in FIG. 49.

Let the term "measurement chain" refer to a set of H-vectors, D-vectors and a T-vector such that the destination patch of the T-vector could be reached from the origin patch of the T-vector by successively following the chain of H-vectors and D-vectors. For example, the H-vectors, the D-vectors and the T-vector in FIG. 49 form one measurement chain. If T is the T-vector, $H_i$ is i-th of $N_H$ H-vectors and $D_i$ is the i-th of $N_D$ D-vectors in a measurement chain, then by the rule of vector addition, the equation in Formula (51) holds for every measurement chain.

$$T = \sum_{i=1}^{N_H} H_i + \sum_{i=1}^{N_D} D_i \tag{51}$$

In the example of FIG. 49, $N_H=7$ and $N_D=6$.
Rearranging Formula (51), yields Formula (52):

$$\frac{1}{N_H}\sum_{i=1}^{N_H} H_i = \frac{1}{N_H}\left(T - \sum_{i=1}^{N_D} D_i\right) \tag{52}$$

Formula (52) implies that the average of the H-vectors (and thus the average head size) may be calculated from the T-vector and the D-vectors. Let the average head size 510 thus determined be denoted "HC". Rewriting Formula (52), HC may be determined according to Formula (53), below:

$$HC = \frac{1}{N_H}\left(T - \sum_{i=1}^{N_D} D_i\right) \tag{53}$$

Figure 50:
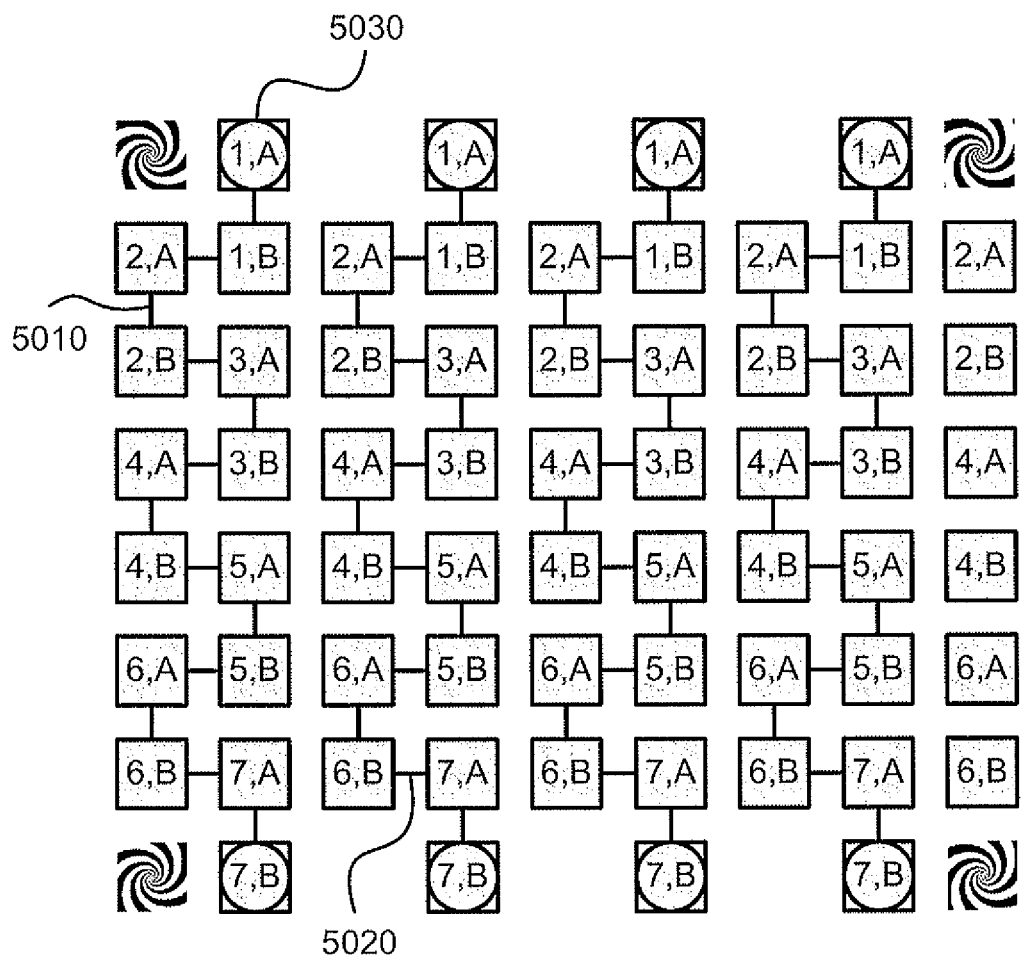
FIG. 50 illustrates one example of a possible selection of the D-vectors, the H-vectors, the T-vectors and hence the selection of the measurement chains.

In general, for a given measurement chart, numerous combinations of a T-vector, H-vectors and D-vectors exist that form a measurement chain. FIG. 50 illustrates one example of possible selections. The H-vectors, e.g. 5010, and D-vectors, e.g. 5020, are represented with lines. The patches used in the T-vectors, e.g. 5030, are circled. There are four measurement chains shown in FIG. 50.

Referring again to FIG. 48, after obtaining the location of each patch 4840, the next steps are to calculate the T-vectors 4850, and the D-vectors 4860.

[Measure the T-Vectors and D-Vectors]

Referring again to FIG. 48, the next step 4820 of the method 4250 calculates the T-vectors.

This is accomplished according to the method of steps 4120 and 4130 of method 1850 described previously, except that instead of analysing a pair of "A" and "B" patches separated by one head distance, the origin and destination patches of the T-vector are used, for example, patches "1,A" and "7,B", respectively in FIG. 49.

At the next step 4830, the D-vectors are calculated. These vectors may be calculated using a similar method to that employed in the previous step 4820.

Alternatively, these vectors may be calculated using the correlation method of step 4120 of method 1850 and scaling the resulting vector using the known scanned image resolution.

The use of a simple correlation technique is possible because the print medium advance for the head size measurement chart 4300 is carefully chosen so that the vertical component of a D-vector (in the same direction as the head size) is expected to be close to zero and thus less sensitive to scaling errors. This component is more significant for the final result than the horizontal component. As a result, typically the D-vectors can be calculated much faster and possibly more accurately without using the reference pattern 3320.

If the D-vectors are calculated without using reference pattern 3320, the reference pattern 3320 is only needed for the calculation of the T-vectors. In this case, the special pattern 3350 can be omitted in other regions. FIG. 33b shows an example of such a two-dimensional pattern glass 3310.

[Calculate the Head Size]

In step 4840 of FIG. 48, the head size is calculated. The average head size for each measurement chain is calculated according to Formula (28), above.

In this embodiment, the final head size measured from the measurement chart is calculated as the average of the head sizes calculated from each measurement chain, according to Formula (54), as follows:

$$\text{head size} = \frac{1}{N_C} \sum_{i=1}^{N_C} HC_i, \quad (54)$$

where $N_C$ is the number of measurement chains. In the example of FIG. 50, $N_C=4$.

[Other Selections of H, D, T Vectors]

Figure 51:
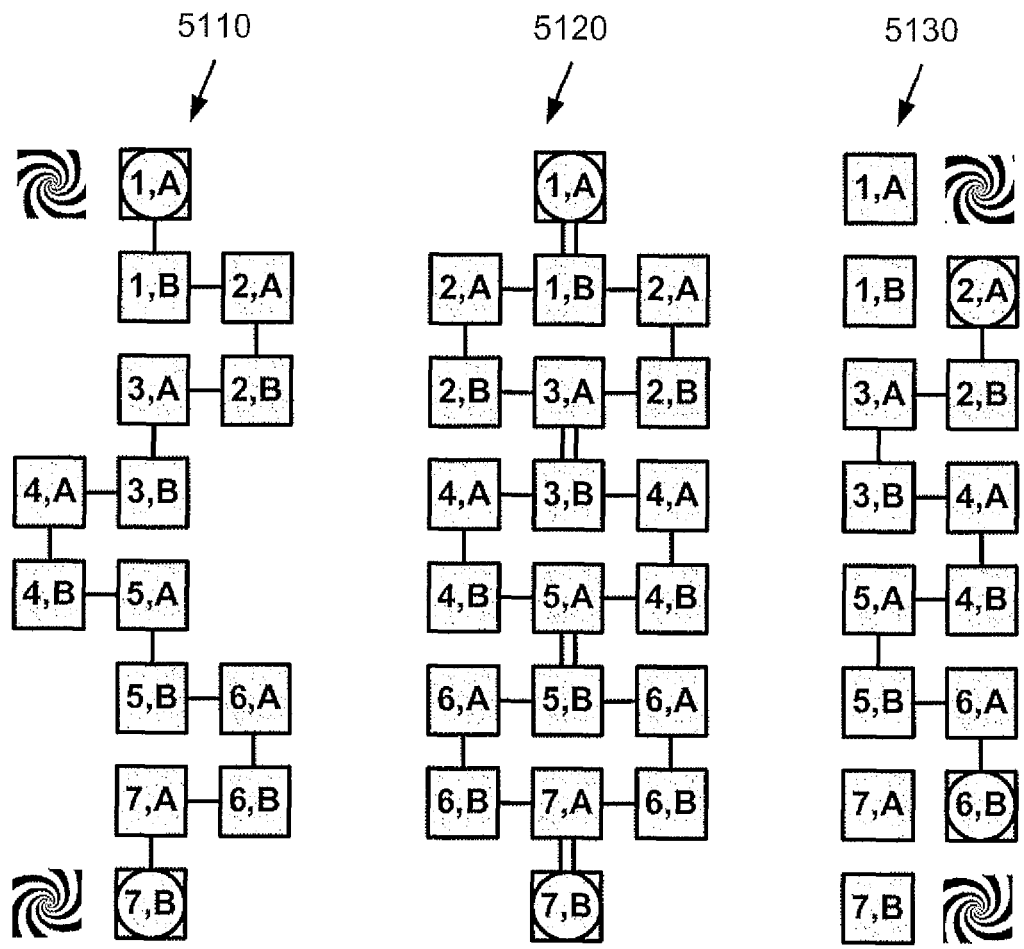
FIG. 51 illustrates some examples of alternative selections of measurement chains.

FIG. 50 illustrated one example of a possible selection of the measurement chains. Some examples of alternative selections are shown in FIG. 51. As before, the D-vectors and H-vectors are represented as lines and the patches used in the T-vectors are circled.

Referring to the measurement chains 5110, the selection of D-vectors is not limited to one side. D-vectors can be on the either side as shown. More than one measurement chain can be defined for a single T-vector. The group labelled 5120 can be understood as two overlapped measurement chains. Referring to the measurement chain 5130, a measurement chain need not start from the first print passage, and/or need not finish at the last print passage.

When some measurement chains of a measurement chart are longer/shorter, or when the measurement chain overlaps, a weighted average may be used to calculate the desired head size 510.

[Printer Characteristics of Inkjet Printers]

Figure 52:
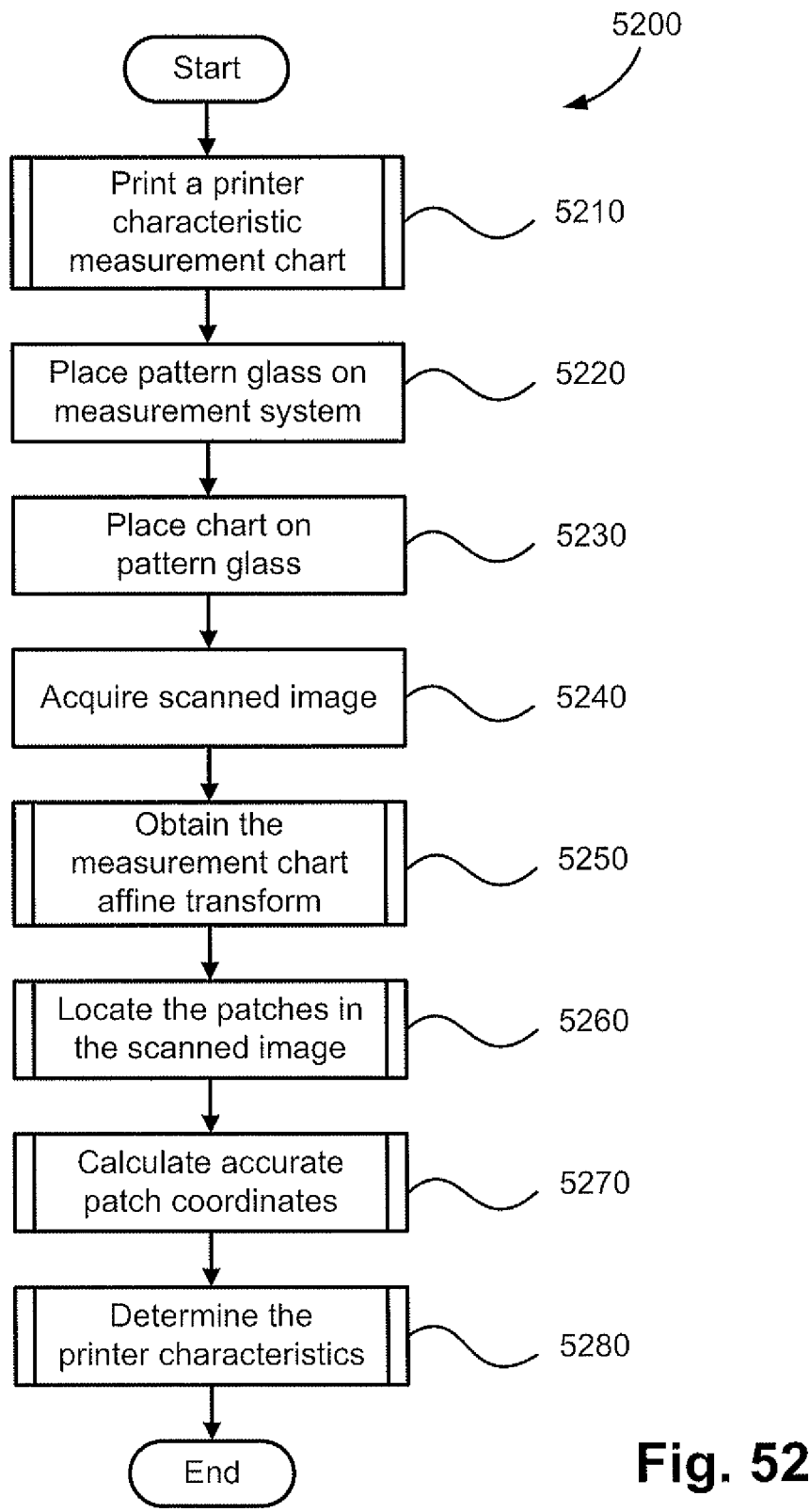
FIG. 52 is a schematic flow diagram illustrating a method for accurately measuring printer characteristics.

FIG. 52 is a schematic flow diagram illustrating a method 5200 for accurately measuring many different types of printer characteristics.

The method 5200 begins at step 5210, where a printer characteristics measurement chart is printed. The design of the chart and the chart printing process are described in detailed below.

In step 5220, the two-dimensional pattern glass is placed on the measurement surface 3210 as described previously for the step 910 of the method 900.

In the following step 5230, the printer characteristics measurement chart is placed on the two-dimensional pattern glass as described above for the step 920 of the method 900.

In step 5240, the scanned image is acquired as described for the step 930 above.

In step 5250, the measurement chart affine transform is obtained. The chart orientation is calculated as described for step 4110 above.

In step 5260, the patches in the scanned image are located as described above for the step 4120 of FIG. 41.

In the next step 5270, the accurate coordinates of the patches are calculated as described for step 4130 of FIG. 41.

In step 5280, the scanned image is processed to determine the printer characteristics. This step is described in detail below. The method 5200 then ends.

Figure 53:
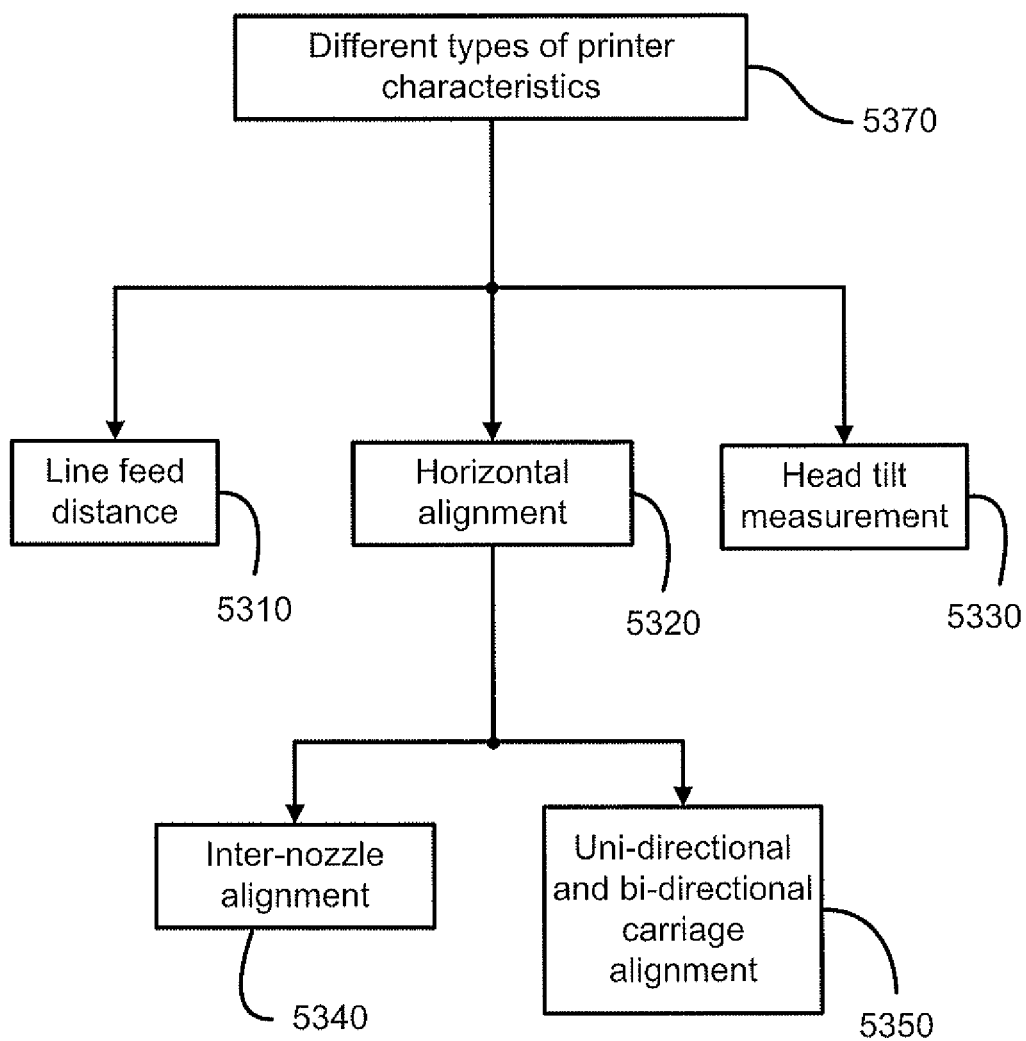
FIG. 53 is a block diagram illustrating some examples of different types of printer characteristics.

As is illustrated in FIG. 53, the printer characteristics determined in method 5200 may be grouped as follows: line feed distance 5310, horizontal alignment 5320, and head tilt measurement 5330. The horizontal alignment 5320 may further be categorized into the inter-nozzle alignment 5340 and uni-directional and bi-directional carriage alignment 5350. For each printer characteristic, the design of the chart, the printing and the processing are different. Each is described separately in detail below. The head size and all the above-mentioned printer characteristics, or any subset thereof, can be measured in one chart.

[Embodiment 3—Measure Long Line Feed]

Figure 54:
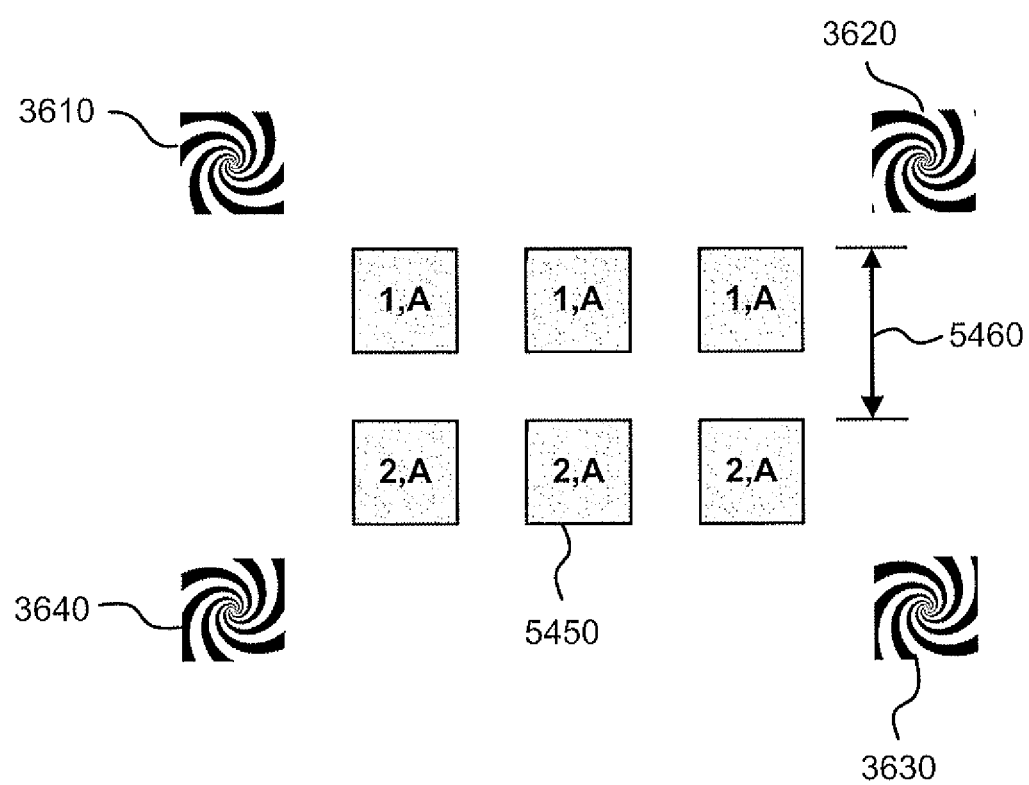
FIG. 54 shows an implementation of the printer's line feed distance characteristic measurement chart.

FIG. 54 shows an implementation of the printer's line feed distance characteristic measurement chart. The chart has four LRHF spiral registration marks 3610, 3620, 3630 and 3640 and at least two patches 5450, described below.

The printer line feed distance is a measure of how far the print medium is advanced by the line feed mechanism of the ink jet printer 3015. The patches labelled 1 are printed in one passage of the print head. The patches labelled 2 are printed by another passage, which is separated by an advance of the print medium 5460. The patches labelled A are printed by a set of nozzles, for example, the nozzle group 520 in FIG. 5.

Referring back to FIG. 52, following the step 5210 of printing a printer characteristic measurement chart as illustrated in FIG. 54, the following steps 5220, 5230, 5240, 5250, 5260, and 5270 are the same as the steps 920, 930, 940, 4110, 4120 and 4130, respectively, described previously.

In the final step 5280 of the method 5200, the accurate patch coordinates determined in the previous step 5270 are used to determine the desired line feed values.

Let P(r, c) denote the accurate patch coordinate calculated in step 5270 for the patch in row r and column c of the measurement chart in FIG. 54 and let LF(r) denote the $r^{th}$ line feed distance. Then LF(r) may be calculated according to Formula (55), as follows:

$$LF(r) = \frac{1}{N_C} \sum_{c=1}^{N_C} \|P(r, c) - P(r+1, c)\|, \quad (55)$$

Where $N_C$ denotes the number of columns, and $\|.\|$ denotes a two-dimensional distance function, also known as a L2norm.

A line feed value calculated according to the method described above may be affected by the horizontal alignment of the patches. In the case where there are at least two columns, an alternative way to calculate the line feed distance independently of the horizontal alignment is described hereinafter.

Let BFL(r) denote the line of best fit for the points {P(r, c): c=1 to $N_C$}. Let PLD(p, l) denote the closest distance of a point p to a line l. Then the line feed may be calculated according to Formula (56), below:

$$LF(r) = \frac{1}{N_C} \sum_{c=1}^{N_C} PLD(P(r, c), BFL(r+1)). \quad (56)$$

Embodiment 4—Measure Short Line Feed

Figure 55:
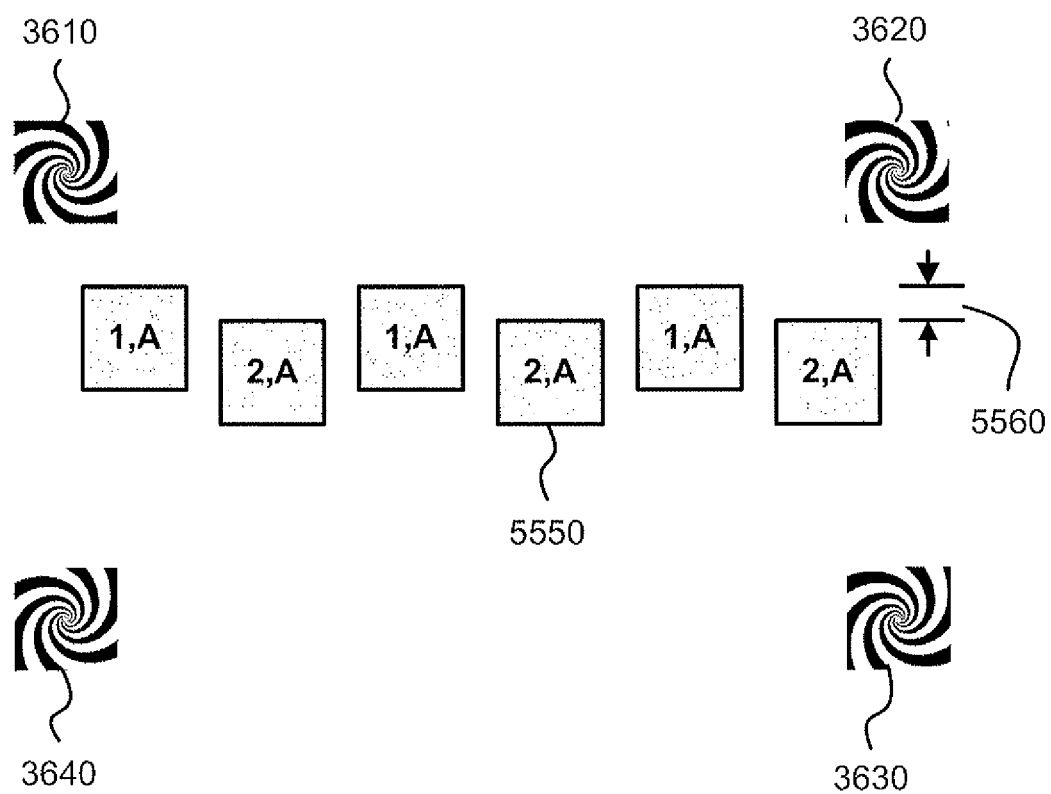
FIG. 55 shows an implementation of the printer's line feed distance characteristic measurement chart.

The line feed measurement chart described in FIG. 54 is suitable for measuring a line feed distance that is larger than the height of a patch. FIG. 55 describes a line feed measurement chart suitable for measuring line feed distance shorter than a patch. The chart has four LRHF spiral registration marks 3610, 3620, 3630 and 3640 and at least two patches 5550, described below.

The printer line feed distance is a measure of how far the print medium is advanced by the line feed mechanism of the ink jet printer 3015. The patches labelled 1 are printed in is one passage of the print head. The patches labelled 2 are printed by another passage, which is separated by an advance of the print medium 5560. The patches labelled A are printed by a set of nozzles, for example, the nozzle group 520 in FIG. 5.

Referring back to FIG. 52, following the step 5210 of printing a printer characteristic measurement chart as illustrated in FIG. 55, the following steps 5220, 5230, 5240, 5250, 5260, and 5270 are the same as the steps 920, 930, 940, 4110, 4120 and 4130, respectively, described previously. In the final step 5280 of the method 5200, the accurate patch coordinates determined in the previous step 5270 are used to determine the desired line feed values.

Let P(r,c) denote the accurate patch coordinate calculated in step 5270 for the $c^{th}$ patch printed in passage r of the measurement chart in FIG. 55. One way to calculate the line feed is to project P(r,c) and P(r+1,c) onto the medium advance direction, and calculate the distance of projected points. The steps involved are:

(1) Calculate the accurate coordinates of the spirals as described in step 1500;
(2) Calculate the best fit vertical line of the four spirals;
(3) Calculate the $r^{th}$ line feed distance, denoted by LF(r) according to Formula (57) below:

$$LF(r) = \frac{1}{N_C} \sum_{c=1}^{N_C} \|PP(r, c) - PP(r+1, c)\| \quad (57)$$

where PP(r,c) denotes the coordinate of the point P(r,c) projected onto the best fit vertical line; $N_C$ denotes the number of printed patches per row; and $\|.\|$ denotes a two-dimensional distance function, also known as a L2 norm.

In the case where there are at least two patches printed per row, an alternative way to calculate the line feed distance is described hereinafter.

Let BFL(r) denote the line of best fit for the points {P(r, c): c=1 to $N_C$}. Let PLD(p, l) denote the closest distance of a point p to a line l. The line feed may be calculated according to Formula (58), below:

$$LF(r) = \frac{1}{N_C} \sum_{c=1}^{N_C} PLD(P(r, c), BFL(r+1)) \quad (58)$$

[Embodiment 5—Measure Head Tilt]

Figure 56:
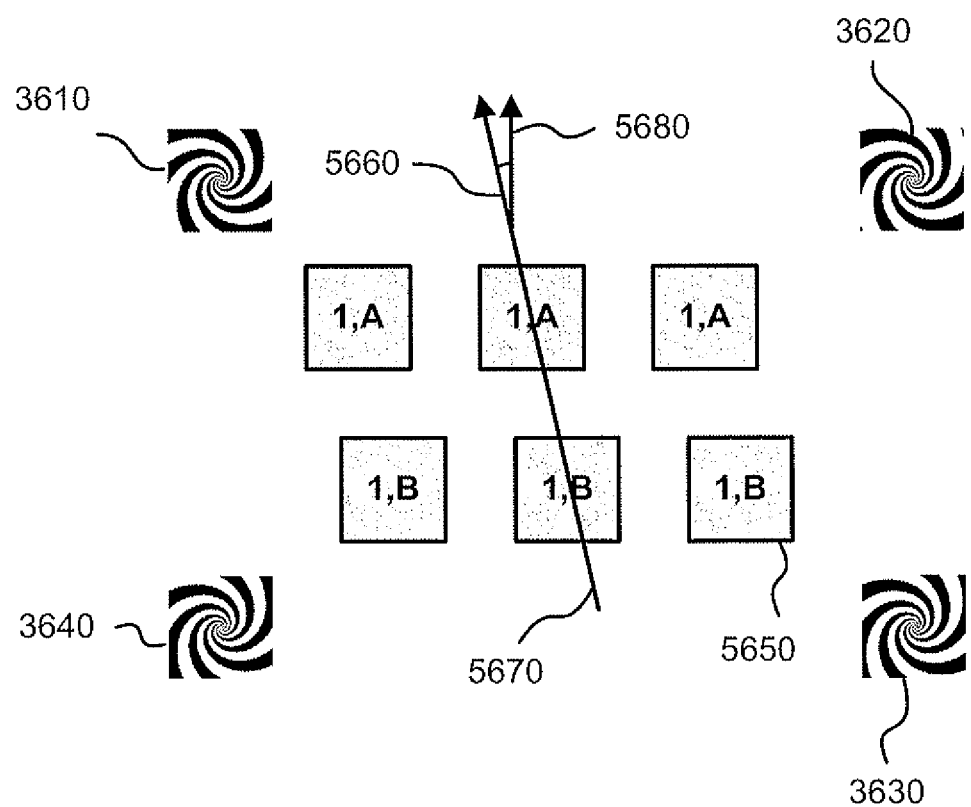
FIG. 56 shows an implementation of the printer's head tilt characteristic measurement chart.

FIG. 56 shows an implementation of the printer's head tilt characteristic measurement chart. The chart has four LRHF spiral registration marks 3610, 3620, 3630 and 3640 and at least two patches 5650, described below.

The patches labelled 1 are printed in one passage. The patches labelled A are printed by a first set of nozzles, for example, the nozzle group 520 in FIG. 5. Patches labelled B are printed by a different set of nozzles, for example, the nozzle group 530 in FIG. 5, with both nozzle groups in the same nozzle bank.

Head tilt 5660 refers to the angle between the actual direction 5670 of the nozzle banks and the designed direction 5680 of the nozzle banks, which is perpendicular to the direction of the print passage.

Without loss of generality, the angle is defined positive when the head is tilted clockwise and negative for an anti-clockwise tilt.

Referring back to FIG. 52, following the step 5210 of printing a printer characteristic measurement chart as illustrated in FIG. 56, the following steps 5220, 5230, 5240, 5250, 5260, and 5270 are the same as the steps 920, 930, 940, 4110, 4120 and 4130, respectively, described previously. In step 5280, the accurate patch coordinates determined in the previous step 5270 are used to determine the desired head tilt values.

Let A(r, c) denote the accurate patch coordinate calculated in step 5270 for the $c^{th}$ A-patch printed in passage r of the measurement chart in FIG. 56. Let B(r,c) denote the accurate patch coordinate calculated in step 5270 for the $c^{th}$ B-patch printed in passage r of the measurement chart in FIG. 56. Let L(r, c) be a straight line that goes through A(r, c) and B(r,c). Let AngleBetween(L1, L2) denote a function that calculates the acute angle in radians from the line L1 to the line L2. The angle is defined to be positive when the angle is clockwise and negative when the angle anti-clockwise. The head tilt may be calculated according to the following steps:

(1) Calculate the accurate coordinates of the spirals as described in step 1500;
(2) Calculate the best fit vertical line of the coordinates of the four spirals, denoted BFVL;
(3) Calculate the head tilt, denoted HT, according to Formula (59) below:

$$HT = \frac{1}{N_C} \frac{1}{N_R} \sum_{c=1}^{N_C} \sum_{r=1}^{N_R} AngleBetween(BFVL, L(r, c)), \quad (59)$$

where $N_C$ and $N_R$ denotes the number of columns and the number of passages.

If there are at least two columns, an alternative way to calculate the head tilt is described hereinafter.

Let BFL(r) denote the line of best fit for the points {A(r, c): c=1 to $N_C$}. The Head tilt (HT) may be calculated according to Formula (60) below:

$$HT = \left( \frac{1}{N_C} \frac{1}{N_R} \sum_{c=1}^{N_C} \sum_{r=1}^{N_R} AngleBetween(BFL(r), L(r, c)) \right) - \frac{\pi}{2}. \quad (60)$$

[Embodiment 6—Inter-Nozzle Alignment]

Figure 57:
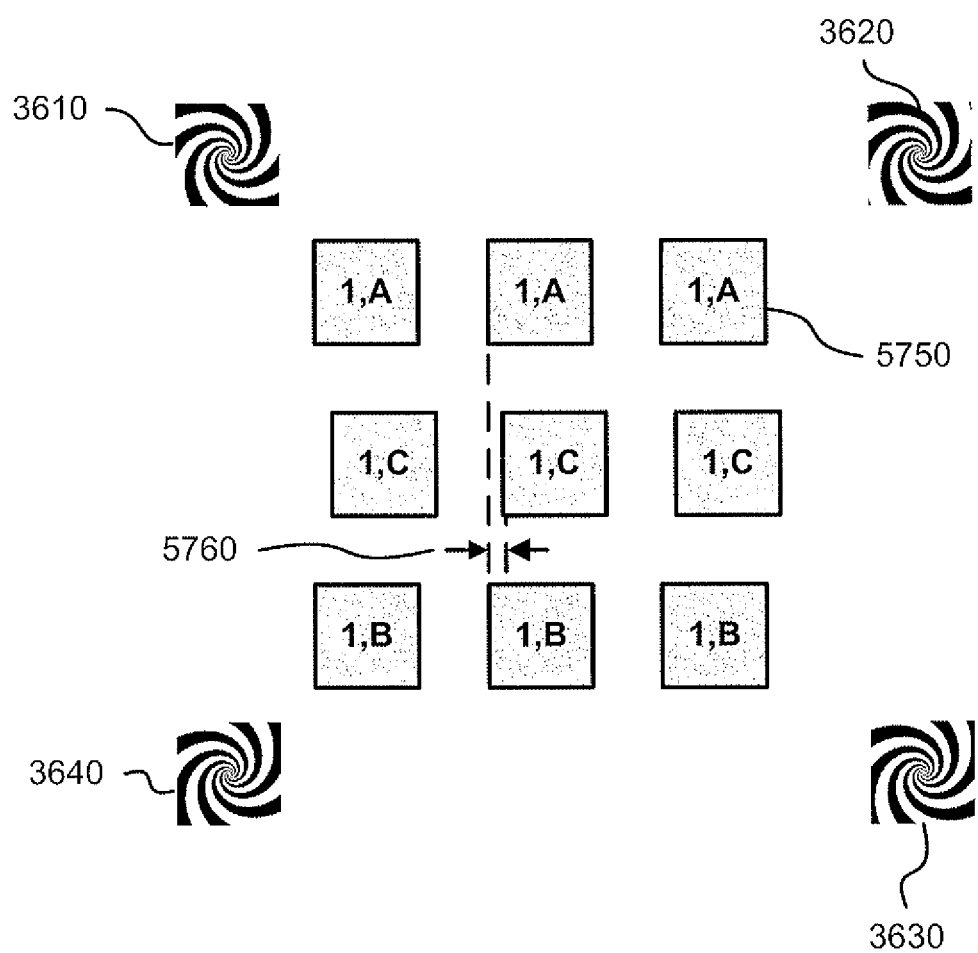
FIG. 57 shows an implementation of the printer's inter-nozzle alignment characteristic measurement chart.

FIG. 57 shows an implementation of a printer inter-nozzle alignment characteristic measurement chart. The chart has four LRHF spiral registration marks 3610, 3620, 3630 and 3640 and at least two patches 5750, described below.

The patches labelled 1 are printed in one passage. The patches labelled A are printed by a first set of nozzles, for example, the nozzle group 520 in FIG. 5. Patches labelled B are printed by a different set of nozzles, for example, the nozzle group 530 in FIG. 5, where with both nozzle groups are in the same nozzle bank. Patches labelled C are printed by yet another set of nozzles by a different nozzle bank and are separated from the nozzles used to print the patches labelled A and B. Inter-nozzle alignment distance 5760 refers to the distance, in the carriage scan direction, required to align separate nozzle banks in the print head.

Referring back to FIG. 52, following the step 5210 of printing a printer characteristic measurement chart as illustrated in FIG. 57, the following steps 5220, 5230, 5240, 5250, 5260, and 5270 are the same as the steps 920, 930, 940, 4110, 4120 and 4130, respectively, described previously. In step 5280, the accurate patch coordinates determined in the previous step 5270 are used to determine the desired inter-nozzle alignment distance.

Let A(r, c) denote the accurate patch coordinate calculated in step 5270 for the $c^{th}$ A-patch printed in passage r of the measurement chart in FIG. 57. Let B(r,c), C(r,c) be similarly defined for the B-patches and C-patches.

Figure 58:
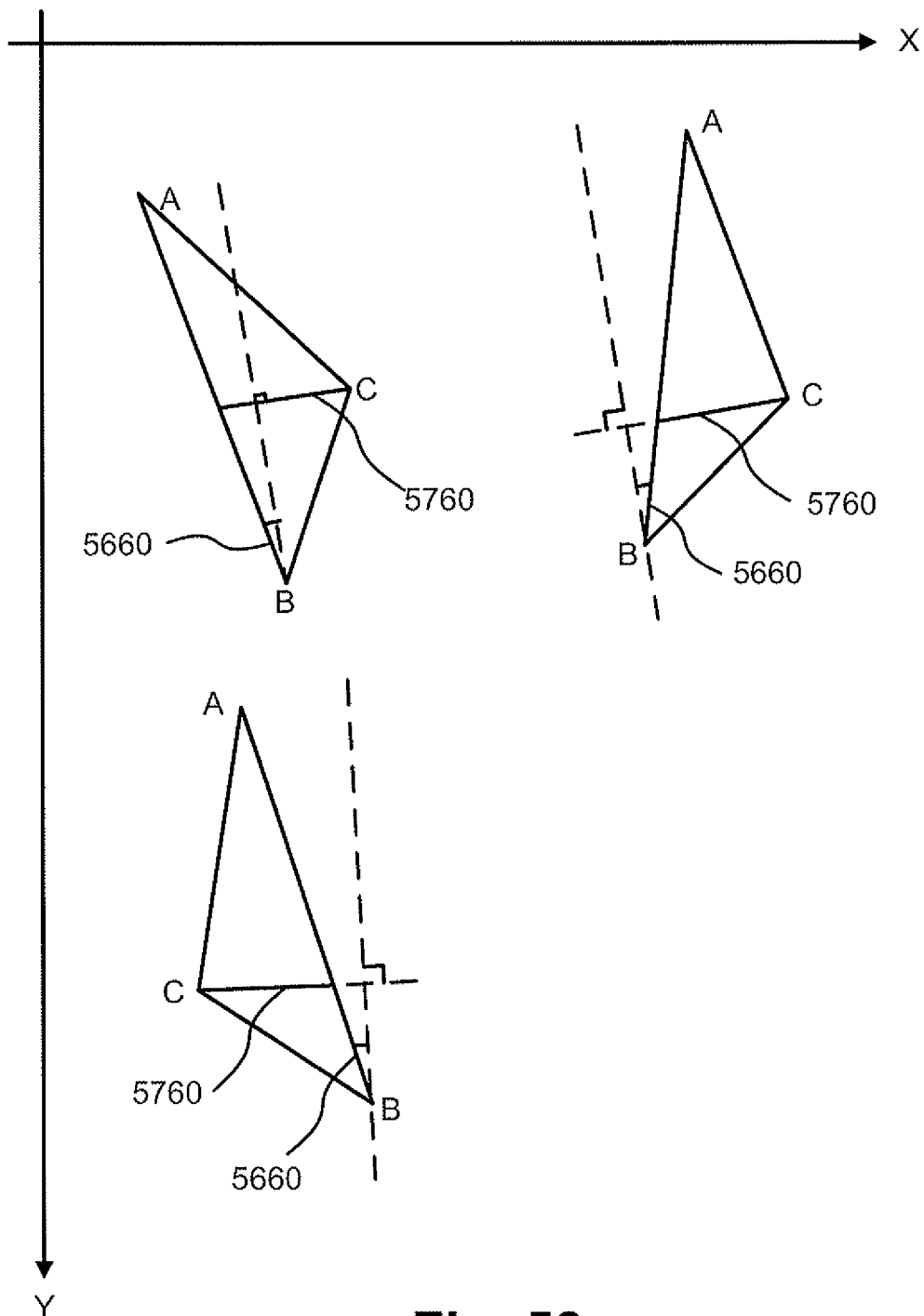
FIG. 58 illustrates the geometric relation of the patches, the head tile angle and the inter-nozzle alignment distance.

FIG. 58 illustrates the geometric relation between A(r, c), B(r, c), C(r, c), the head tilt angle 5660 and the inter-nozzle alignment distance 5760. The calculation of the head tilt angle is previously described. FIG. 58 illustrates three examples. With the given coordinates of the point A, B and C, and the head tilt angle 5660, the inter-nozzle alignment distance 5760 is calculated by coordinate geometry. Let X(r,c) denote the inter-nozzle alignment distance calculated in passage r and column c. The inter-nozzle alignment distance (INAD) of the entire measurement chart may be calculated according to Formula (61) below:

$$INAD = \frac{1}{N_C} \frac{1}{N_R} \sum_{c=1}^{N_C} \sum_{r=1}^{N_R} X(r, c) \qquad (61)$$

[Embodiment 7—Bi-Directional and Uni-Directional Carriage Alignment]

Figure 59:
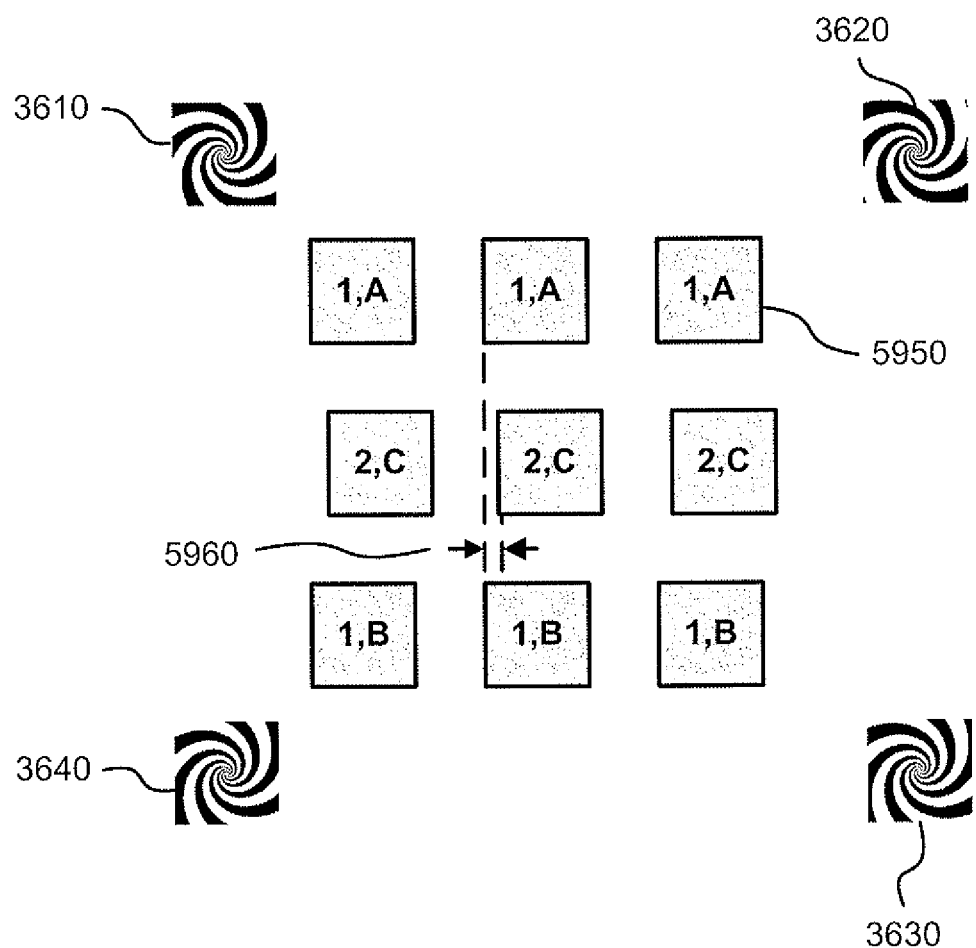
FIG. 59 shows an implementation of the printer's carriage alignment characteristics measurement chart.

FIG. 59 shows an implementation of a printer carriage alignment characteristic measurement chart. This chart may be used for both bi-directional and uni-directional carriage alignment. The difference being the carriage passage direction in which the particular patches are printed. The chart has four LRHF spiral registration marks 3610, 3620, 3630 and 3640 and at least two patches 5950, described below.

The patches labelled 1 are printed in one passage. The patches labelled 2 are printed by another passage with no advance in the print medium. The patches labelled A are printed by a first set of nozzles, for example, the nozzle group 520 in FIG. 5. The patches labelled B are printed by a different set of nozzles, for example, the nozzle group 530 in FIG. 5. Patches labelled C are printed by yet another set of nozzles and are separated from the nozzles used to print the patches labelled A and B. All the patches in FIG. 59 are printed by the same nozzle bank.

For uni-directional alignment, all the patches in FIG. 59 are printed in the same carriage passage direction, for example, the default forward direction. For bi-directional alignment, the patches labelled 1 and the patches labelled 2 are printed in different direction, for example the forward direction, and the backward direction. The carriage alignment distance 5960 refers to the distance, in the carriage scan direction, required to align the patches printed in different print passage.

Referring back to FIG. 52, following the step 5210 of printing a printer characteristic measurement chart as illustrated in FIG. 59, the following steps 5520, 5530, 5540, 5550, 5560, and 5570 are the same as the steps 920, 930, 940, 4110, 4120 and 4130, respectively, described previously. In step 5280 of the method 5200, the accurate patch coordinates determined in the previous step 5270 are used to determine the desired inter-nozzle alignment distance.

Let A(r, c) denotes the accurate patch coordinate calculated in step 5270 for the $c^{th}$ A-patch printed in passage r of the measurement chart in FIG. 58. Let B(r,c), C(r,c) be similarly defined for the B-patches and C-patches.

Figure 60:
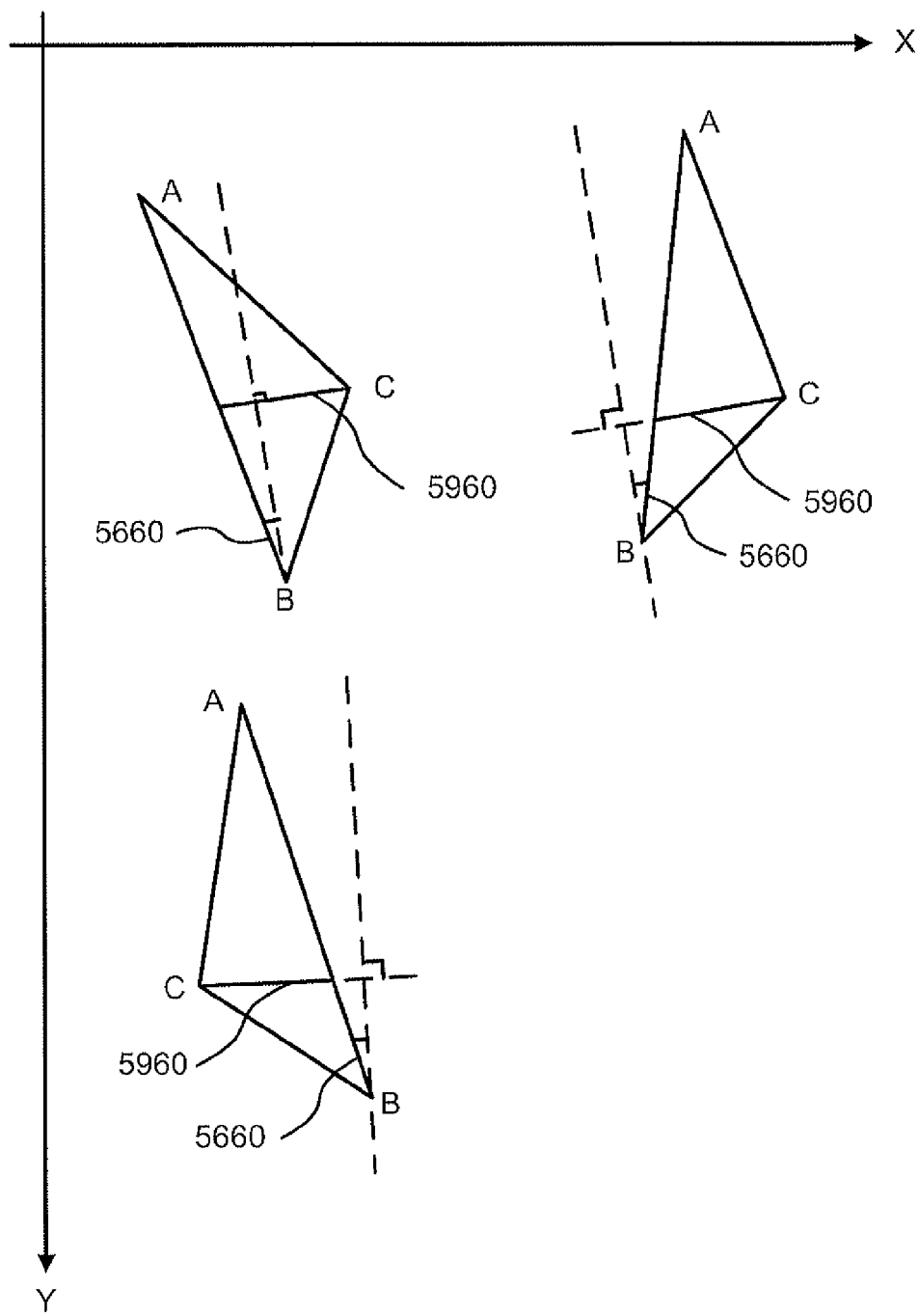
FIG. 60 illustrates the geometric relation of the patches, the head tile angle and the carriage alignment distance.

FIG. 60 illustrates the geometric relation between A(r, c), B(r, c), C(r, c), the head tile angle 5660 and the carriage alignment distance 5960. The calculation of the head tilt angle is previously described. FIG. 60 illustrates three examples. With the given coordinates of the point A, B and C, and the head tilt angle 5660, the carriage alignment distance 5960 is calculated by coordinate geometry, for example. Let X(r,c) denotes the carriage alignment distance calculated in passage r and column c. The carriage alignment distance (CAD) of the entire measurement chart may be calculated according to Formula (62) below:

$$CAD = \frac{1}{N_C} \frac{1}{N_R} \sum_{c=1}^{N_C} \sum_{r=1}^{N_R} X(r, c). \qquad (62)$$

The following labelled paragraphs set out salient features of the arrangements disclosed in the above description.

A. A method of determining a location of a graphical object printed onto a print medium, said graphical object comprising a plurality of object marks, the method comprising the steps of:

superposing a two-dimensional reference pattern having a pre-defined degree of accuracy over the printed graphical object, the two-dimensional reference pattern comprising a plurality of pattern marks;

scanning the superposed printed graphical object and reference pattern to produce a scanned image;

determining a location coordinate of the graphical object in the scanned image; and refining the location coordinate dependent upon the scanned reference pattern to determine a reference pattern coordinate associated with the location coordinate, said reference pattern coordinate defining the location of the graphical object; wherein said graphical object is adapted to have a separation area in the vicinity of the location coordinate to thereby minimise occlusion of the pattern marks by the object marks in the vicinity of the reference pattern coordinate.

B. The method according to paragraph A where said reference pattern is a pseudo-random noise pattern.

C. The method according to paragraph A where said graphical object comprises a spread spectrum pattern.

D. The method according to paragraph A where said graphical object is in the form of a patch or a plurality of patches.

E. The method according to paragraph D where said patch has a rectangular shape.

F. The method according to paragraph E where said location coordinate is at the centre of said patch.

G. The method according to paragraph A where said separating area has a rectangular shape.

H. The method according to paragraph G where the centre of said separating area coincides with said location coordinate.

I. The method according to paragraph A where the size of said separating area is chosen to trade-off between accuracy of the determination of the location coordinate and accuracy of the determination of the reference pattern coordinate.

J. The method according to paragraph A where said reference pattern is a pseudo-random noise pattern in grey color, and said graphical object is a spread spectrum pattern with cyan or magenta dots or both.

K. The method according to paragraph J, where the noise pattern and said graphical object utilise the Cr color channel in the YCbCr color space.

L. The method according to paragraph A wherein said separating area comprises a plurality of areas in the vicinity of the location coordinate.

M. The method according to paragraph L wherein the location coordinate coincides with the centroid of said separating area.

N. The method according to paragraph J, comprising a further step of reducing scanner mis-registration by optimising correlation between the different scan color channels.

O. The method according to paragraph J, wherein noise pattern and said graphical object utilise the Chroma channels in a Luma/Chroma color space.

P. The method according to paragraph J, wherein said reference pattern is a pseudo-random noise pattern in grey color, and said graphical object is a spread spectrum pattern in yellow color, and the chosen subset of color characteristics is either the R or G or (B minus R) or (B minus G) color signal in the RGB color space.

Q. An apparatus for determining a location of a graphical object printed onto a print medium, said graphical object comprising a plurality of object marks, the apparatus comprising:
  a two-dimensional reference pattern glass having a pre-defined degree of accuracy for superposing over the printed graphical object, the two-dimensional reference pattern comprising a plurality of pattern marks;
  a scanner for scanning the superposed printed graphical object and reference pattern to produce a scanned image;
  a memory for storing a program; and
  a processor for executing the program, said program comprising:
    code for determining a location coordinate of the graphical object in the scanned image; and
    code for refining the location coordinate dependent upon the scanned reference pattern to determine a reference pattern coordinate associated with the location coordinate, said reference pattern coordinate defining the location of the graphical object; wherein said graphical object is adapted to have a separation area in the vicinity of the location coordinate to thereby minimise occlusion of the pattern marks by the object marks in the vicinity of the reference pattern coordinate.

R. A computer program product including a computer readable storage medium having recorded thereon a computer program for directing a processor to execute a method for determining a location of a graphical object printed onto a print medium, said graphical object comprising a plurality of object marks, the program comprising:
  superposing a two-dimensional reference pattern having a pre-defined degree of accuracy over the printed graphical object, the two-dimensional reference pattern comprising a plurality of pattern marks;
  code for scanning a superposed printed graphical object and a two-dimensional reference pattern having a pre-defined degree of accuracy, the two-dimensional reference pattern comprising a plurality of pattern marks, to produce a scanned image;
  code for determining a location coordinate of the graphical object in the scanned image; and
  code for refining the location coordinate dependent upon the scanned reference pattern to determine a reference pattern coordinate associated with the location coordinate, said reference pattern coordinate defining the location of the graphical object; wherein said graphical object is adapted to have a separation area in the vicinity of the location coordinate to thereby minimise occlusion of the pattern marks by the object marks in the vicinity of the reference pattern coordinate.

S. A method of determining a head size of a print head of a printer, said method comprising the steps of:
  printing using a print head onto a print medium a test pattern comprising at least two patches with a predetermined relationship to said print head, said at least two patches each comprising a plurality of colourant dots arranged to form a spread spectral pattern;
  imaging at least a portion of said print medium with a two-dimensional reference pattern superimposed with said test pattern printed on said print medium, said two-dimensional reference pattern adapted to detect the location and orientation of said test pattern;
  locating in said image said at least two patches of said test pattern relative to said two-dimensional reference pattern; and
  determining said head size from said at least two patch locations.

T. A method of determining a head size of a print head of a printer, said method comprising the steps of:
  printing using a print head onto a print medium a test pattern comprising a plurality of measurement patterns each having at least two patches with a predetermined relationship to said print head, said at least two patches of a respective measurement pattern each comprising a plurality of colourant dots arranged to form a spread spectral pattern in one passage, each measurement pattern being separated from an adjacent measurement pattern by a print medium advance operation, a patch of the subsequent measurement pattern being located to minimise a distance measurement in a direction of interest between said patch and one of said at least two patches of the previous measurement pattern;
  imaging at least a portion of said print medium with a two-dimensional reference pattern superimposed with said test pattern printed on said print medium, said two-dimensional reference pattern adapted to detect the location and orientation of said test pattern;
  calculating said minimised distance measurement;
  locating in said image a patch from one passage and another patch from another passage relative to said two-dimensional reference pattern; and
  determining said head size from said patch locations of said measurement patterns and said minimised distance measurement.

U. The method according to paragraph S, further comprising the steps of statistically combining head sizes to provide an overall spatial alignment characteristic dependent upon printing multiple measurement patterns on said print medium and calculating multiple head sizes.

V. A method of determining a spatial alignment characteristic of a printer, the method comprising the steps of:
  printing using a print head onto said print medium a test pattern comprising a plurality of patches at predetermined measurement points, said patches each comprising a plurality of colourant dots arranged to form a spread spectral pattern;
  imaging at least a portion of said print medium with a two-dimensional reference pattern superimposed with said test pattern printed on said print medium, said two-dimensional reference pattern adapted to detect the location and orientation of said test pattern;
  locating in the image said at least two patches relative to said two-dimensional reference pattern; and determining a spatial alignment characteristic from said at least two patch locations.

W. The method according to paragraph V, wherein said test pattern comprises patches printed in different print passages of said print head.

X. The method according to paragraph V, wherein said test pattern comprises two patches, one patch printed vertically above the other patch on said print medium in the same print passage.

Y. The method according to paragraph V, wherein said test pattern comprises three patches, two patches being printed by a nozzle bank so that one of the two patches is located vertically above the other of the two patches, and the remaining patch of said three patches being printed in the middle by a different nozzle bank, all patches being printed in the same passage.

Z. The method according to paragraph V, wherein said test pattern comprises three patches, two patches being printed by a nozzle bank so that one of the two patches is located vertically above the other of the two patches, and the remaining patch of said three patches being printed in the middle with a different passage without advance of said print medium.

AA. The method according to paragraph S, wherein said locating step comprises:
  extracting a region of said image to be analysed;
  calculating a simulated region corresponding to said extracted region of said image dependent upon simulation parameters;
  correcting an affine transformation for coarse alignment dependent upon a shift between said extracted region and said simulated region; refining said simulation parameters dependent upon said shift; and
  determining reference pattern coordinates dependent upon said refined simulation parameters.

AB. The method according to paragraph AA, further comprising the step of applying a mask to region to be extracted to neglect one or more portions of said region.

AC. The method according to paragraph S, wherein said two-dimensional reference pattern comprises at least two registration marks for determining a location approximately and at least one special pattern for determining a location accurately.

AD. The method according to paragraph AC, wherein:
  said at least two registration marks each comprise a spiral mark, and
  said at least one special pattern each comprises a two-dimensional pseudo-random noise pattern having a predetermined marking density with each marking having a predetermined size and shape.

AE. The method according to any one of the preceding paragraphs, wherein a transparent substrate with low coefficient of thermal expansion embodies said two-dimensional reference pattern.

AF. The method according to paragraph AE, wherein said transparent substrate embodying said two-dimensional reference pattern comprises a glass substrate formed with chrome particles on or in said glass substrate.

AG. An apparatus, comprising:
  a memory for storing data and instructions for a central processing unit;
  a central processing unit coupled to said memory, said central processing unit performing the method according to any one of claims 1-14 dependent upon said instructions and said data.

AH. A computer program product comprising a tangible computer readable medium having a computer program recorded for execution by a computer to perform the method according to paragraph S.

INDUSTRIAL APPLICABILITY

The arrangements described are applicable to the computer and data processing industries and particularly for the high quality printing industry.

The foregoing describes only some embodiments of the present invention, and modifications and/or changes can be made thereto without departing from the scope and spirit of the invention, the embodiments being illustrative and not restrictive.

Methods, apparatuses and computer program products have been disclosed for determining a head size of a print head of a printer. Methods, apparatuses and computer program products have also been disclosed for determining a spatial alignment characteristic of a printer. The foregoing describes only some embodiments of the present invention, and modifications and/or changes can be made thereto without departing from the scope and spirit of the invention, the embodiments being illustrative and not restrictive.

We claim:

1. A method of determining a location of a graphical object printed onto a print medium, said graphical object comprising a plurality of object marks, the method comprising the steps of:
  superposing a two-dimensional reference pattern having a pre-defined degree of accuracy over the printed graphical object, the two-dimensional reference pattern comprising a plurality of pattern marks;
  scanning the superposed printed graphical object and reference pattern to produce a scanned image;
  determining a location coordinate of the graphical object in the scanned image; and
  refining the location coordinate dependent upon the scanned reference pattern to determine a reference pattern coordinate associated with the location coordinate, said reference pattern coordinate defining the location of the graphical object; wherein said graphical object is adapted to have a separation area in the vicinity of the location coordinate to thereby minimize occlusion of the pattern marks by the object marks in the vicinity of the reference pattern coordinate.

2. The method according to claim 1, wherein said reference pattern is a pseudo-random noise pattern.

3. The method according to claim 1, wherein said graphical object comprises a spread spectrum pattern.

4. The method according to claim 1, wherein said graphical object is in the form of at least one patch having said location coordinate at the center of said patch.

5. The method according to claim 1, wherein the size of said separation area is chosen to trade-off between accuracy of the determination of the location coordinate and accuracy of the determination of the reference pattern coordinate.

6. The method according to claim 1, wherein said reference pattern is a pseudo-random noise pattern in grey color, and said graphical object is a spread spectrum pattern with cyan or magenta dots or both, and wherein the noise pattern and said graphical object utilize a Cr color channel in a YCbCr color space.

7. The method according to claim 1, wherein said separating area comprises a plurality of areas in the vicinity of the location coordinate, and wherein the location coordinate coincides with the centroid of said separating area.

8. The method according to claim 6, further comprising a step of reducing scanner mis-registration by optimizing a correlation between different scan color channels.

9. An apparatus for determining a location of a graphical object printed onto a print medium, said graphical object comprising a plurality of object marks, the apparatus comprising:
- a two-dimensional reference pattern glass having a pre-defined degree of accuracy for superposing over the printed graphical object, the two-dimensional reference pattern comprising a plurality of pattern marks;
- a scanner for scanning the superposed printed graphical object and reference pattern to produce a scanned image;
- a memory for storing a program; and
- a processor for executing the program, said program comprising:
- code for determining a location coordinate of the graphical object in the scanned image; and
- code for refining the location coordinate dependent upon the scanned reference pattern to determine a reference pattern coordinate associated with the location coordinate, said reference pattern coordinate defining the location of the graphical object; wherein said graphical object is adapted to have a separation area in the vicinity of the location coordinate to thereby minimize occlusion of the pattern marks by the object marks in the vicinity of the reference pattern coordinate.

10. A non-transitory computer readable storage medium having recorded thereon computer executable code of a computer program for directing a processor to execute a method for determining a location of a graphical object printed onto a print medium, said graphical object comprising a plurality of object marks, wherein a two-dimensional reference pattern having a pre-defined degree of accuracy is superimposed over the printed graphical object, the two-dimensional reference pattern comprising a plurality of pattern marks, the program comprising:
- code for scanning the superposed printed graphical object and the two-dimensional reference pattern having the pre-defined degree of accuracy, to produce a scanned image;
- code for determining a location coordinate of the graphical object in the scanned image; and
- code for refining the location coordinate dependent upon the scanned reference pattern to determine a reference pattern coordinate associated with the location coordinate, said reference pattern coordinate defining the location of the graphical object; wherein said graphical object is adapted to have a separation area in the vicinity of the location coordinate to thereby minimize occlusion of the pattern marks by the object marks in the vicinity of the reference pattern coordinate.

11. A method of determining a head size of a print head of a printer, said method comprising the steps of:
- printing, using a print head, onto a print medium, a test pattern comprising at least two patches with a predetermined relationship to said print head, said at least two patches each comprising a plurality of object marks arranged to form a spread spectrum pattern;
- imaging at least a portion of said print medium with a two-dimensional reference pattern comprising a plurality of pattern marks superimposed with said test pattern printed on said print medium;
- locating in said image, according to the method of claim 1, said at least two patches of said test pattern relative to said two-dimensional reference pattern; and
- determining said head size from said at least two patch locations.

12. A method of determining a head size of a print head of a printer, said method comprising the steps of:
- printing, using a print head onto a print medium, a test pattern comprising a plurality of measurement patterns each having at least two patches with a predetermined relationship to said print head, said at least two patches of a respective measurement pattern each comprising a plurality of object marks arranged to form a spread spectrum pattern in one passage, each measurement pattern being separated from an adjacent measurement pattern by a print medium advance operation, a patch of the subsequent measurement pattern being located to minimize a distance measurement in a direction of interest between said patch and one of said at least two patches of the previous measurement pattern;
- imaging at least a portion of said print medium with a two-dimensional reference pattern comprising a plurality of pattern marks superimposed with said test pattern printed on said print medium;
- calculating said minimized distance measurement;
- locating in said image, according to the method of claim 1, a patch from one passage and another patch from another passage relative to said two-dimensional reference pattern; and
- determining said head size from said patch locations of said measurement patterns and said minimized distance measurement.

13. The method according to claim 11, further comprising the steps of statistically combining head sizes to provide an overall spatial alignment characteristic dependent upon printing multiple measurement patterns on said print medium and calculating multiple head sizes.

14. A method of determining a spatial alignment characteristic of a printer, the method comprising the steps of:
- printing, using a print head onto a print medium, a test pattern comprising a plurality of patches at predetermined measurement points, said patches each comprising a plurality of object marks arranged to form a spread spectrum pattern;
- imaging at least a portion of said print medium with a two-dimensional reference pattern comprising a plurality of pattern marks superimposed with said test pattern printed on said print medium;
- locating in the image, according to the method of claim 1, said at least two patches relative to said two-dimensional reference pattern; and
- determining a spatial alignment characteristic from said at least two patch locations.

15. The method according to claim 14, wherein said test pattern comprises patches printed in different print passages of said print head.

16. The method according to claim 14, wherein said test pattern comprises two patches, one patch printed vertically above the other patch on said print medium in the same print passage.

17. The method according to claim 14, wherein said test pattern comprises three patches, two patches being printed by a nozzle bank so that one of the two patches is located vertically above the other of the two patches, and the remaining patch of said three patches being printed in the middle by a different nozzle bank, all patches being printed in the same passage.

18. The method according to claim 14, wherein said test pattern comprises three patches, two patches being printed by a nozzle bank so that one of the two patches is located vertically above the other of the two patches, and the remaining patch of said three patches being printed in the middle with a different passage without advance of said print medium.

19. An apparatus, comprising:
- a memory for storing data and instructions for a central processing unit; and
- a central processing unit coupled to said memory, said central processing unit performing the method according to claim 11, dependent upon said instructions and said data.

20. A non-transitory computer readable storage medium having computer executable code of a computer program recorded thereon for execution by a computer to perform the method according to claim 11.

* * * * *